US 6,661,530 B1

(12) United States Patent
Munetomo et al.

(10) Patent No.: US 6,661,530 B1
(45) Date of Patent: Dec. 9, 2003

(54) PRINT PROCESSING APPARATUS USING COMPUTER SYSTEM

(75) Inventors: Hiroki Munetomo, Yamatokoriyama (JP); Takayuki Kanou, Nara (JP); Masao Yamamoto, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/187,059

(22) Filed: Nov. 5, 1998

(30) Foreign Application Priority Data

Nov. 6, 1997 (JP) ............................................... 9-304250

(51) Int. Cl.[7] ............................................ G06K 15/00
(52) U.S. Cl. ...................................... 358/1.15; 358/1.9
(58) Field of Search ............................. 358/1.14, 1.15, 358/1.16, 1.12, 434, 401, 1.9

(56) References Cited

U.S. PATENT DOCUMENTS

| | | | | |
|---|---|---|---|---|
| 4,621,319 | A | 11/1986 | Braun et al. ................. | 364/200 |
| 5,644,682 | A | 7/1997 | Weinberger et al. ......... | 395/101 |
| 5,930,524 | A * | 7/1999 | Sasaki ........................ | 395/839 |
| 6,084,685 | A * | 7/2000 | Mori ........................... | 358/1.14 |
| 6,134,017 | A * | 10/2000 | Schlank ....................... | 358/1.15 |
| 6,230,211 | B1 * | 5/2001 | Mahajan ..................... | 709/315 |
| 6,339,477 | B2 * | 1/2002 | Mori ........................... | 358/1.14 |
| 2001/0012126 | A1 * | 8/2001 | Mori ........................... | 358/434 |

FOREIGN PATENT DOCUMENTS

| | | |
|---|---|---|
| EP | 0478 335 A | 4/1992 |
| EP | 0915414 A2 * | 12/1999 ............ G06F/3/12 |
| JP | 02041557 A | 2/1990 |
| JP | 07044338 A | 2/1995 |
| JP | A 9-244843 | 9/1997 ............ G06F/3/14 |
| JP | A 10-157241 | 6/1998 ............ B41J/21/00 |

OTHER PUBLICATIONS

"Word 97 de bunsho wo sakusei shiyo" (translation: Let's make a document on Word 97) Microsoft Word 97 Special Project 1st ed: AI mook 171 Sep. 1, 1997, pp. 43–44, Japan, AI Publishing Company.
Notification of Reason for Refusal from Japanese Patent Office for Japanese Application No. 9–304250 dated Sep. 3, 2002 (2 pp.).
Comments from the Applicant on Contents of the Present Invention from References.

* cited by examiner

Primary Examiner—Jerome Grant, II
(74) Attorney, Agent, or Firm—Edwards & Angell, LLP; David G. Conlin; George W. Hartnell, III

(57) ABSTRACT

A print processing apparatus using a computer system, the computer system having: a computer; a printer connected with the computer; and a printer driver specific to the printer, for sending printing data from an application having a printing function to the printer directly or via an operating system, which print processing apparatus comprises: a display for displaying print setting items of the application and print setting items of the printer driver simultaneously on particular screens when printing operation is carried out using the application; and a print support software for extracting an overlapping item between the print setting items of the application and the print setting items of the printer driver so as to prevent contents of the overlapping item from conflicting with each other.

16 Claims, 62 Drawing Sheets

FIG. 7

WARNING MESSAGE 1

VALUES OF THIS SETTING ITEM OF APPLICATION
AND PRINTER DRIVER ARE DIFFERENT FROM
EACH OTHER.
SHOULD ONE BE MATCHED WITH ANOTHER?

YES    NO

WARNING MESSAGE 2

INPUT VALUES OF APPLICATION AND PRINTER DRIVER
ARE DIFFERENT FROM EACH OTHER.
NOTE VALUE OF APPLICATION WILL BE REFLECTED
IN PRINTING.

PRINT PROCESSING APPARATUS USING COMPUTER SYSTEM

BACKGROUND OF THE INVENTION

1. Field of the Invention

The present invention relates to a print processing apparatus using a computer system equipped with an application software for editing printing data and a printer driver for setting an operation of a printer, each of the software and the printer driver having a print setting screen.

2. Description of the Related Art

In Japanese Unexamined Patent Publication JP-A 7-44338 (1995), there is disclosed a print control apparatus and method in which printing functions of each application having a printing function on the computer are separated as one function, to thereby realize uniformity among user interfaces or printing functions which are different from application to application.

In Japanese Unexamined Patent Publication JP-A 2-41557 (1990), there is disclosed a document preparing and processing system having a document preparing function and a print processing function in which a format concerning a layout can be changed by manipulating a layout screen.

As to operating systems such as Windows, however, each printer has its own printer driver, and contents to be set by the printer drivers are different among respective printers. For example, in Japanese Unexamined Patent Publication JP-A 2-41557 (1990), it is not described to make a preview by referring to the contents of the printing driver setting. Accordingly, functions associated with individual printers, such as toner save mode setting, staple setting and the like are not reflected on the preview screen, so that there is a possibility that an image on the preview screen and an actual printing result on the paper are different to each other.

As described above, when printing operation using the application is executed in the conventional computer system, which is equipped with an operating system arranged so as to absorb differences between peripheral apparatuses of the computer using device drivers specific to individual apparatuses to make it possible to use the peripheral apparatuses commonly, a print setting screen on the application side and a printer setting screen on the printer driver side, and setting items thereof sometimes overlap. In such a constitution, it is difficult for the user to recognize the setting method, and accordingly there is a high possibility of causing printing mistakes.

Furthermore, even though efforts have been made to apply the prior arts to the above computer system with such an operating system, it turned out difficult because the printer specific functions can not be set.

SUMMARY OF THE INVENTION

The present invention is made for solving the above problems, and an object of the invention is to provide a print processing apparatus using a computer system which, in performing printing operation using an application program, allows a print setting screen associated with the application program and a printer setting screen associated with a printer driver to be displayed simultaneously, and extracts an overlapping item from setting items associated with each screen, thereby preventing the setting contents from overlapping with each other.

It is another object of the invention to provide a print processing apparatus using a computer system which, in performing printing operation using an application program, extracts print setting items associated with the application program and printer setting items associated with a printer driver, and allows all the items required for print setting to be listed and displayed in a single screen.

In a first aspect of the invention, there is provided a print processing apparatus using a computer system, comprising:

a printer driver (1-15) specific to a printer (1-4) for sending printing data directly from an application program (1-12) which has a printing function or via an operating system (1-14) from the application program, to the printer (1-4), the printer (1-4) constituting the computer system with a computer (1-1) connected thereto;

display means for displaying print setting items of the application program and print setting items of the printer driver simultaneously on particular screens when printing operation is carried out using the application program; and print setting means for extracting an overlapping item between the print setting items of the application program and the print setting items of the printer driver so as to prevent the contents of the overlapping item from conflicting with each other.

According to the first aspect of the invention, since an overlapping print setting item is extracted between the print setting items of the application program and the print setting items of the printer driver, to prevent the contents of the overlapping item from conflicting with each other, printing mistakes due to errors in print setting can be avoided.

In a second aspect of the invention, the print setting means prohibits input of a print setting item among the print setting items of the printer driver which overlaps with that of the application program.

According to the second aspect of the invention, the input positions for the overlapping item are unified, so that the operability is improved.

In a third aspect of the invention, the print setting means erases a print setting item among the print setting items of the printer driver which overlaps with that of the application program, from the screen for displaying the print setting items of the printer driver.

According to the third aspect of the invention, the setting screen is simplified, and the user is prevented from erroneously inputting on a point where input is prohibited, so that the operability is improved.

In a fourth aspect of the invention, the print setting means warns that the overlapping item between the print setting items of the application program and the print setting items of the printer driver is manipulated.

According to the fourth aspect of the invention, it is possible to confirm whether the input value is reflected to the printed result correctly, and thus a printing mistake due to erroneous print setting can be avoided.

In a fifth aspect of the invention, there is provided a print processing apparatus using a computer system, comprising:

a printer driver (1-15) specific to a printer (1-4) for sending printing data directly from an application program (1-12) which has a printing function or via an operating system (1-14) from the application program, to the printer (1-4), the printer (1-4) constituting the computer system with a computer (1-1) connected thereto;

display means; and print setting means for extracting print setting items of the application program and print setting items of the printer driver and causing the display means to display all the print setting items required for printing operation on one screen, when the printing operation is carried out using the application program.

According to the fifth aspect of the invention, in performing printing operation by using the application program, all the print setting items required for the printing are extracted from the print setting items of the application program and the print setting items of the printer driver, and listed and displayed on one screen, to thereby unify the print setting items required for printing. That helps the user to understand the setting items, so that the operability is improved.

In a sixth aspect of the invention, the display means further displays a print preview image on a particular screen, and the print preview image is paler when a toner save mode is set than when the toner save mode is not set.

According to the sixth aspect of the invention, setting of the toner save mode associated with individual printer can be readily confirmed on the preview screen, so that the operability is improved and print mistakes can be avoided.

In a seventh aspect of the invention, the display means further displays a print preview image on a particular screen, and when a type of printing paper is set for each page, differences in printing paper type for each page are identified on the screen for displaying the print preview image.

According to the seventh aspect of the invention, the differences in printing paper type is readily confirmed for each page on the print preview screen, so that the operability is improved and printing mistakes are avoided.

In an eighth aspect of the invention, a background image can be set for each type of printing paper.

According to the eighth aspect of the invention, the user can distinguish the type of printing paper readily by observing the background image, and therefore the operability is improved.

In a ninth aspect of the invention, the display means further displays a print preview image on a particular screen, and when a staple position is set, the staple position of all pages is displayed on the screen for displaying the print preview image.

According to the ninth aspect of the invention, the stapling position can be confirmed readily, and a mistake in staple setting is avoided.

In a tenth aspect of the invention, the staple position can be changed by direct manipulation of the screen for displaying the print preview image, and in case where an improper position for the staple position is designated, an operation of warning, ignoring or newly designating a position closest to the previously designated position within a valid range is executed.

According to the tenth aspect of the invention, the operation is easy to be understood because of its direct manner, and the changed results is easily confirmed. In addition, the stapling position is prevented from being set at improper position such as at the outside the printing paper, so that setting mistakes for the stapling position are avoided.

In an 11th aspect of the invention, the display means further displays a print preview image on a particular screen, and when a double-sided printing mode is set, face and back sides of printing paper for each page are identified on the screen for displaying the print preview image, and insertion/removal of a blank page into/from an arbitrary page and designation of face/back side of printing paper for each page can be effected by direct manipulation of the screen for displaying the preview image.

According to the 11th aspect of the invention, since the user can perform manipulation while observing the preview screen, editing operation of inserting or removing a blank page and confirmation thereof are facilitated, avoiding printing mistakes.

In a 12th aspect of the invention, the display means further displays a print preview image on a particular screen, and when a double-sided printing mode is set, a long-length binding mode or a short-length binding mode can be designated on the screen for displaying the print preview image and a double-page spread is displayed on the screen for displaying the print preview image according to the designated mode.

According to the 12th aspect of the invention, it is possible to decide a layout while being aware of also a double-page spread after binding, so that the operability is improved.

In a 13th aspect of the invention, the display means further displays a print preview image on a particular screen, and when a double-sided printing mode is set, a binding margin can be set and a binding margin range is displayed on the screen for displaying the print preview image.

According to the 13th aspect of the invention, the binding margin range can be readily confirmed.

In a 14th aspect of the invention, the display means further displays a print preview image on a particular screen, and horizontal flipping, 180° rotating and inverting of printing image are identified on the screen for displaying print preview image in setting thereof.

According to the 14th aspect of the invention, effect of the horizontal flipping, 180° rotating or inverting of printing image is visible, so that printing mistakes are avoided.

In a 15th aspect of the invention, horizontal flipping, 180° rotating or inverting printing image is inputted by direct manipulation of the screen for displaying the print preview image.

According to the 15th aspect of the invention, detail setting for each page is achieved by manipulating on the preview screen.

In a 16th aspect of the invention, the display means further displays a print preview image on a particular screen, and when number of guard sheets to be inserted or a page into which a guard sheet is to be inserted is set, each setting is identified on the screen for displaying the print preview image.

According to the 16th aspect of the invention, setting concerning the guard sheet can be made on the preview screen, which makes the manipulation and confirmation of changed result easier.

BRIEF DESCRIPTION OF THE DRAWINGS

Other and further objects, features, and advantages of the invention will be more explicit from the following detailed description taken with reference to the drawings wherein:

FIG. 7 shows examples of warning messages in the fourth embodiment of the invention;

DETAILED DESCRIPTION OF THE PREFERRED EMBODIMENT

Figure 1:
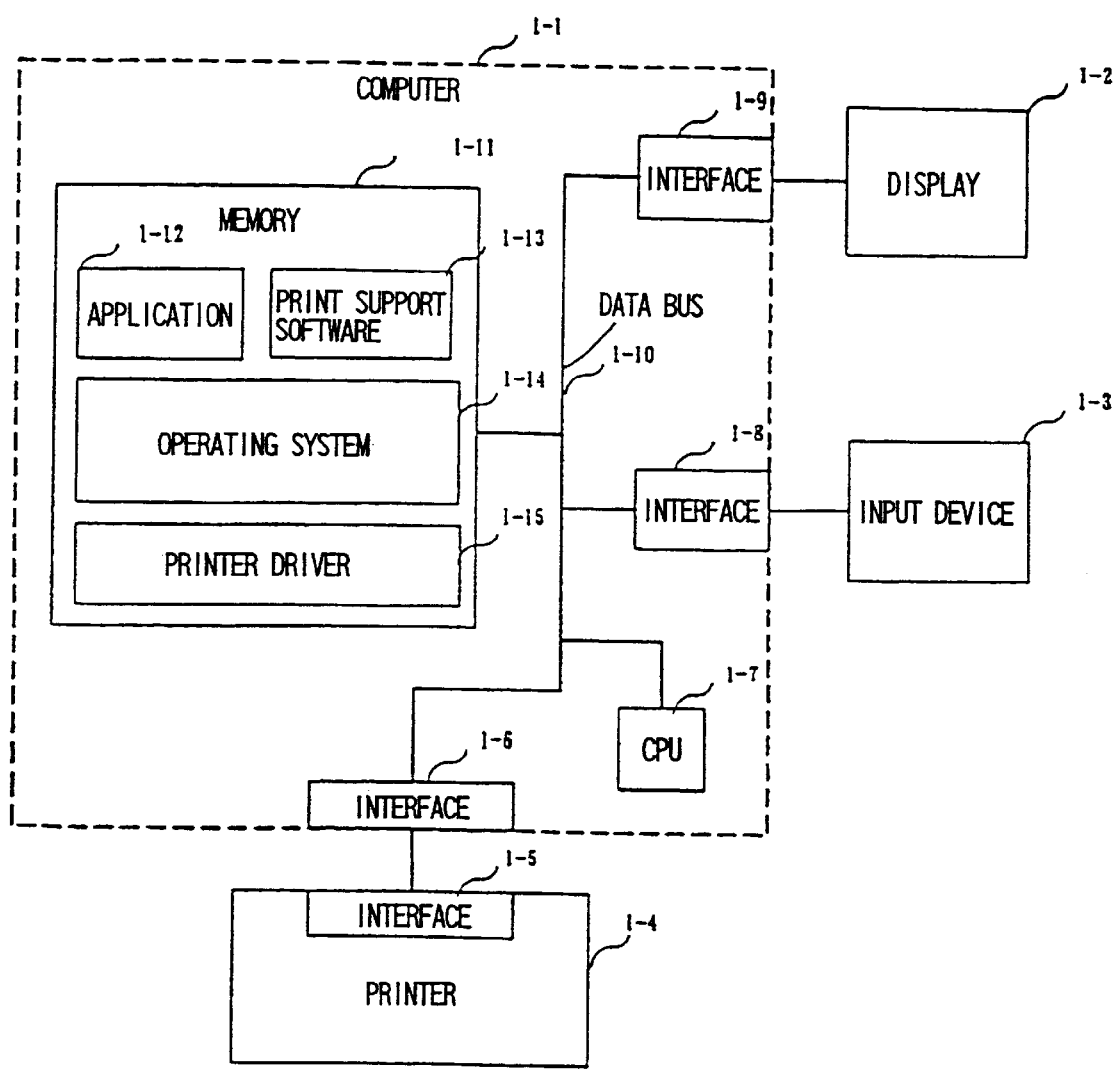
FIG. 1 is a block diagram of a hardware system of a computer according to a first embodiment of the invention.

Now referring to the drawings, preferred embodiments of a print processing apparatus using a computer system according to the invention will be described.

[First Embodiment]

Figure 2:
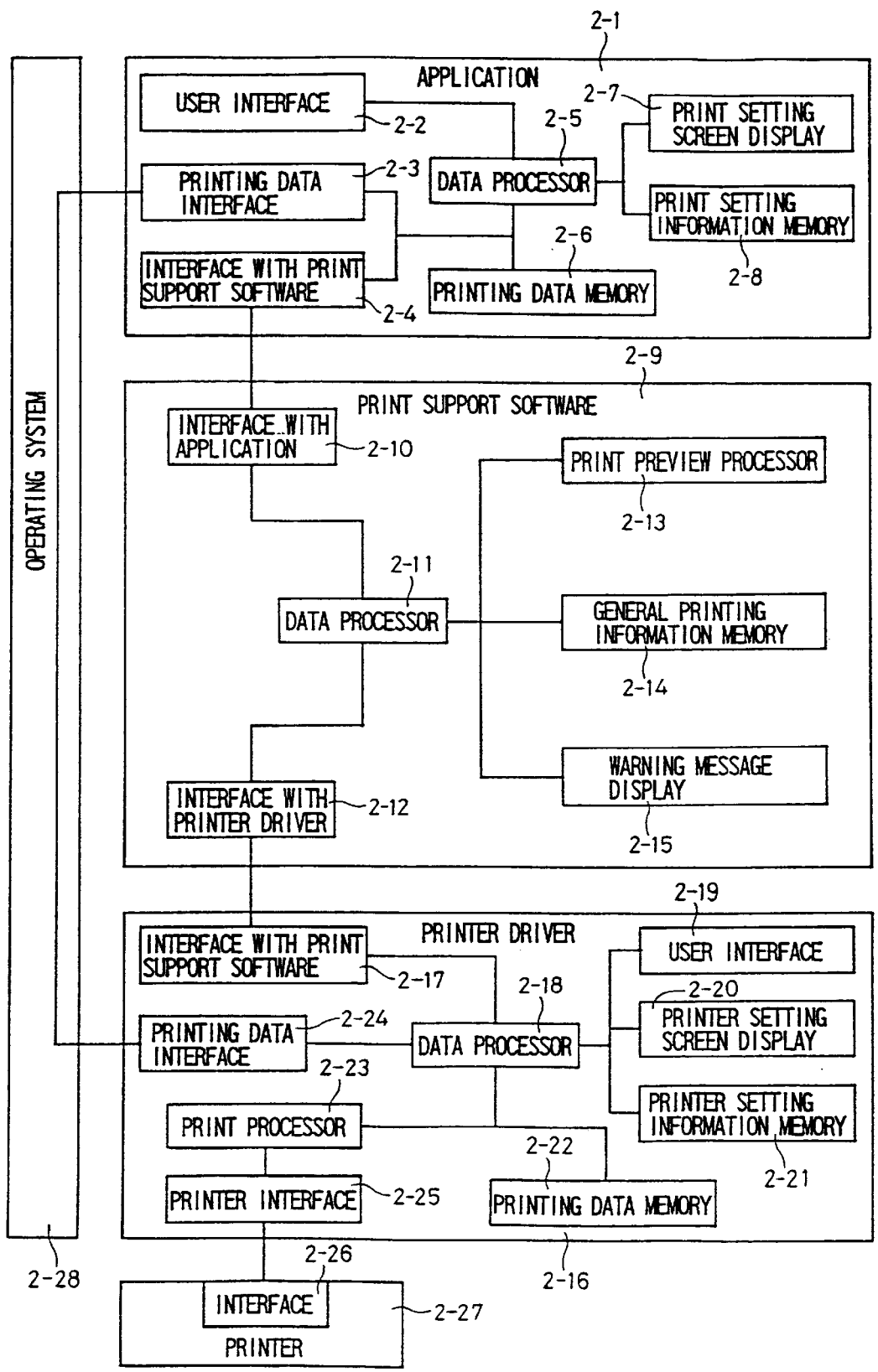
FIG. 2 is a block diagram of a software system of the computer according to the first embodiment of the invention.
Figure 3:
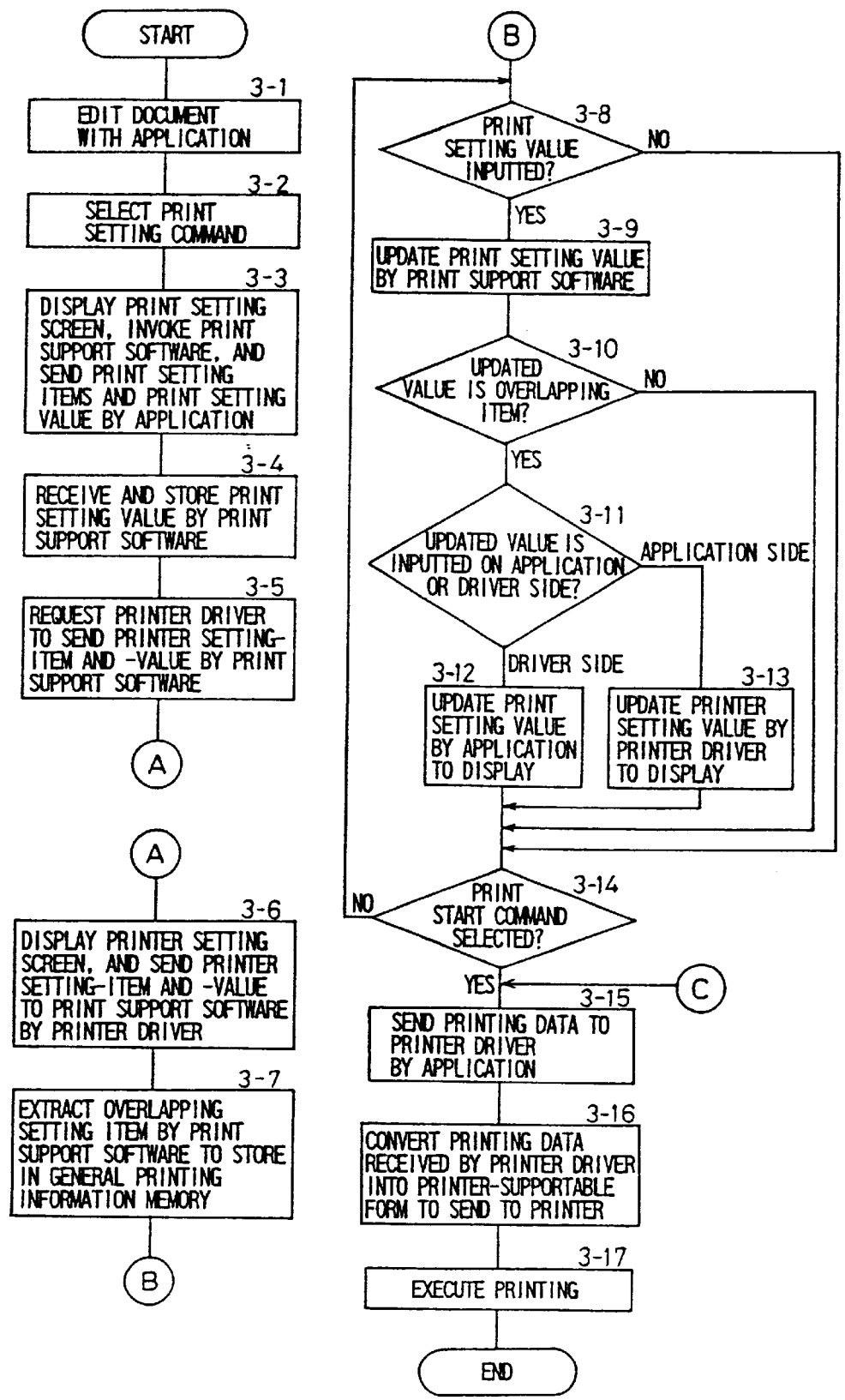
FIG. 3 is a flowchart of the first embodiment of the invention.

FIG. 1 is a block diagram of a hardware system of a computer according to a first embodiment of the invention, FIG. 2 is a block diagram of a software system of the computer according to the first embodiment of the invention, and FIG. 3 is a flowchart for explaining the first embodiment.

In FIG. 1, a display 1-2, an input device 1-3 and a printer 1-4 are connected to a computer 1-1. A user prepares and inputs a document that he/she desires to print by manipulating the input device 1-3. The input result is then displayed on the display 1-2, and printed out by the printer 1-4. The computer 1-1 contains therein a printer interface 1-6, a CPU 1-7, an input device interface 1-8, a display interface 1-9 and a memory 1-11 which are internally connected via a data bus 1-10. The memory 1-11 stores an application 1-12, a print support software 1-13, an operating system 1-14 and a printer driver 1-15.

The application 1-12 provides interfaces for managing edit facilities which allow the user to prepare a document that he/she desires to print, and print settings. The print support software 1-13 is a software for integrating and managing the print setting facilities owned by the application 1-12 and the printer driver 1-15 respectively. The operating system 1-14 is a basic software which exchanges data between the application 1-12, the print support software 1-13, the printer driver 1-15 and the respective interfaces, and causes the CPU 1-7 to perform a computation, thereby managing the whole operations of the computer. The printer driver 1-15 which is specific to each model of printers, reconfigures the printing data sent from the operating system 1-14 into a form that the printer 1-4 can directly recognize, and sends the reconfigured data to the printer interface 1-6.

In FIG. 2, an application 2-1 provides interfaces for managing edit facilities for allowing the user to prepare a document that he/she desires to print, and print settings. A user interface 2-2 is an interface for allowing the user to input and edit a document that he/she desires to print, as well as input print setting values. A printing data interface 2-3 is an interface for sending printing data to a printer driver 2-16 via an operating system 2-2. An interface 2-4 is an interface through which print setting information stored in a print setting information memory 2-8 and printing data stored in a printing data memory 2-6 are sent to a printing support software 2-9.

A data processor 2-5 carries out a process of converting a document edited by the user into printing data to be sent to the operating system 2-28. The printing data memory 2-6 stores the printing data converted by the data processor 2-5. The print setting information memory 2-8 stores print setting information of items defined by the application. A print setting screen display 2-7 displays the print setting information stored in the print setting information memory 2-8 so as to allow the user to manipulate the information values on the screen.

The print support software 2-9 is a software for integrating and managing print setting facilities owned by the application 2-1 and the printer driver 2-16, respectively. An interface 2-10 receives the print setting information of the application 2-1 sent from the interface 2-4 and the printing data stored in the printing data memory 2-6. A data processor 2-11 analyzes the print setting information received from the application 2-1 and the printer setting information received from the printer driver 2-16 and extracts a setting item which overlaps between each information.

An interface 2-12 receives printer setting information sent from an interface 2-17 and sends general printing information stored in a general printing information memory 2-14 to the interface 2-17. A print preview display 2-13 displays a print preview on the basis of the general printing information stored in the general printing information memory 2-14 and the printing data received by the interface 2-10. The general printing information memory 2-14 stores the overlapping setting items extracted by the data processor 2-11 among the print setting information received from the application 2-1 and the printer setting information received from the printer driver 2-16, as well as all the setting values required for the printing operation.

A warning message display 2-15 displays a warning message when any one of the overlapping items among the print setting information of the application and the printer setting information of the printer driver is manipulated. The printer driver 2-16 receives the printing data from the operating system 2-28, reconfigures the printing data into the form that a printer 2-27 can directly recognize, and sends the reconfigured data to the printer 2-27 for causing the same to execute printing.

The interface 2-17 with the print support software sends printer setting information stored in a printer setting information memory 2-21 into the print support software 2-9. A data processor 2-18 carries out a converting process of reconfiguring the printing data received by a printing data interface 2-24 into the form that the printer 2-27 can directly recognize.

A user interface 2-19 provides a printer setting screen displayed by a printer setting screen display 2-20 with an interface for allowing the user to input a printer setting value by manipulating the same. The printer setting information memory 2-21 stores the contents and values of the items required for the printer 2-27 to execute printing.

A printing data memory 2-22 stores the printing data converted by the data processor 2-18. A print processor 2-23 combines the printing data stored in the printing data memory 2-22 with the printer setting information stored in the printer setting information memory 2-21 to send the combined data to a printer interface 2-25. A printing data interface 2-24 receives the printing data sent from the operating system 2-28.

The printer interface 2-25 sends the printer setting information and the printing data sent from the print processor 2-23 to the printer 2-27. The printer 2-27 receives the printing data sent from the printer driver by an interface 2-26, and outputs the data on the paper. The operating system 2-28 receives the printing data sent from the application 2-1 and sends the same to the printer driver 2-16.

By referring to FIG. 3, the user prepares a printing document using the application 2-1 on the memory 1-11 of the computer 1-1 at step 3-1, and selects a printing command at step 3-2. At step 3-3, in response to the printing command, the application 2-1 displays a print setting input screen on the basis of the print setting items and print setting values pre-stored in the print setting information memory 2-8, and invokes the print support software 2-9 while sending the print setting items and print setting values.

The invoked print support software 2-9 receives the print setting items and print setting values to store them in the general printing information memory 2-14 at step 3-4, and requests the printer driver 2-16 to send the printer setting items and printer setting values at step 3-5. At step 3-6, the printer driver sends the printer setting items and printer setting values registered beforehand in the printer setting information memory 2-21 to the print support software 2-9, while causing the printer setting screen display 2-20 to display a printer setting input screen.

At step 3-7, the print support software 2-9 analyzes the received print setting items of the application and the printer setting items of the printer driver at the data processor 2-11, and extracts an overlapping items. The extracted overlapping item is stored in the general printing information memory 2-14. Next, at step 3-8, the user inputs a print setting for the document that he/she desires to print via the print setting screen of the application 2-1 or the printer setting screen of the printer driver 2-16. At step 3-9, the input setting value is immediately sent to the general printing information memory 2-14 via the data processor 2-11 of the print support software 2-9 where the setting value is updated. When the data processor 2-11 judges that the updated item is an overlapping item at step 3-10, and that the updated item is inputted from the setting screen of the application side at step 3-11, the setting value is sent to the printer driver 2-16 at step 3-13. Upon receiving the setting value, the printer driver 2-16 updates the existent value stored in the printer setting information memory 2-21, as well as updates the values displayed on the printer setting screen display 2-20.

When it is judged that the updated item is inputted on the setting screen of the printer driver side at step 3-11, the print support software 2-9 sends the setting value to the application 2-1 at step 3-12. Upon receiving the setting value, the application 2-1 updates the existent value stored in the print setting information memory 2-8 and causes the print setting screen display 2-7 to display the updated value.

Subsequent to the above processes, when the user selects a print start command at step 3-14, the printing data stored in the printing data memory 2-6 of the application 2-1 is sent to the printer driver 2-16 at step 3-15. At step 3-16, the printing data received by the printer driver 2-16 is processed at the data processor 2-18 together with the setting value stored in the printer setting information memory 2-21 and converted into the form that the printer can print out. The printing data thus converted is sent to the printer 2-26 by the print processor 2-23 via the printer interface 2-25, and then printing operation is executed at step 3-17.

[Second Embodiment]

Figure 4:
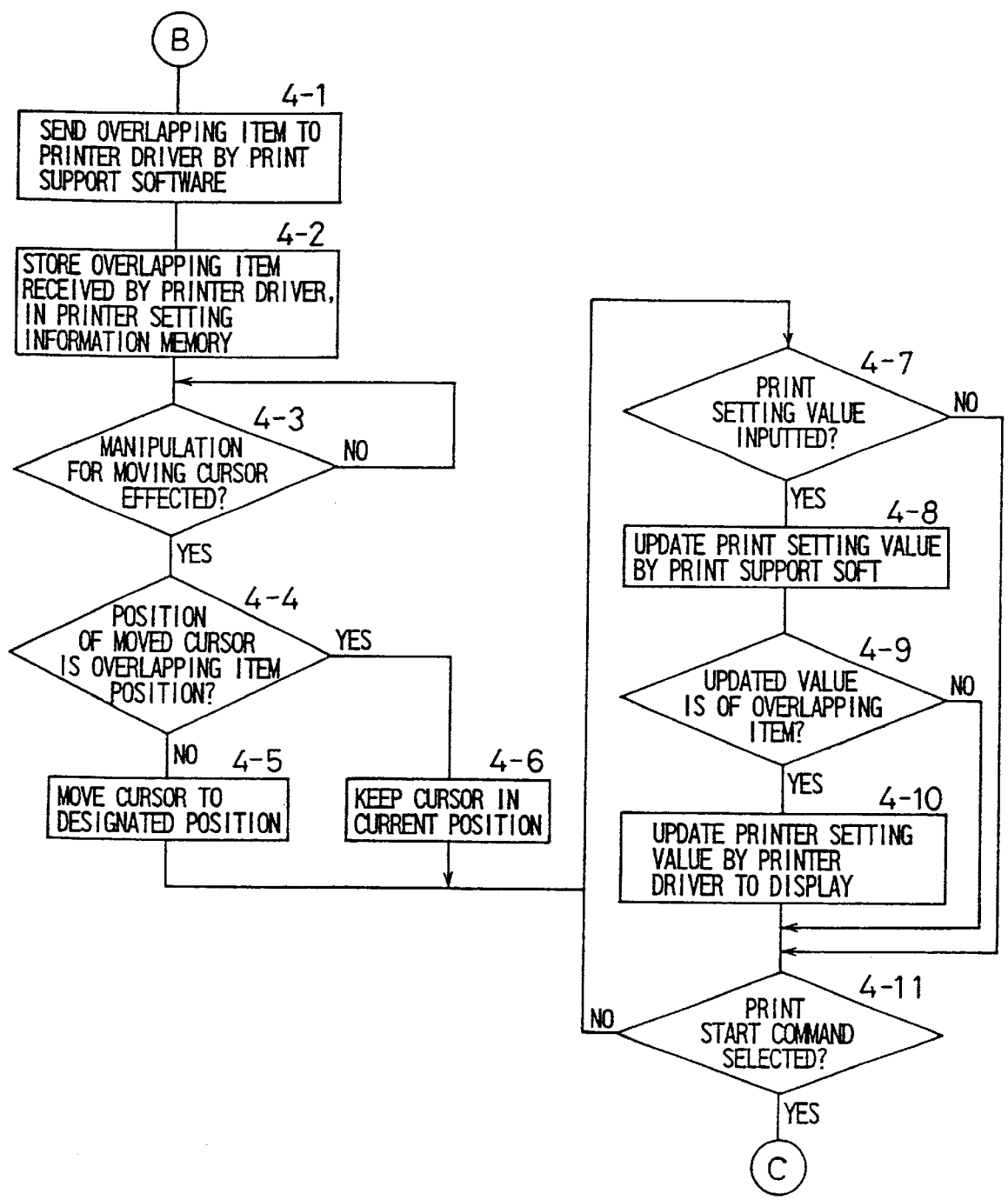
FIG. 4 is a flowchart of a second embodiment of the invention.

FIG. 4 is a flowchart for explaining a second embodiment of the invention. The overlapping item extracted at step 3-7 in FIG. 3 is stored in the general printing information memory 2-14 while being sent to the printer driver 2-16 at step 4-1 and stored in the printer setting information memory 2-21 at step 4-2.

When the user makes a manipulation of moving a cursor on the printer setting screen at step 4-3, and it is judged at step 4-4 that a position to which the cursor is moved is an input position for the overlapping item stored in the printer setting information memory 2-21, the user interface 2-20 of the printer driver 2-16 does not move the cursor but keeps it at the original position at step 4-6. When it is judged that the position to which the cursor is moved is not the input position for the overlapping item, the cursor is moved to the designated position.

At step 4-7, the user moves the cursor to input positions for the print setting items and printer setting items other than the overlapping item via the above-mentioned manipulation, and inputs a setting value as needed. At step 4-8, the input setting value is immediately sent to the general printing information memory 2-14 via the data processor 2-18 of the print support software 2-9 where the setting value is updated. At step 4-9, when it is judged at the data processor 2-11 that the updated item is the overlapping item, the setting value is sent to the printer driver 2-16.

At step 4-10, upon receiving the setting value, the printer driver 2-16 updates the existent setting value stored in the printer setting information memory 2-21 while updating the value currently displayed on the printer setting screen display 2-20. At step 4-11, when the user selects the print start command after the above processes, printing operation is executed in the same manner as previously described in the first embodiment.

[Third Embodiment]

Figure 5:
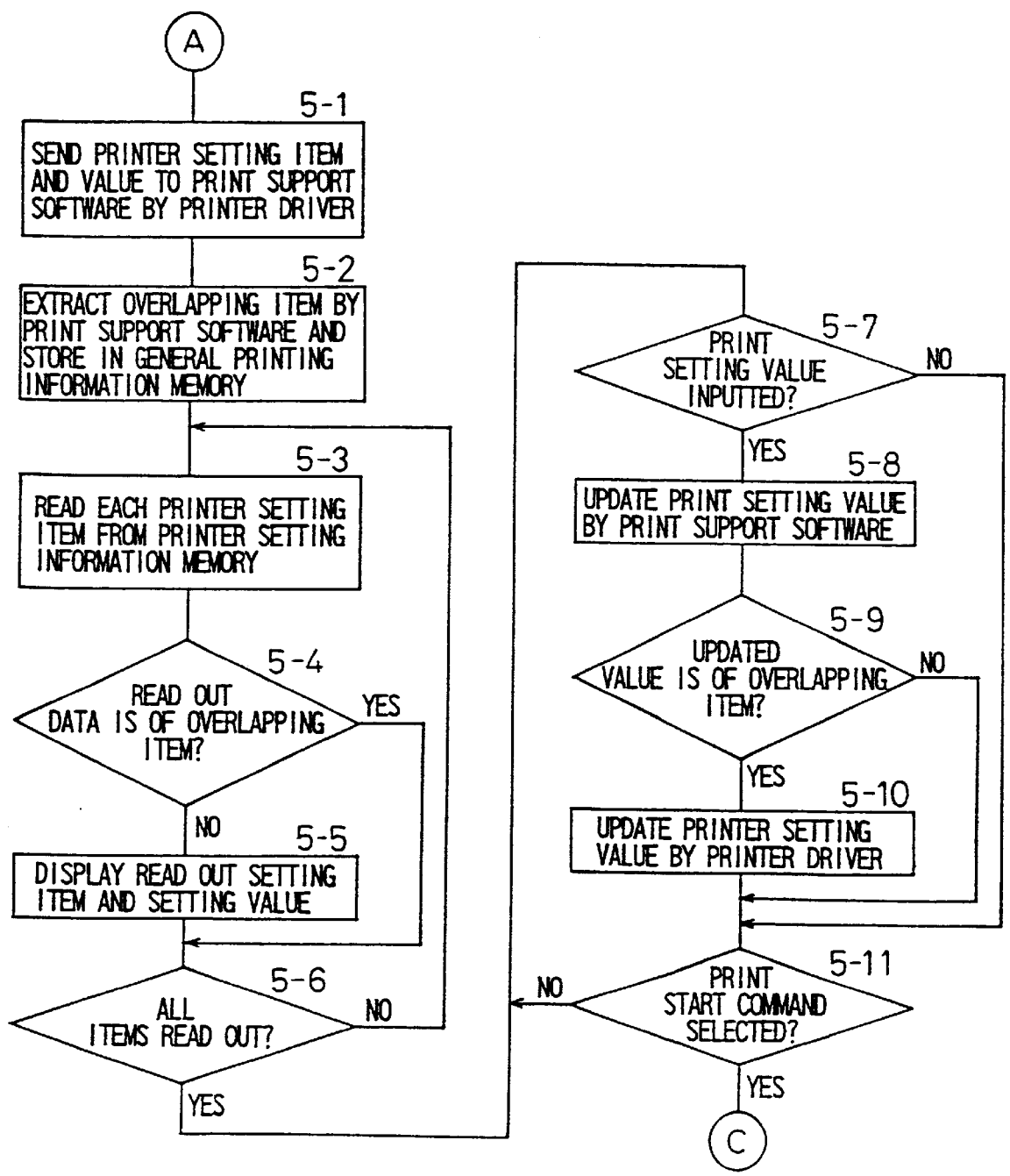
FIG. 5 is a flowchart of a third embodiment of the invention.

FIG. 5 is a flowchart for explaining a third embodiment of the invention. At step 5-1 in FIG. 5, the printer driver 2-16 sends the printer setting item and printer setting value registered beforehand in the printer setting information memory 2-21 to the print support software 2-9.

At step 5-2, the print support software analyzes at the data processor 2-11 the print setting item of the application 2-1 and the printer setting item of the printer driver 2-1 thus received and extracts an item overlapping between the print setting items and the printer setting items. The extracted overlapping item is stored in the general printing information memory 2-14 while being sent to the printer driver 2-16 where it is stored in the printer setting information memory 2-21.

At step 5-3, the printer setting screen display 2-20 reads out each of printer setting items from the printer setting information memory 2-21. At step 5-4 and step 5-5, when the read out item is not the overlapping item, the setting value and an input portion are displayed on the screen, or when it is the overlapping item, the setting value and the input portion are not displayed.

After completion of the above process for all the printer setting items at step 5-6, the user inputs a print setting value of the document that he/she desires to print via the print setting screen of the application or the printer setting screen of the printer driver at step 5-9. At step 5-8, the input setting value is immediately sent to the general printing information memory 2-14 via the data processor of the print support software 2-9, where the setting value is updated.

When it is judged at the data processor 2-11 that the updated item is the overlapping item at step 5-9, the setting value is sent to the printer driver 2-16 at step 5-10. Upon receiving the setting value, the printer driver 2-16 updates the existent value stored in the printer setting information memory 2-21. At step 5-11, after completion of the above process, when the user selects the print start command, printing operation is executed in the manner as described in the first embodiment.

[Fourth Embodiment]

Figure 6:
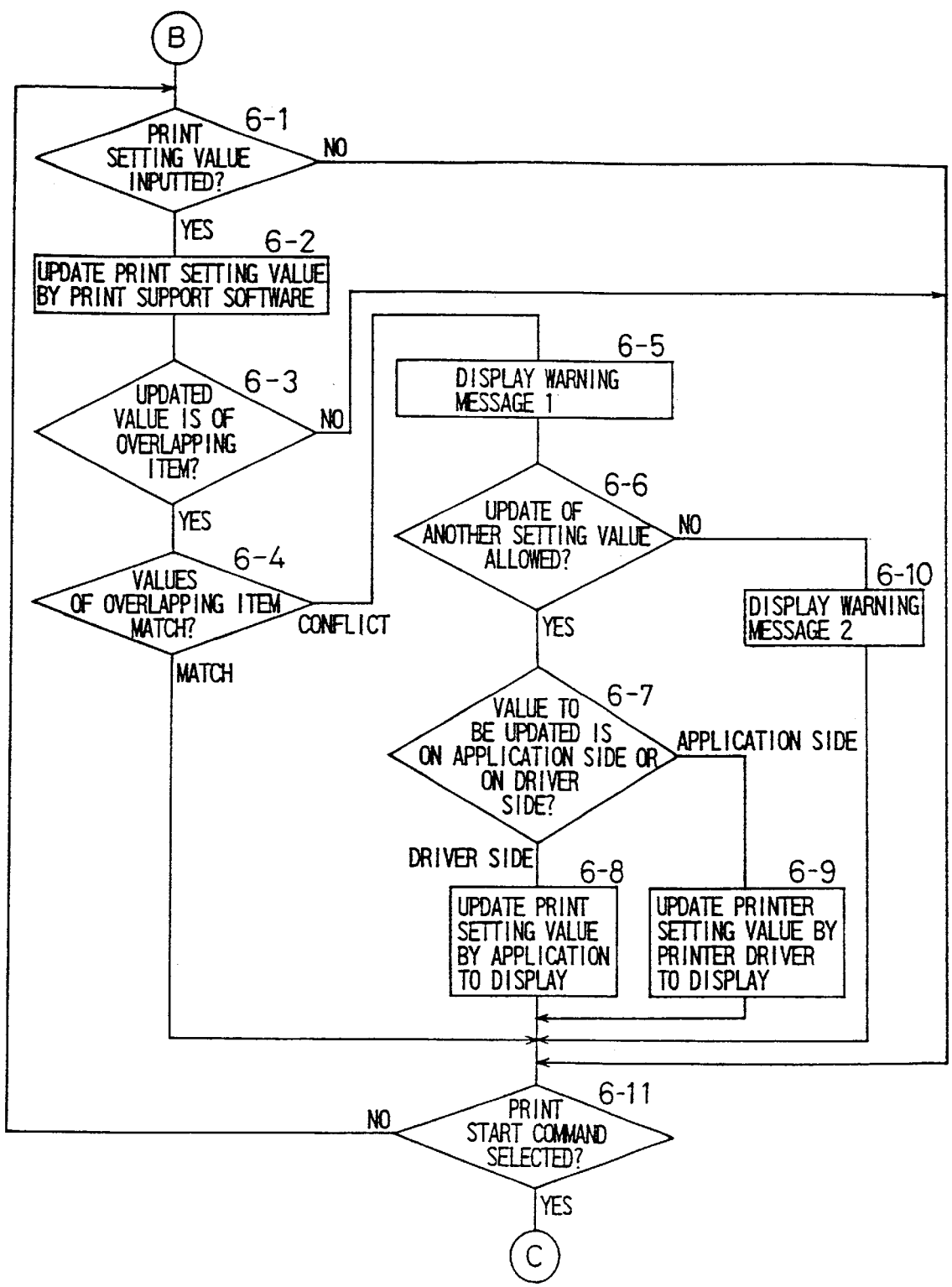
FIG. 6 is a flowchart of a fourth embodiment of the invention.

FIG. 6 is a flowchart for explaining a fourth embodiment of the invention, and FIG. 7 is an example of a warning message used in the fourth embodiment. At step 6-1 of FIG. 6, the user inputs a print setting of the document that he/she desires to print via the print setting screen of the application 2-1 or the printer setting screen of the printer driver 2-16.

At step 6-2, the input setting value is immediately sent to the general printing information memory 2-14 via the data processor 2-11 of the print support software 2-9, where the setting value is updated. When it is judged at the data processor 2-11 that the updated item is the overlapping item at step 6-3, and that the input values of the overlapping item conflict with each other at step 6-4, a warning message 1 notifying that the inputted item is the overlapping item and inquiring whether the print setting value of the application side and the printer setting value of the printer driver side may be updated so as to unify them is displayed on the warning message display 2-15, thereafter entering a waiting state for a selection input.

When the user makes an input that he/she agrees with the message at step 6-6, the setting value is updated at steps 6-7, 6-8 and 6-9 so that the printer driver side setting value is updated in the case the updated input item is the application side one, and the application side setting value is updated in the case the updated input item is the printer driver side one. When the user makes an input that he/she does not agree with the message, a warning message 2 is displayed at step 6-10 notifying that the input values conflict between the items of the application side and printer driver side, and either the application side value or printer driver side value will be reflected in printing. After completion of the above process, when the user selects the print start command at step 6-11, printing operation is executed in the manner as described in the first embodiment.

[Fifth Embodiment]

Figure 8:
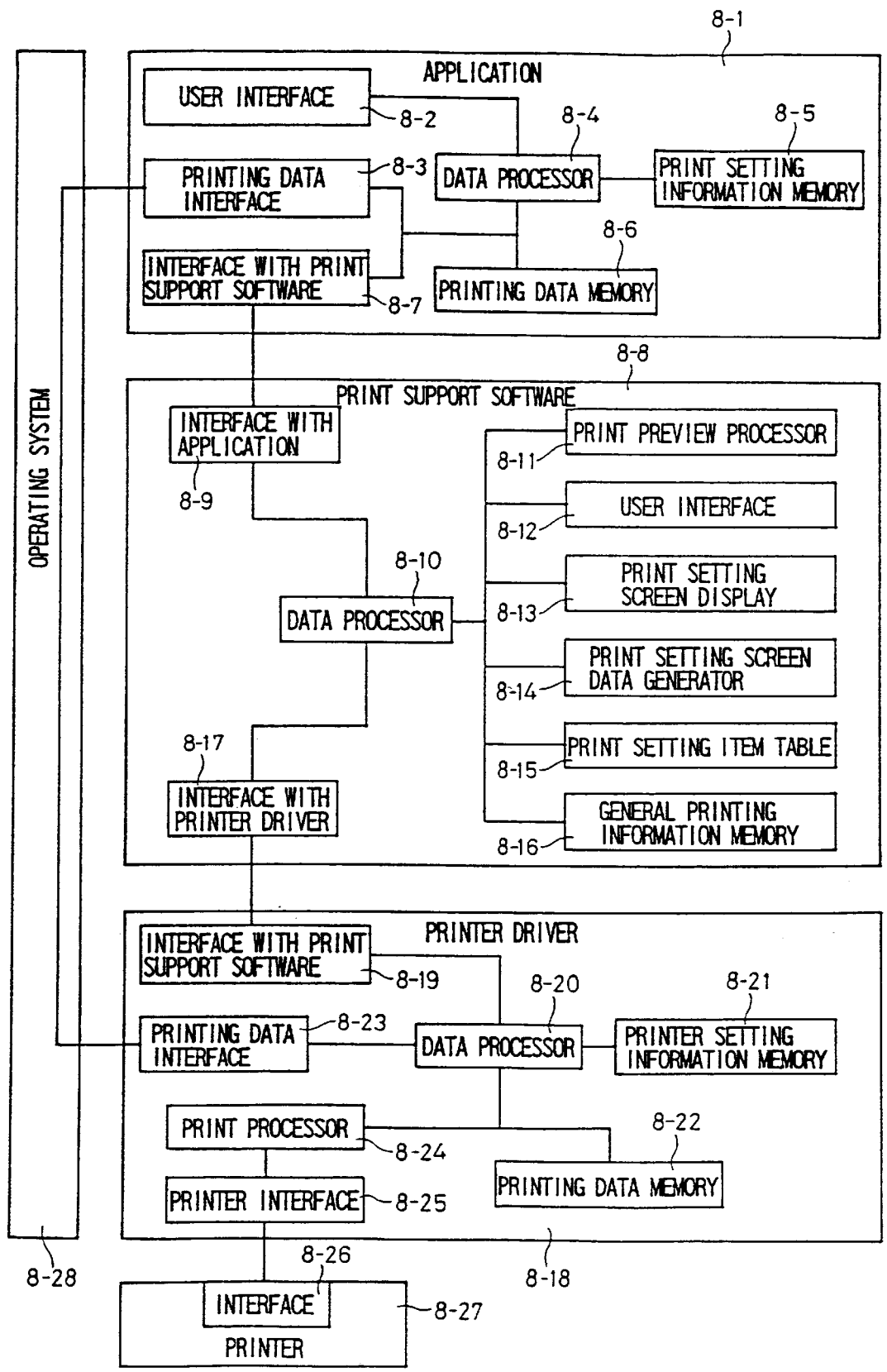
FIG. 8 is a block diagram of a software system of a computer according to a fifth embodiment of the invention.
Figure 9:
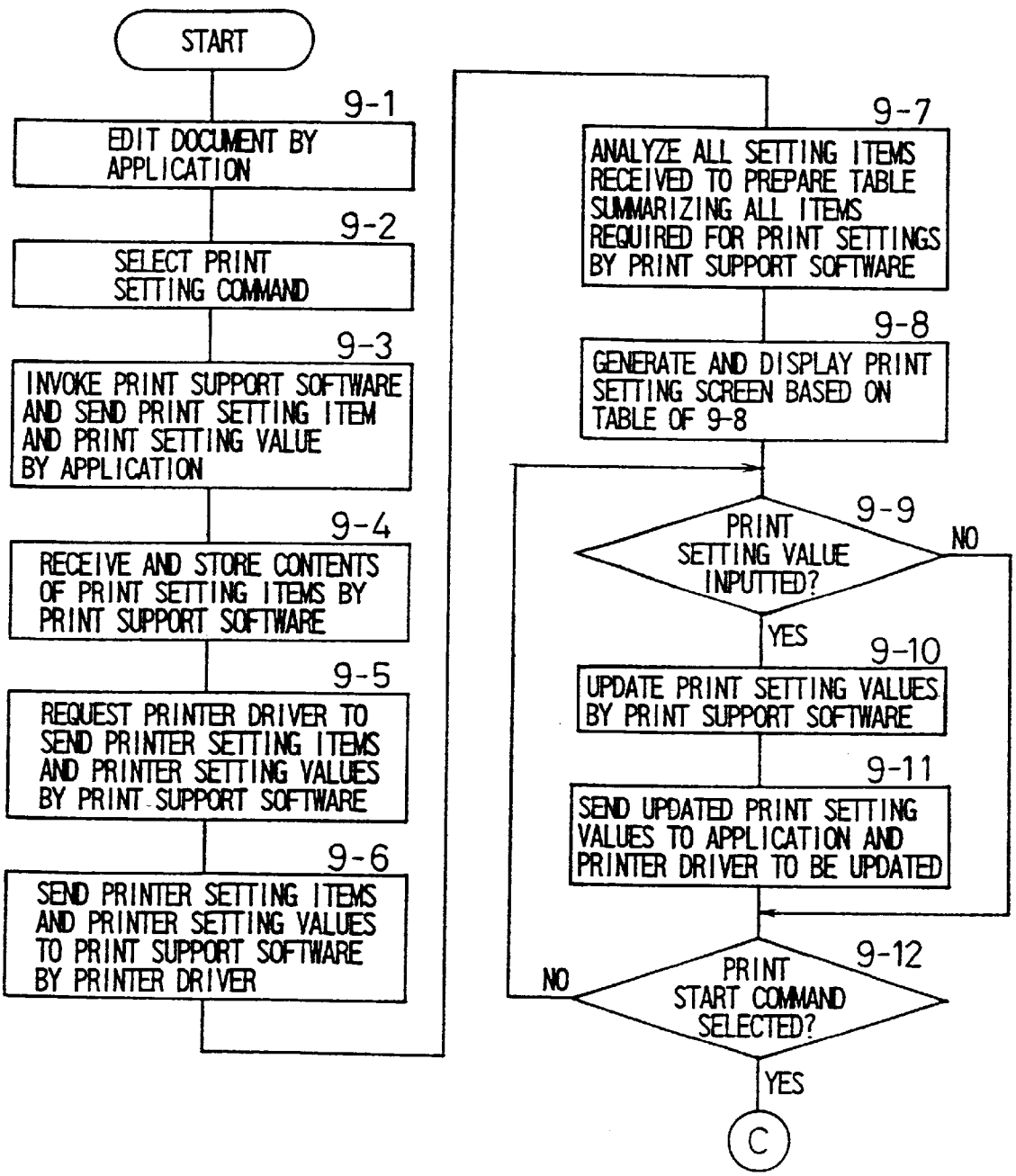
FIG. 9 is a flowchart of the fifth embodiment of the invention.

FIG. 8 is a block diagram of a software system of a computer according to a fifth embodiment of the invention, and FIG. 9 is a flowchart explaining the fifth embodiment.

In FIG. 8, an application 8-1 provides interfaces for managing edit facilities and print settings for allowing the user to prepare a document that the user desires to print. A user interface 8-2 is an interface for allowing the user to edit the document that he/she desires to print and input a print setting. A printing data interface 8-3 is an interface through which printing data is sent to a printer driver via an operating system.

A data processor 8-4 carries out a process of converting the document edited by the user into printing data to be sent to an operating system 8-28. A print setting information memory 8-5 stores print setting information of each item defined by the application 8-1. A printing data memory 8-6 stores the printing data converted by the data processor 8-4. An interface 8-7 is used in sending the print setting information stored in the print setting information memory 8-5 and the printing data stored in the printing data memory 8-6 to a print support software 8-8. The print support software 8-8 integrates and manages the print setting facilities owned by the application 8-1 and a printer driver, respectively.

An interface 8-9 receives the print setting information of the application and the printing data stored in the printing data memory 8-6 which are sent from the interface 8-7. A data processor 8-10 carries out a process of analyzing the print setting information received from the application 8-1 and printer setting information received from the printer driver 8-18 and extracting an item which is overlapping between each information, and prepares a table summarizing all the items necessary for print setting.

A print preview display 8-11 displays a print preview on the basis of general printing information stored in a general printing information memory 8-16 and the printing data received via the interface 8-9 with the application. A user interface 8-12 provides an interface for allowing the user to manipulate a print setting screen displayed by a print setting screen display 8-13 so as to input a print setting value.

The print setting screen display 8-13 displays print setting items stored in a print setting item table 8-15 and the general printing information stored in the general printing information memory 8-16, so that the user can manipulate these values on the screen.

A print setting screen data generator 8-14 determines where to place each setting item and setting value thereof on the print setting screen on the basis of the print setting item table 8-15, thereby generating as print setting screen data.

The print setting item table 8-15 stores a table compiling the setting item which overlap between the application 8-11 and the printer driver 8-18 and is extracted by the data processor 8-10, and setting values of all the items necessary for the printing.

An interface 8-17 receives the printer setting information sent from an interface 8-19 and sends the general printing information stored in the general printing information memory 8-16 to the interface 8-19. The printer driver 8-18 receives the printing data from an operating system 8-28, reconfigures the printing data into the form that a printer 8-27 can directly recognize, then sends the reconfigured data to the printer 8-27 for causing it to execute printing.

The interface 8-19 sends the printer setting information stored in a printer setting information memory 8-21 to the print support software 8-8. A data processor 8-20 carries out a process of converting the printing data received at a printing data interface 8-23 into the form that the printer 8-27 can directly recognize. The printer setting information memory 8-21 stores all the values of the setting items necessary for the printer 8-27 to execute printing.

A printing data memory 8-22 stores the printing data converted by the data processor 8-20. The printing data interface 8-23 receives the printing data sent from the operating system 8-28.

A print processor 8-24 combines the printing data stored in the printing data memory 8-22 and the printer setting information stored in the printer setting information memory 8-21 and sends the combined data to a printer interface 8-25.

The printer interface 8-25 sends the printer setting information and the printing data sent from the print processor 8-24 to the printer 8-27. The printer 8-27 receives the printing data sent from the printer driver at an interface 2-26, and print out the data on the paper. The operating system 8-28 receives the printing data sent from the application 8-1 and sends it to the printer driver 8-18.

At step 9-1 in FIG. 9, the user prepares a printing document using the application 8-1 stored in the memory of the computer, and selects a print command at step 9-2. At step 9-3, in response to the print command, the application 8-1 invokes the print support software 8-8 while sending the print setting item and the print setting value stored in the print setting information memory 8-5.

At step 9-4, the invoked print support software 8-8 receives the print setting item and the print setting value and stores them in the general printing information memory 8-16, and then requests the printer driver 8-18 to send the printer setting item and printer setting value.

At step 9-6, the printer driver 8-18 sends the printer setting item and the printer setting value registered beforehand in the printer setting information memory 8-21 to the print support software 8-8. At step 9-7, the print support software 8-8 analyzes at the data processor 8-10 the received print setting item of the application 8-3 and the printer setting item of the printer driver 8-18, and prepares the tables 8-15 in which all the items required for print setting are summarized and integrated.

At step 9-8, print setting screen data for allowing the user to input the print setting value is generated at the print setting screen data generator 8-14 based on the above-mentioned table, and the print setting screen data is displayed on the print setting screen display 8-13. At step 9-9, the user inputs a print setting of the document that he/she desires to print by manipulating the print setting screen. At step 9-10, the input setting value is sent to the general printing information memory 8-16 and updated. Further, at step 9-11, the setting value is sent to the application 8-1 and the printer driver 8-18, where the setting value is updated and stored in the print setting information memory 8-5 and the printer setting information memory 8-21, respectively. At step 9-12, after completion of the above process, when the user selects the print start command, printing operation is executed in the manner as described in the first embodiment.

[Sixth Embodiment]

Figure 10:
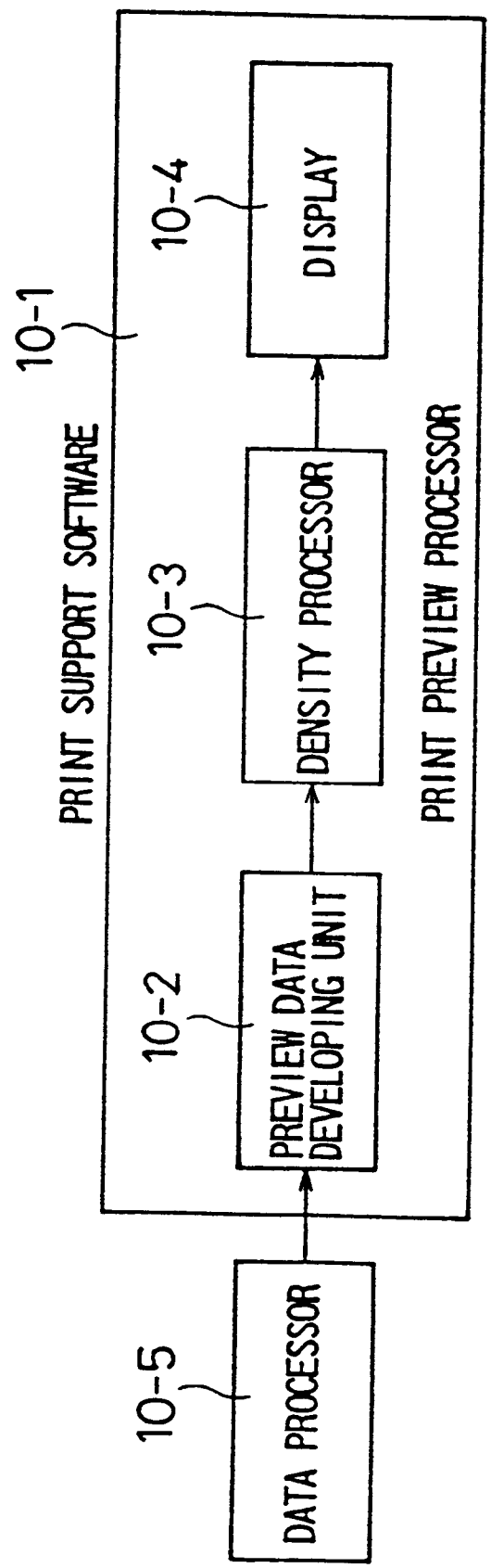
FIG. 10 is a block diagram of a software system according to a sixth embodiment of the invention.
Figure 11:
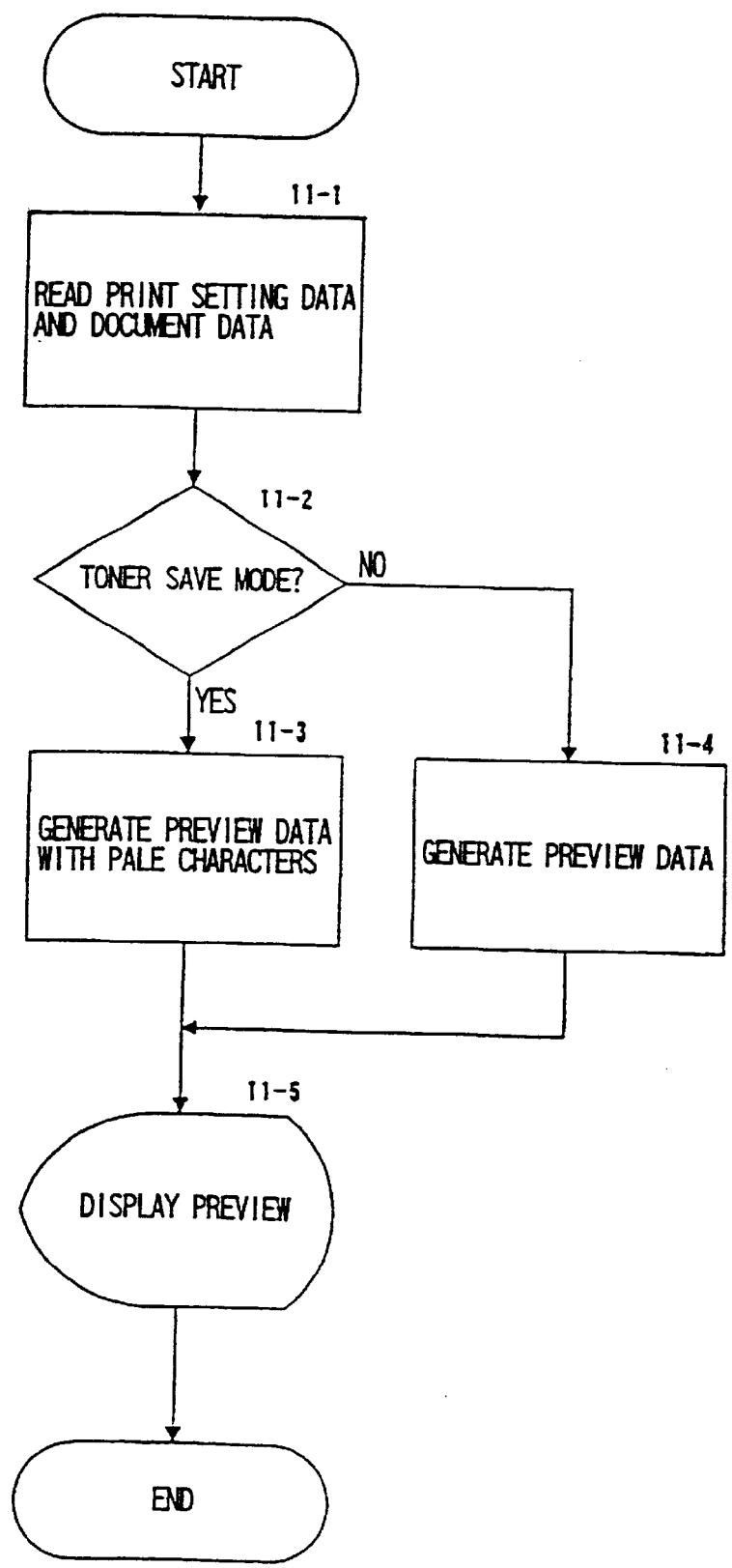
FIG. 11 is a flowchart of the sixth embodiment of the invention.
Figure 12:
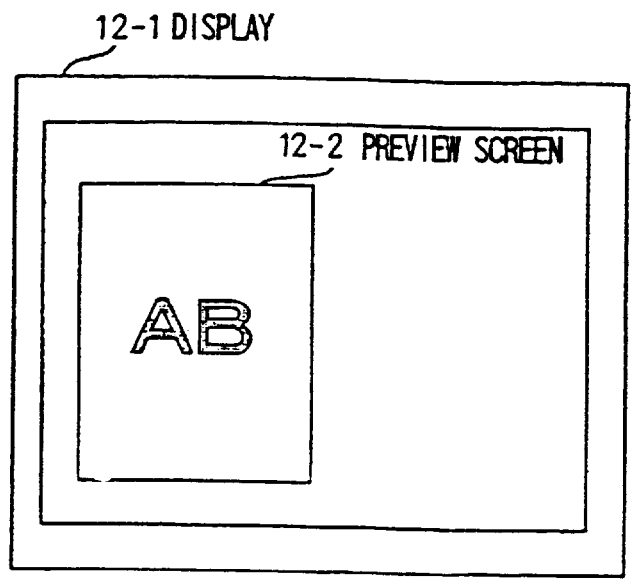
FIG. 12 shows an example of a preview screen display when toner save mode is set in the sixth embodiment of the invention.
Figure 13:
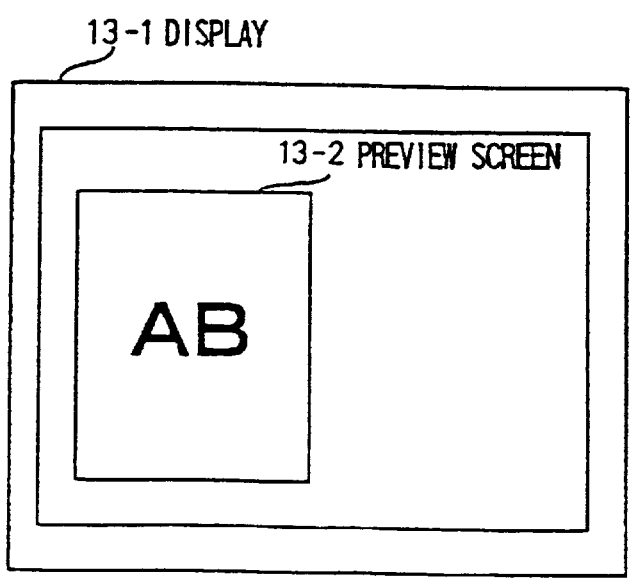
FIG. 13 shows an example of the preview screen display when the toner save mode is not set in the sixth embodiment of the invention.

FIG. 10 is a block diagram of a software system of a computer according to a sixth embodiment of the invention, in which the print preview processor 2-13 in the print support software 2-9 of FIG. 2 and the print preview processor 8-11 in the print support software 8-8 of FIG. 8 are commonly detailed. FIG. 11 is a processing flowchart of the sixth embodiment of the invention. FIGS. 12 and 13 represent preview screens in the case of being set at toner save mode used in the sixth embodiment when the toner save mode is set and when the toner save mode is not set, respectively.

Now, the sixth embodiment will be described below. In the system of the first embodiment, an overlapping part between the print settings in the application 2-1, 8-1 and the print settings in the printer driver 2-16, 8-19 is extracted, and then the overlapping print settings are unified. Since the unified print setting is stored in the general printing information memory 2-14, 8-16 in the print support software 2-9, 8-8, in the case of displaying the preview screen, preview screen data is generated by using the print setting data in the general printing information memory 2-14, 8-16 and the document data in the application 2-1, 8-1. Displaying of the preview screen will be described by referring to FIGS. 11 to 13.

In FIG. 10, a print preview processor 10-1 executes an output processing of a preview screen on a display in printing operation. A preview data developing unit 10-2 develops print setting data and document data obtained from a data processor 10-5 to generate preview screen displaying data.

A density processor 10-3 judges presence or absence of the toner save mode setting from the preview screen displaying data received from the preview data developing unit 10-2, and adjusts the density of characters, to thereby update the preview screen displaying data. A display 10-4 displays the preview screen displaying data obtained from the density processor 10-3 in the manner that the user can visually recognize. The data processor 10-5 reads the print setting data and the document data from the interface with the application, and the print setting data from the interface with the printer driver, and extracts an overlapping part between each print setting data, then unifies the overlapping printing settings.

In FIG. 11, first, at step 11-1, the unified print setting data and the document data are read into the preview data developing unit 10-2 in the print preview processor 10-1 from the data processor 10-5 in the print support software shown in FIG. 10. The preview data developing unit 10-2 receives the document data and the print setting data from the data processor 10-5 and develops them into the preview data in the same manner as the conventional preview display process.

Next, at step 11-2, whether the toner save mode in the print setting data is set is judged in the preview data developing unit 10-2. When the toner save mode is set, the flow proceeds to step 11-3, where information to reduce the density of characters is added to the preview data.

In FIG. 10, the preview data generated by the preview data developing unit 10-2 is read into the density processor 10-3. When the toner save mode is set, information to reduce the density of characters is added at the density processor 10-3, and then the preview data is updated. On the contrary, when the toner save mode is not set, the flow proceeds to step 11-4 and the conventional preview data to which no information is added is generated. In other words, no manipulation is executed in the density processor 10-3 in FIG. 10.

At step 11-5, a preview screen is displayed based on the preview data obtained at step 11-3 and step 11-4. In FIG. 10, the preview data in the density processor 10-3 is sent to the display 10-4 and the preview screen is displayed.

FIGS. 12 and 13 show examples of the preview screen display when the toner save mode is set and when the toner save mode is not set, respectively. A preview screen 12-2, 13-2 is displayed on a display 12-1, 13-1, in which the document on the preview screen 12-2, 13-2 is displayed paler when the toner save mode is set than when the toner save mode is not set.

[Seventh Embodiment]

Now, the seventh embodiment of the invention will be described. In the system of the first embodiment, an overlapping part of the print settings between the application and the printer driver is extracted, and then the overlapping print settings are unified. Since the unified print setting is stored in the general printing information memory 2-14, 8-16 in the print support software 2-9, 8-8, in the case of displaying the preview screens, preview screen data is generated by using the print setting data in the general printing information memory and the document data in the printing data memory 2-21, 8-6 of the application.

Figure 14:
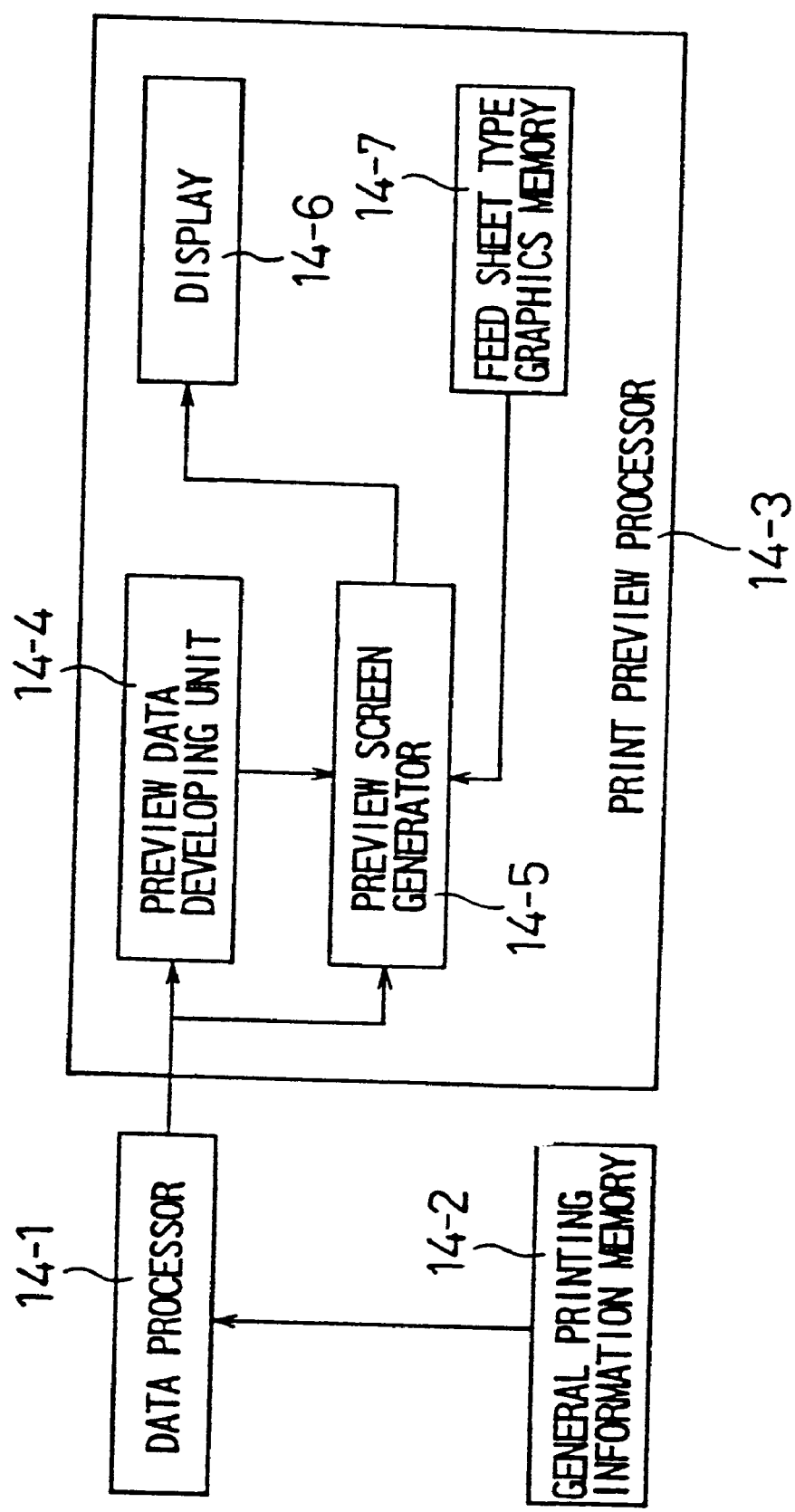
FIG. 14 is a block diagram showing a part of a software system of a computer according to a seventh embodiment of the invention.
Figure 15:
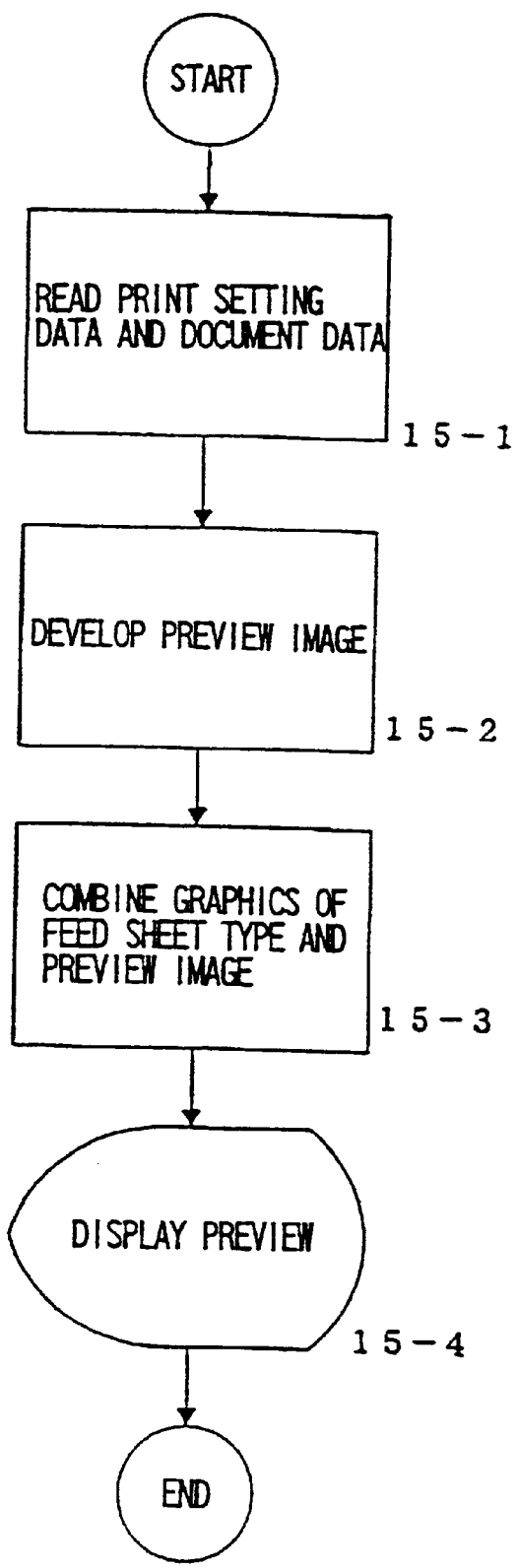
FIG. 15 is a flowchart of the seventh embodiment of the invention.

Displaying of the preview screen will be described by referring to a block diagram of FIG. 14 and a flowchart of FIG. 15. FIG. 14 is a detailed diagram with respect to the print preview processor 2-13, 8-11 of the print support software in FIGS. 2 and 8. FIG. 15 is a flowchart from receiving the data to be previewed at the print preview processor to displaying the preview.

A data processor 14-1 is the same as the data processor 2-11, 8-10, and controls input/output of the print preview processor. A general printing information memory 14-2 unifies and stores the print settings of the application and those of the printer driver.

A print preview processor 14-3 displays the print preview using the document data of the application and the print setting data of the general printing information memory 14-2. A preview data developing unit 14-4 carries out the same preview image developing process as conventionally executed. A preview screen generator 14-5 combines graphics data pre-stored in a feed sheet type graphics memory 14-7 and the preview screen data developed at the preview data developing unit 14-4 according to feed sheet setting data of each page. The combined image data is displayed on a display 14-6.

In FIG. 15, at step 15-1, the preview data developing unit 14-4 receives the document data stored in the printing data memory 2-21, 8-6 of the application and the unified print setting data from the general printing information memory 14-2 via the data processor 14-1 of the print support software. At step 15-2, the preview data developing unit develops the received data into preview image data in the same manner as the conventional preview data developing process, and sends it to the preview screen generator 14-5.

At step 15-3, the feed sheet type graphics data pre-stored in the feed sheet type graphics data memory 14-7 and the preview image data developed at step 14-2 are combined at the preview screen generator 14-5. The preview screen generator 14-5 receives the feed sheet type setting data of each page from the general printing information memory 14-2 via the data processor 14-1 of the print support software, and combines the received data with corresponding feed sheet type graphics data thereby generating the preview image. The generated data is sent to the display 14-6, and then the preview image is displayed at step 15-4.

Figure 16:
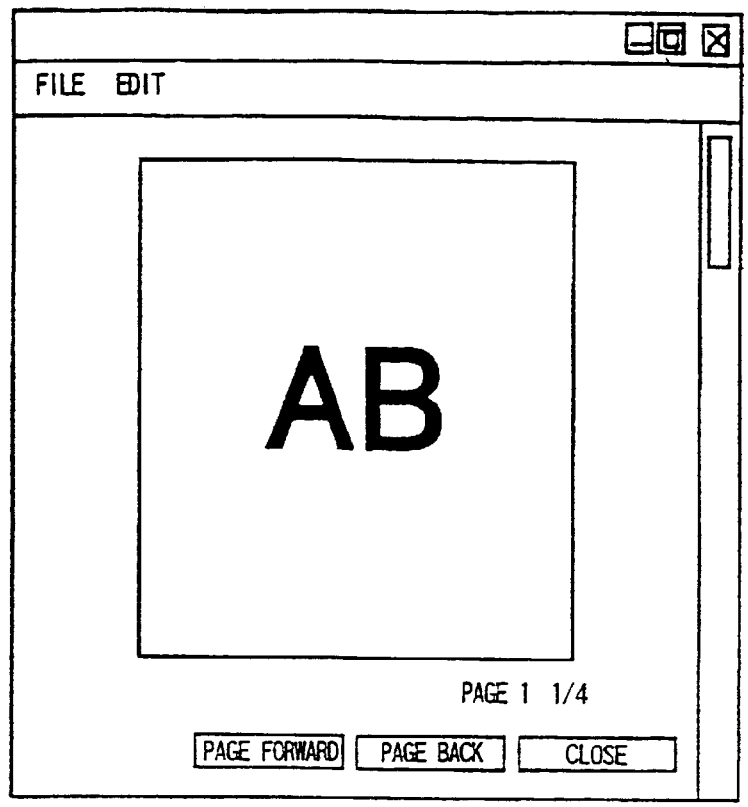
FIG. 16 shows an example of a preview display in the seventh embodiment of the invention.
Figure 17:
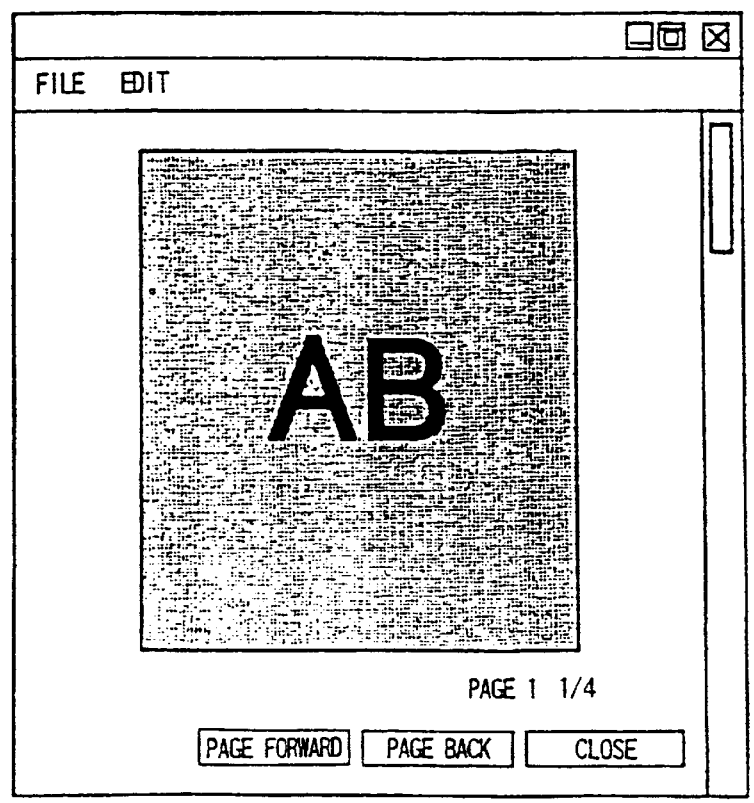
FIG. 17 shows an example of the preview display in the seventh embodiment of the invention.
Figure 18:
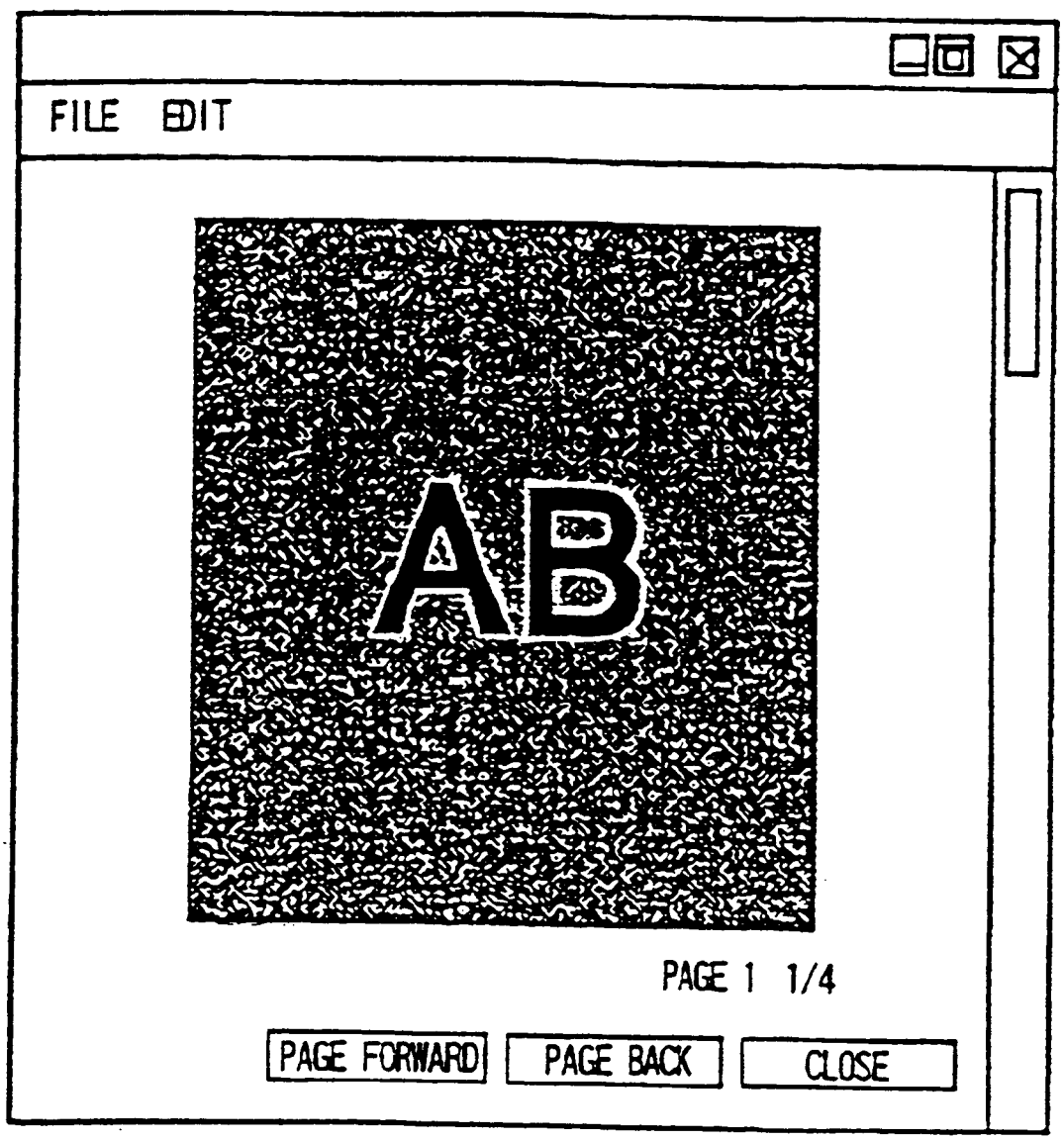
FIG. 18 shows an example of the preview display in the seventh embodiment of the invention.

As the comparative examples, FIG. 16 shows the conventional preview image in which the feed sheet type is not displayed, FIG. 17 shows an example of the preview image which is generated according to the designation of color sheet, and FIG. 18 shows an example of the preview image which is generated according to the designation of recycled sheet. As is apparent from these examples, the difference in the feed sheet type is represented by the difference of the background of each page previewed on the preview screen, so that the setting of feed sheet is easily recognized. For other types of feed sheet, the graphics of each feed sheet type is pre-stored for clarifying characteristics of each feed sheet, which results that the difference in feed sheet type is easily confirmed on the preview screen.

[Eighth Embodiment]

Now, the eighth embodiment of the invention will be described. In the system of the first embodiment, an overlapping part of the print settings between the application and the printer driver is extracted, and then the overlapping print settings are unified. The unified print setting is stored in the general printing information memory 2-14, 8-16 in the print support software 2-9, 8-8. Therefore in displaying the preview screens, preview screen data is generated by using the print setting data in the general printing information memory and the document data in the printing data memory 2-21, 8-6 of the application.

Figure 19:
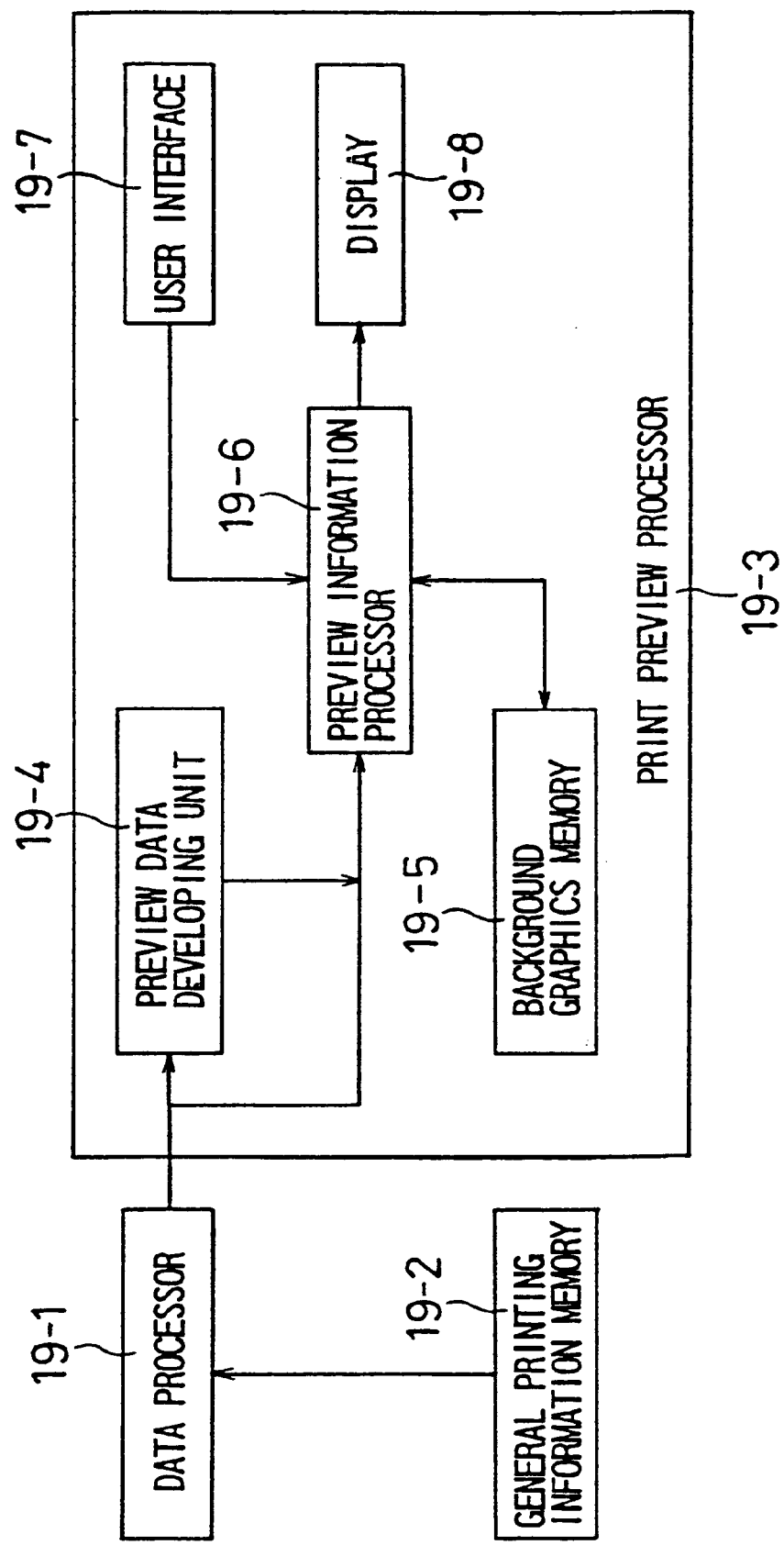
FIG. 19 is a block diagram of a part of a software system of a computer according to an eighth embodiment of the invention.
Figure 20:
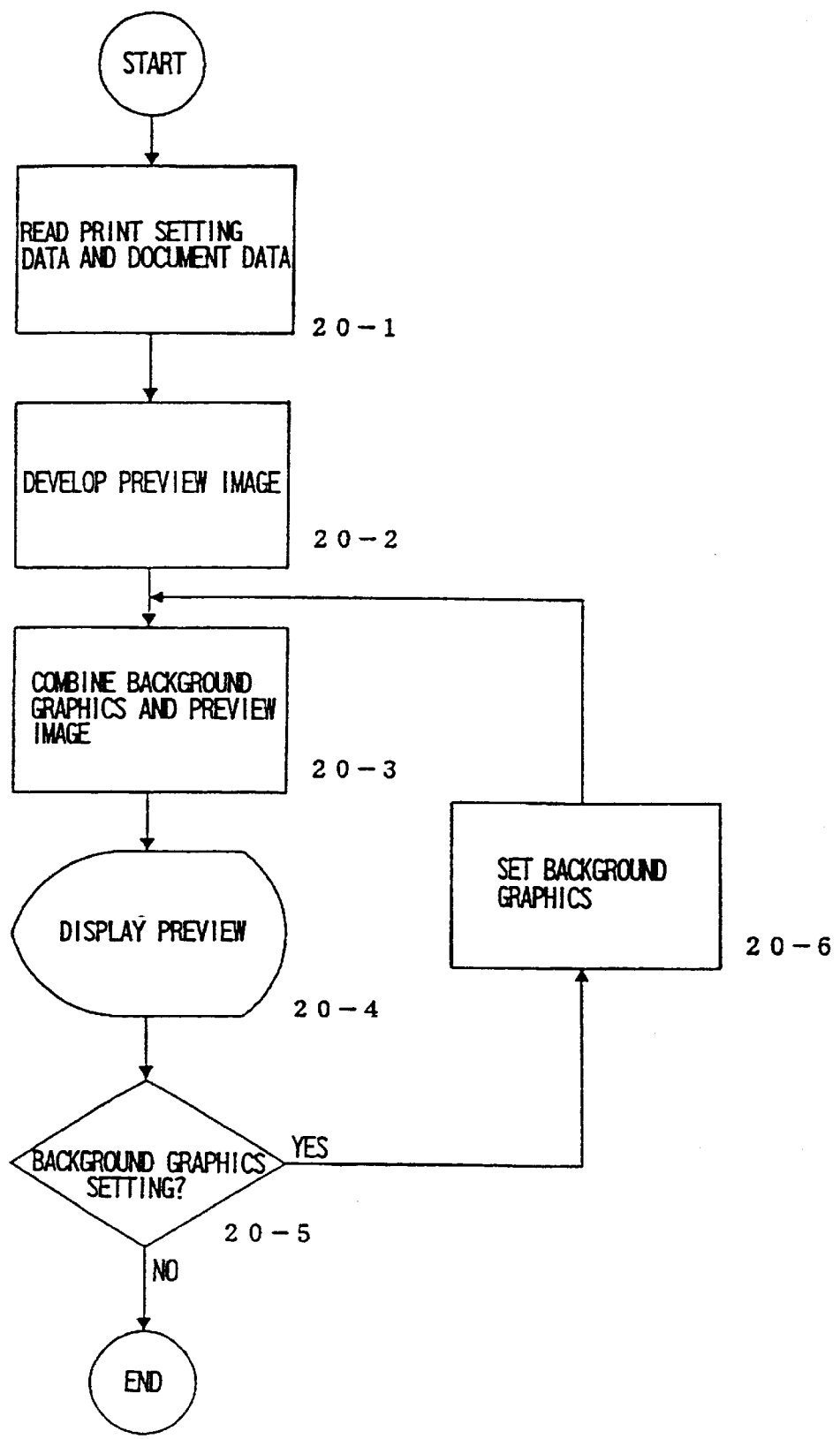
FIG. 20 is a flowchart of the eighth embodiment of the invention.

Displaying of the preview screen will be described by referring to a block diagram of FIG. 19 and a flowchart of FIG. 20. FIG. 19 is a detailed diagram with respect to the print preview processor 2-13, 8-11 of the print support software in FIGS. 2 and 8. FIG. 20 is a flowchart from receiving the data to be previewed at the print preview processor to displaying the preview.

A data processor 19-1 is the same as the data processor 2-11, 8-10, and controls input/output of the print preview processor. A general printing information memory 19-2 unifies and stores the print settings of the application and those of the printer driver.

A print preview processor 19-3 displays and manipulates the print preview using the document data of the application and the print setting data of the general printing information memory 19-2. A preview data developing unit 19-4 carries out the same process as the conventional preview image developing process. A preview information processor 19-6 combines graphics data preset in a background graphics memory 19-5 and the preview image data developed by the preview data developing processor 19-4 according to the feed sheet setting data of each page. The combined image data is to be displayed on a display 19-8. When changing the setting of background graphics, input is made from a user interface 19-7, and the input change is then stored in the background graphics processor 19-5 via the preview information processor 19-6.

In FIG. 20, at step 20-1, the preview data developing unit 19-4 receives the document data stored in the printing data memory 2-21, 8-6 of the application and the unified print setting data from the general printing information memory 19-2 via the data processor 19-1 in the print support software. Then at step 20-2, the preview data developing unit 19-4 develops the received data to the preview image data in the conventional manner, and sends it to the preview information processor 19-6.

At step 20-3, the preview information processor 19-6 combines the background graphics of the feed sheet type and the preview image data developed at step 20-2 according to the setting of the background graphics set for each tray. The preview information processor 19-6 receives the feed tray setting data of each page from the general information processor 19-2 via the data processor 19-1 of the print support software and combines the feed tray setting data of each tray with the corresponding background graphics data stored in the background graphics processor 19-5. At step 20-4, the combined data is sent to the display 19-8 which displays a preview. At step 20-5, the user selects either setup of background graphics or end of processing while observing the displayed preview screen.

Figure 22:
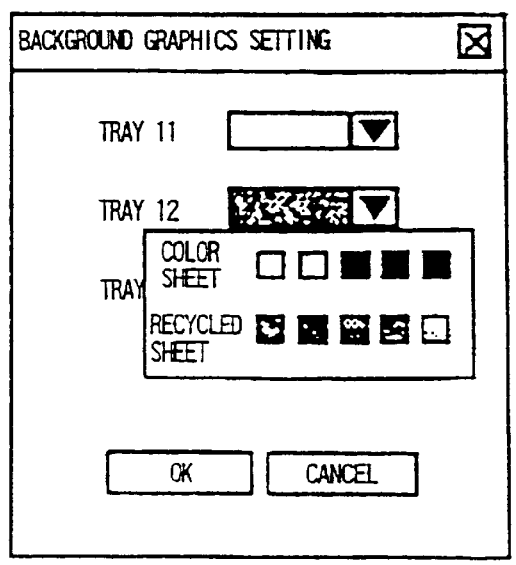
FIG. 22 shows an example of a background graphic setting in the eighth embodiment of the invention.

When the user selects the end of processing, the flow proceeds to "END", or on the other hand when the user selects the setup of background graphics, the flow proceeds to step 20-6 where the background graphics is set on the setting screen as shown in FIG. 22. The change in setting is stored in the background graphics processor 19-5, and then the flow returns to step 20-3 where the preview image is recombined according to the changed setting and then displayed.

Figure 21:
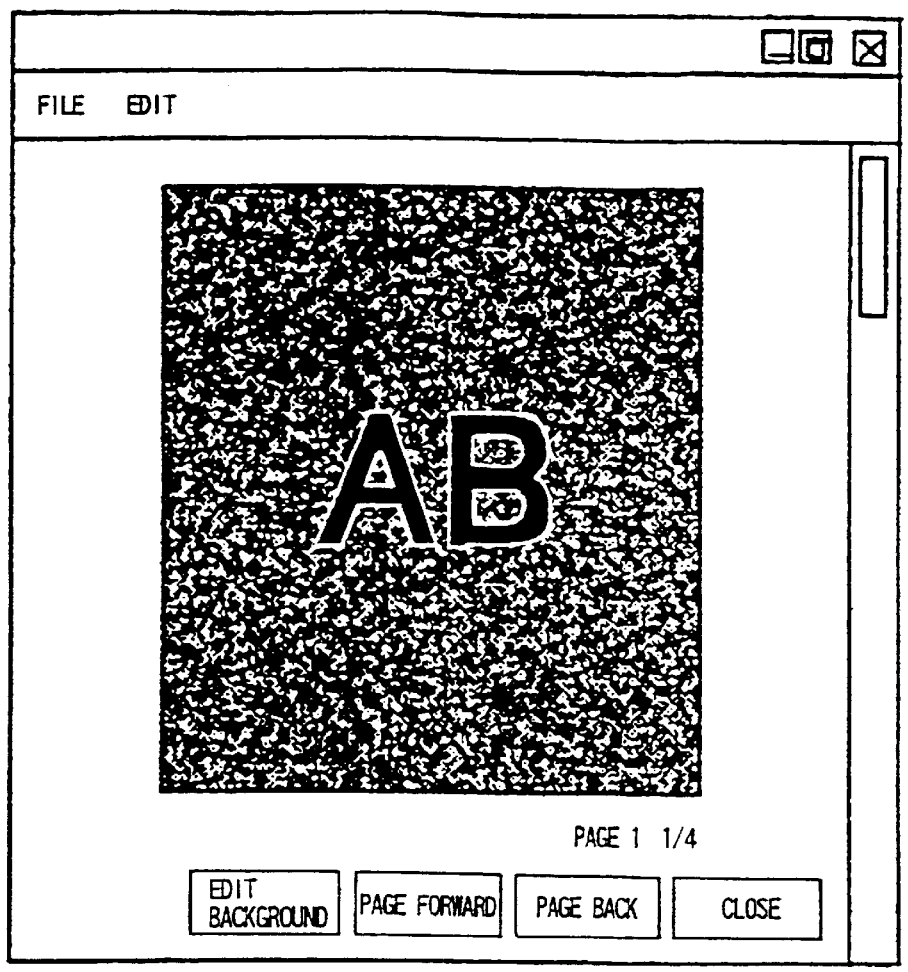
FIG. 21 shows an example a preview display in the eighth embodiment of the invention.

An example where the preview image is generated by designating the sheet feed tray is shown in FIG. 21. In FIG. 21, on clicking a background edit icon, the setting screen of background graphics shown in FIG. 22 is displayed. By using this setting screen, the user can make a background graphics setting for each tray. In this example, the setting of tray 12 is subjected to change.

In this way, by allowing the user to set the difference in feed sheet type for each page in a easy-to-understood manner, setting operation of feed sheet becomes more user-friendly. Moreover, in the case of preprinted forms, by allowing the user to register the print patterns thereof, similar process is enabled and setting of feed sheet becomes more user-friendly. For other feed sheet types, the same process can be executed.

[Ninth Embodiment]

Figure 23:
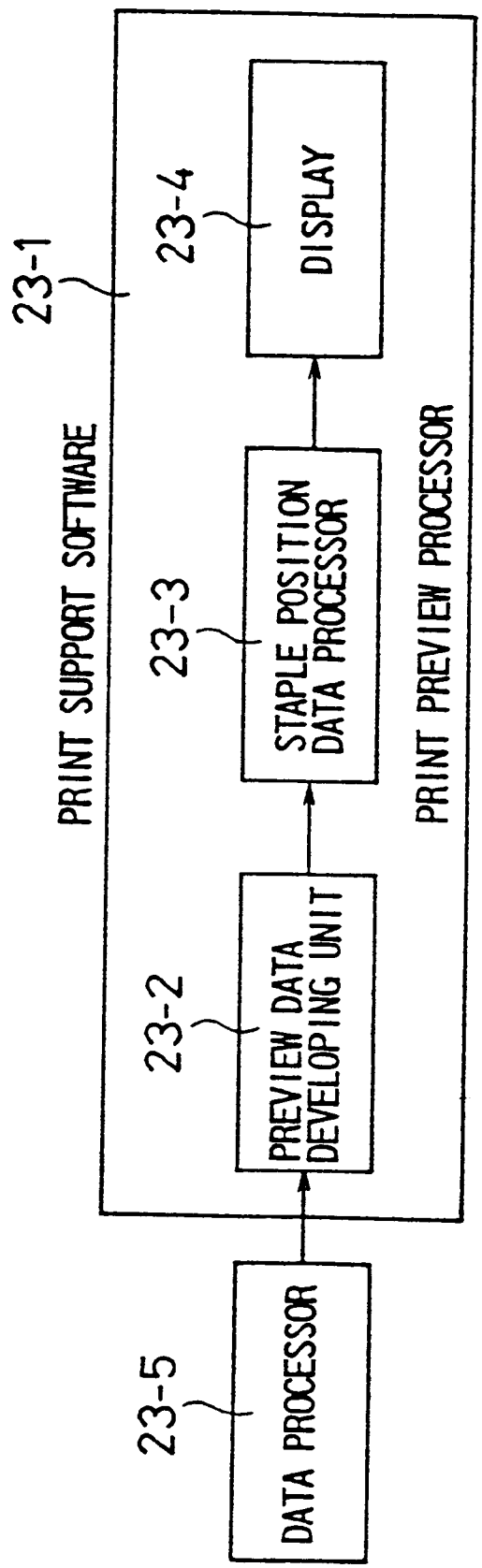
FIG. 23 is a block diagram of a software system according to a ninth embodiment of the invention.
Figure 24:
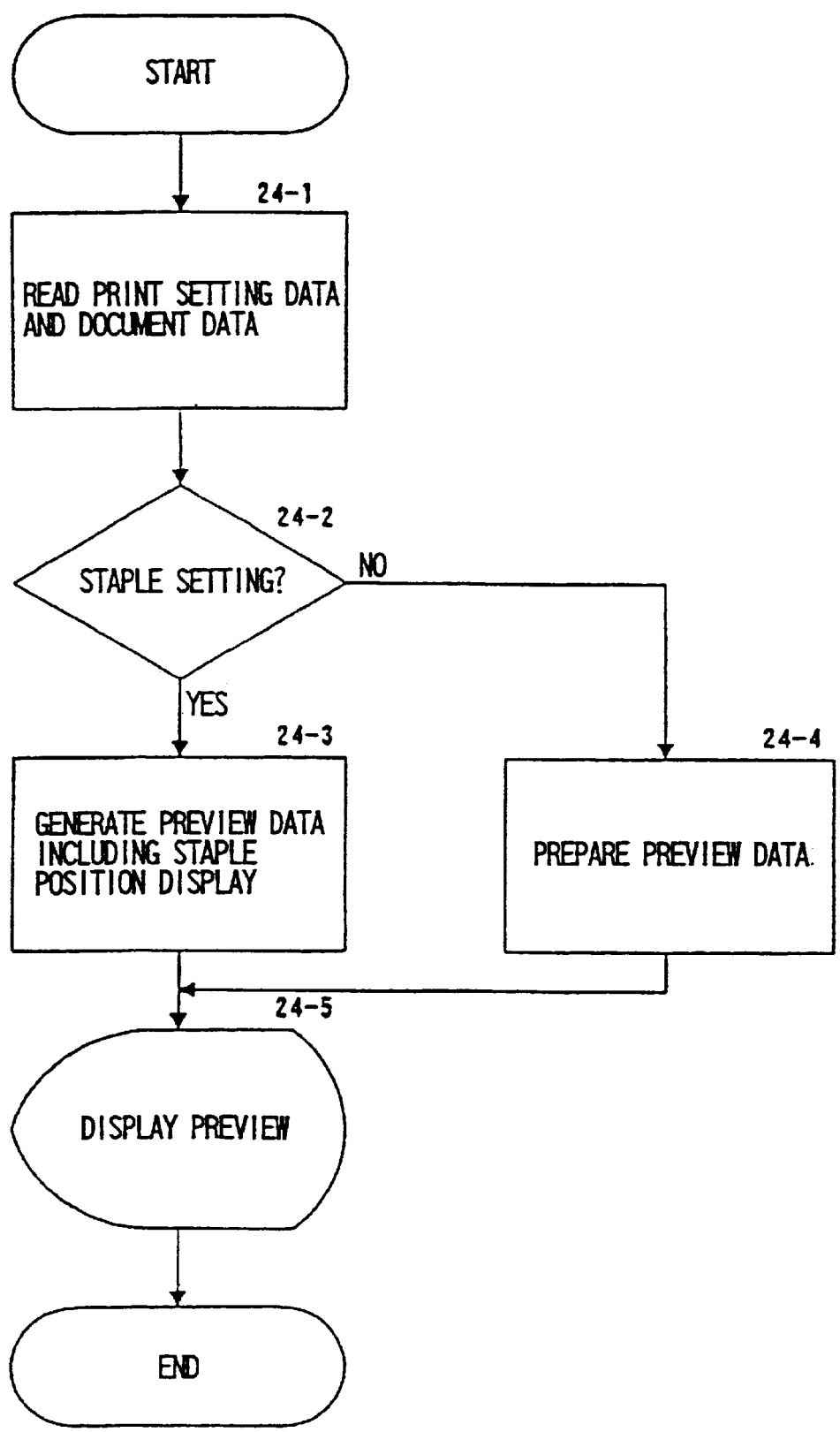
FIG. 24 is a flowchart of the ninth embodiment of the invention.
Figure 25:
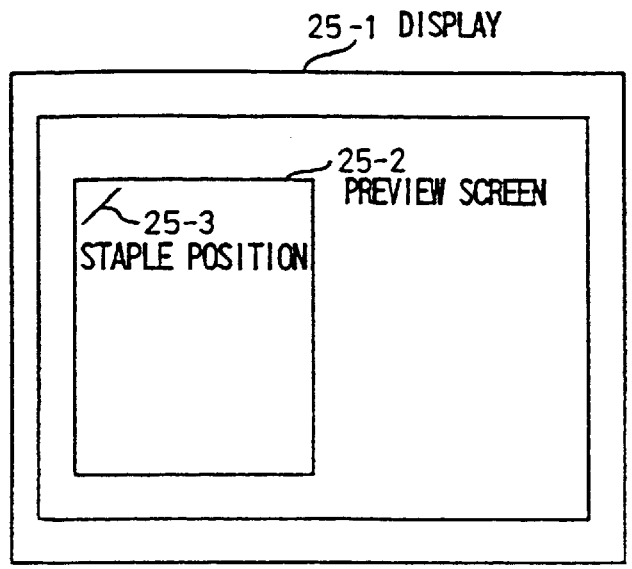
FIG. 25 shows an example of a preview screen display when stapling is set in the ninth embodiment of the invention.
Figure 26:
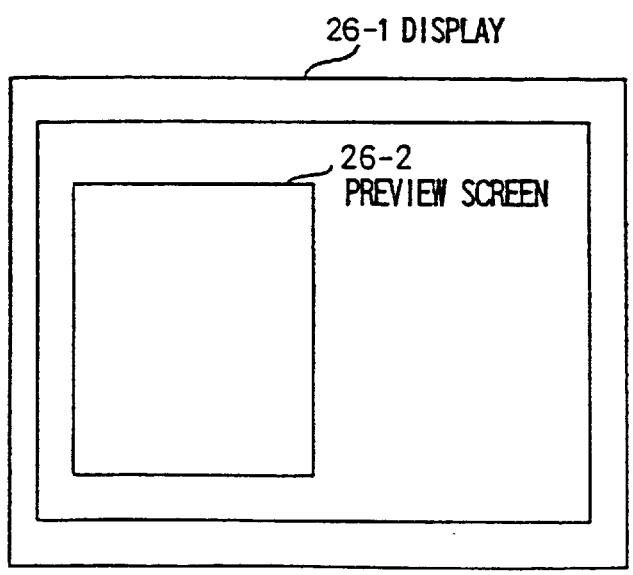
FIG. 26 shows an example of the preview screen display when the stapling is not set in the ninth embodiment of the invention.

FIG. 23 is a block diagram of a software system of a computer according to the ninth embodiment of the invention, in which the print preview processor 2-13, 8-11 in the print support software 2-9, 8-8 of FIGS. 2 and 8 is detailed. FIG. 24 is a processing flowchart of the ninth embodiment of the invention. FIGS. 25 and 26 show examples of the preview screen display in the cases where the stapling is set and where the stapling is not set, respectively.

Now, the ninth embodiment will be described. In the system of the first embodiment, an overlapping part is extracted between the print settings of the application 2-1, 8-1 and the print settings of the printer driver 2-16, 8-19, and the overlapped print settings are unified. As the unified setting is stored in the general printing information memory 2-14, 8-16, in the case of displaying the preview screen, the preview screen data is generated by using the print setting data in the general printing information memory 2-14, 8-16 and the document data of the application 2-1, 8-1. Displaying of the preview will be described by referring to FIGS. 23 to 26.

In FIG. 23, a print preview processor 23-1 carries out a process of outputting a preview screen on a display in printing operation. A preview data developing unit 23-2 develops the print setting data and the document data obtained from a data processor 23-5 to generate preview screen displaying data. A staple position data processor 23-3 judges presence or absence of staple setting on the preview screen displaying data received from the preview data developing unit 23-2, and adds information of staple position display, to thereby update the preview screen displaying data.

A display 23-4 displays the preview screen displaying data obtained from the staple position data processor 23-3 in a form that the user can visually recognize. The data processor 23-5 reads the print setting data and the document data from the interface with the application and the print setting data from the interface with the printer driver, extracts an overlapping part between the both print settings, and unifies the overlapping print settings.

In FIG. 24, first, at step 24-1, the unified print setting data and the document data is read into the preview data developing unit 23-2 in the print preview processor 23-1 from the data processor 23-5 in the print support software of FIG. 23. The preview data developing unit 23-2 receives the document data and the print setting data from the data processor 23-5 in the same manner as the conventional preview display processing, and develops them into the preview data.

Next, at step 24-2, the preview data developing unit 23-2 judges whether stapling is set in the print setting data. When the stapling is set, the flow proceeds to step 24-3 where staple position information is added to the preview data.

In FIG. 23, the preview data generated by the preview data developing unit 23-2 is read into the staple position data processor 23-3, and in the case where a staple position is set, the staple position data processor 23-3 adds the staple position information to each page, thereby updating the preview data.

On the other hand, in the case where the staple position is not set, the flow proceeds to step 24-4 where the conventional preview data to which no information is added is generated. That is, the staple position data processor 23-3 executes no manipulation in FIG. 23.

At step 24-5, a preview screen is displayed based on the preview data obtained at steps 24-3 and 24-4. In FIG. 23, the preview data in the staple position data processor 23-3 is sent to the display 23-4 where the preview screen is displayed.

FIGS. 25 and 26 show examples of the preview screen display in the cases where the stapling is set and where the stapling is not set, respectively. A preview screen 25-2, 26-2 is displayed on a display 25-1, 26-1, respectively. At that time, when the staple position is set, a staple position 25-3 is displayed on the preview screen 25-2.

[Tenth Embodiment]

Figure 27:
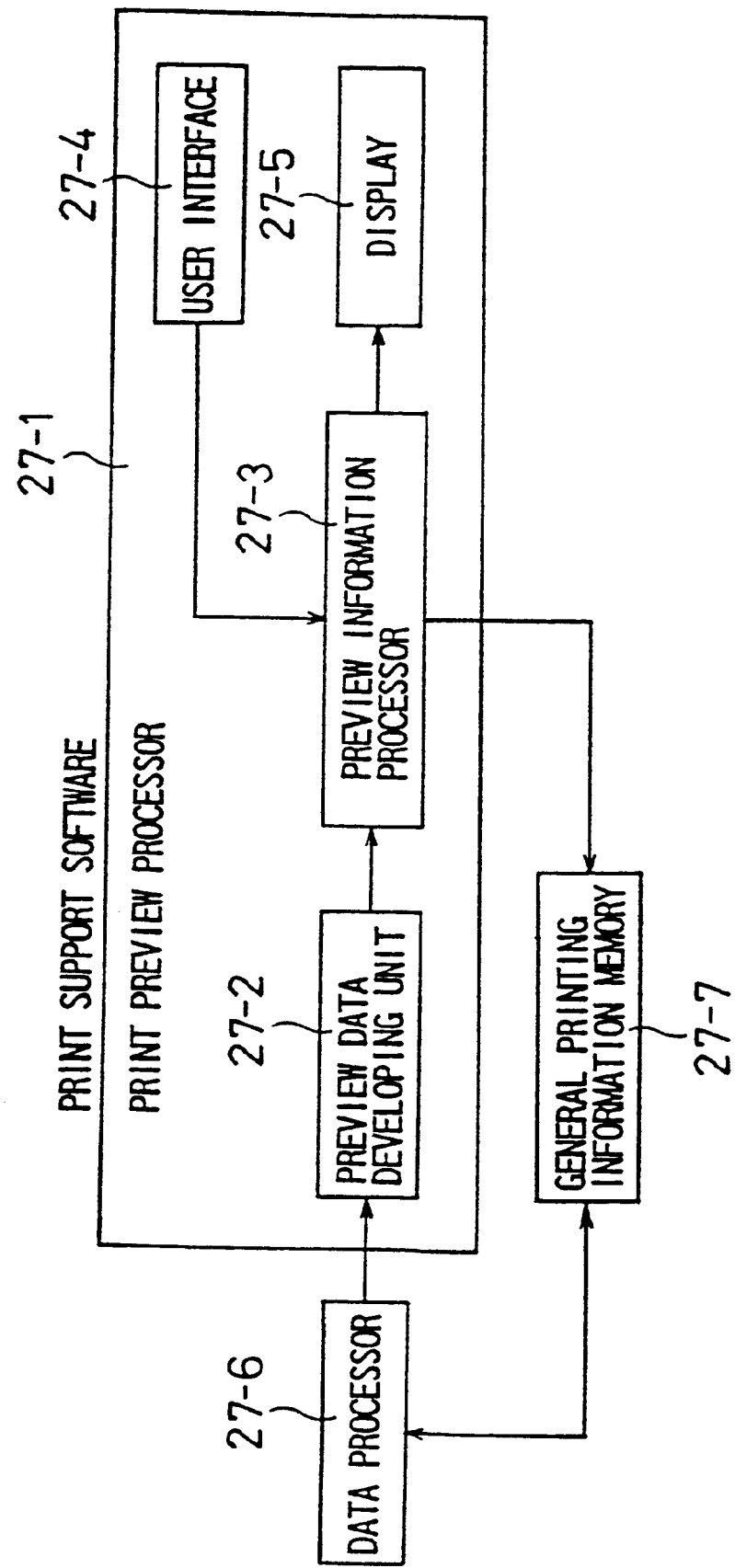
FIG. 27 is a block diagram of a software system according to a tenth embodiment of the invention.
Figure 28:
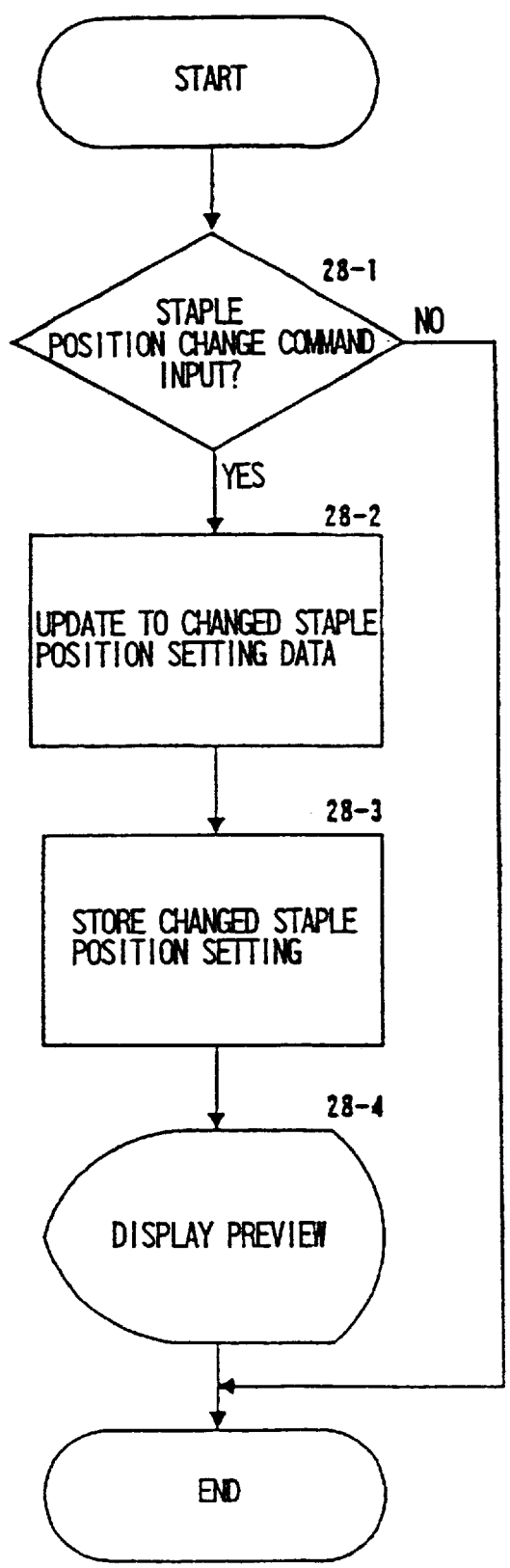
FIG. 28 is a flowchart of the tenth embodiment of the invention.
Figure 29:
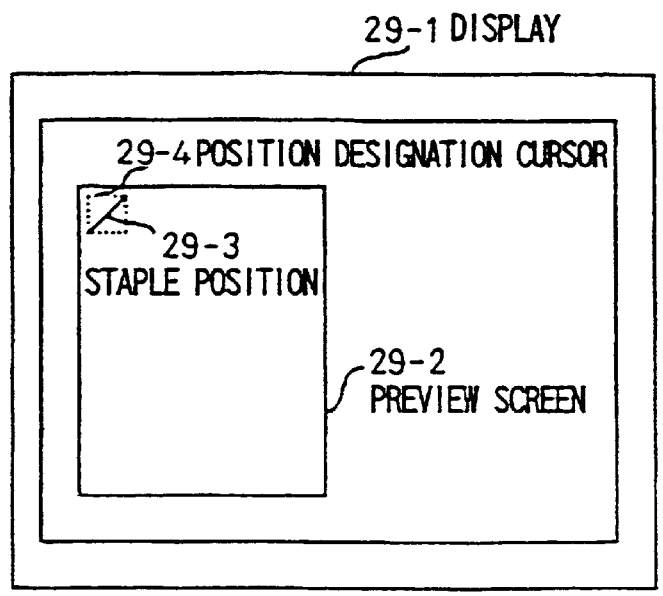
FIG. 29 shows an example of a preview screen display before setting a stapling position in the tenth embodiment of the invention.
Figure 30:
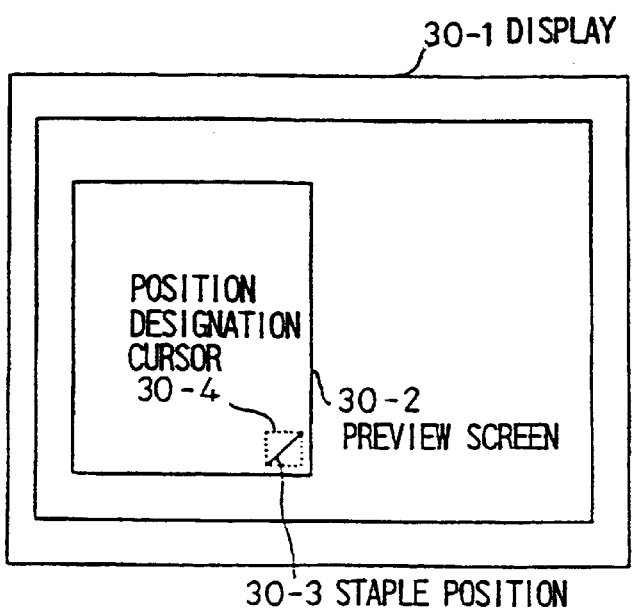
FIG. 30 shows an example of the preview screen display after setting the stapling position in the tenth embodiment of the invention.

FIG. 27 is a block diagram of a software system of a computer according to the tenth embodiment of the invention, in which the print preview processor 2-13, 8-11 in the print support software 2-9, 8-8 of FIGS. 2 and 8 is detailed. FIG. 28 is a processing flowchart of the tenth embodiment of the invention. FIGS. 29 and 30 show examples of the preview screen display before and after the staple position is set on the preview screen, respectively.

Now, the tenth embodiment will be described. In the example of the ninth embodiment, assuming that the preview screen 25-2 is displayed and also the staple position 25-3 is displayed because the stapling is set, editing process in manipulating the staple position 25-3 on the preview screen 25-2 will be described by referring to FIGS. 27, 28, 29 and 30.

In FIG. 27, a print preview processor 27-1 carries out an input/output process of a preview screen on a display in printing operation. A preview data developing unit 27-2 develops print setting data and document data obtained from a data processor 27-6 to generate preview screen displaying data.

A preview information processor 27-3 receives the preview screen displaying data and the print setting data from the preview data developing unit 27-2 and command data inputted by the user from a user interface 27-4, judges whether the command is for changing the staple position, and updates the information of the staple position display, thereby updating the preview screen displaying data and the print setting data.

The user interface 27-4 converts the command inputted by the user with the input device or the like into the command data, and sends the command data to the preview information processor 27-3. A display 27-5 displays the preview screen displaying data obtained from the preview information processor 27-3 in the form that the user can realize visually. The data processor 27-6 reads the print setting data and the document data from the interface with the application, and the print setting data from the interface with the printer driver, extracts an overlapping part between the print settings of each print setting data, and unifies the overlapping print settings. The data processor 27-6 sends/receives the unified print setting data to/from a general printing information memory 27-7.

The general printing information memory 27-7 stores the unified print setting data, and in the case where the staple position setting change command is issued from the user interface 27-4, receives and stores the updated print setting data from the preview information processor 27-3. The general printing information memory 27-7 also sends the print setting data stored therein to the data processor 27-6 as necessary.

The flowchart in FIG. 28 starts from the time when a command is inputted on a preview screen 29-2 on which a staple position 29-3 is displayed according to the staple setting in the ninth embodiment First, at step 28-1, whether the command inputted on the preview screen 29-2 is for changing the staple position 29-3 is judged. The command is inputted to the user interface 27-4 of the print preview processor 27-1 in the print support software by directly manipulating the preview screen 29-2. The command is judged at the preview information processor 27-3 as to what is the command for. When it is judged the command is not for changing the staple position 29-3, the process ends without performing any manipulations.

When it is judged that the command is for changing the staple position 29-3 is updated to the changed one, the flow proceeds to step 28-2 where the changed staple position 29-3 data is updated. In FIG. 27, the preview information processor 27-3 pre-stores the preview data before changing the staple position 29-3 obtained from the preview data developing unit 27-2. The staple position 29-3 data is changed into new one in the preview information processor 27-3, thereby updating the preview data.

Next, at step 28-3, the changed setting data of the staple position 29-3 in the preview information processor 27-3 is sent to the general printing information memory 27-7 where the setting of the staple position 29-3 is stored. Next, at step 28-4, the updated preview data in the preview information processor 27-3 is sent to the display 27-5 where a preview screen 30-2 under an updated staple position 30-3 is displayed.

FIGS. 29 and 30 show examples of preview screens before and after setting the staple position on the preview screen, respectively.

In FIG. 29, the user designates the staple 29-3 whose position that he/she desires to change on the preview screen 29-2 using the input device. The designated staple is specified by a position designation cursor 29-4. The user moves the position designation cursor 29-4 to a desired position on the preview screen and designates it by using the input device. As a result, the staple position 30-3 moves on the preview screen 30-2 as shown in FIG. 30 while the staple position 30-3 data is updated. In this setting operation, the staple position 29-3 of every page on the document is changed at once regardless of the page on which the staple position 29-3 is changed.

[11th Embodiment]

Figure 31:
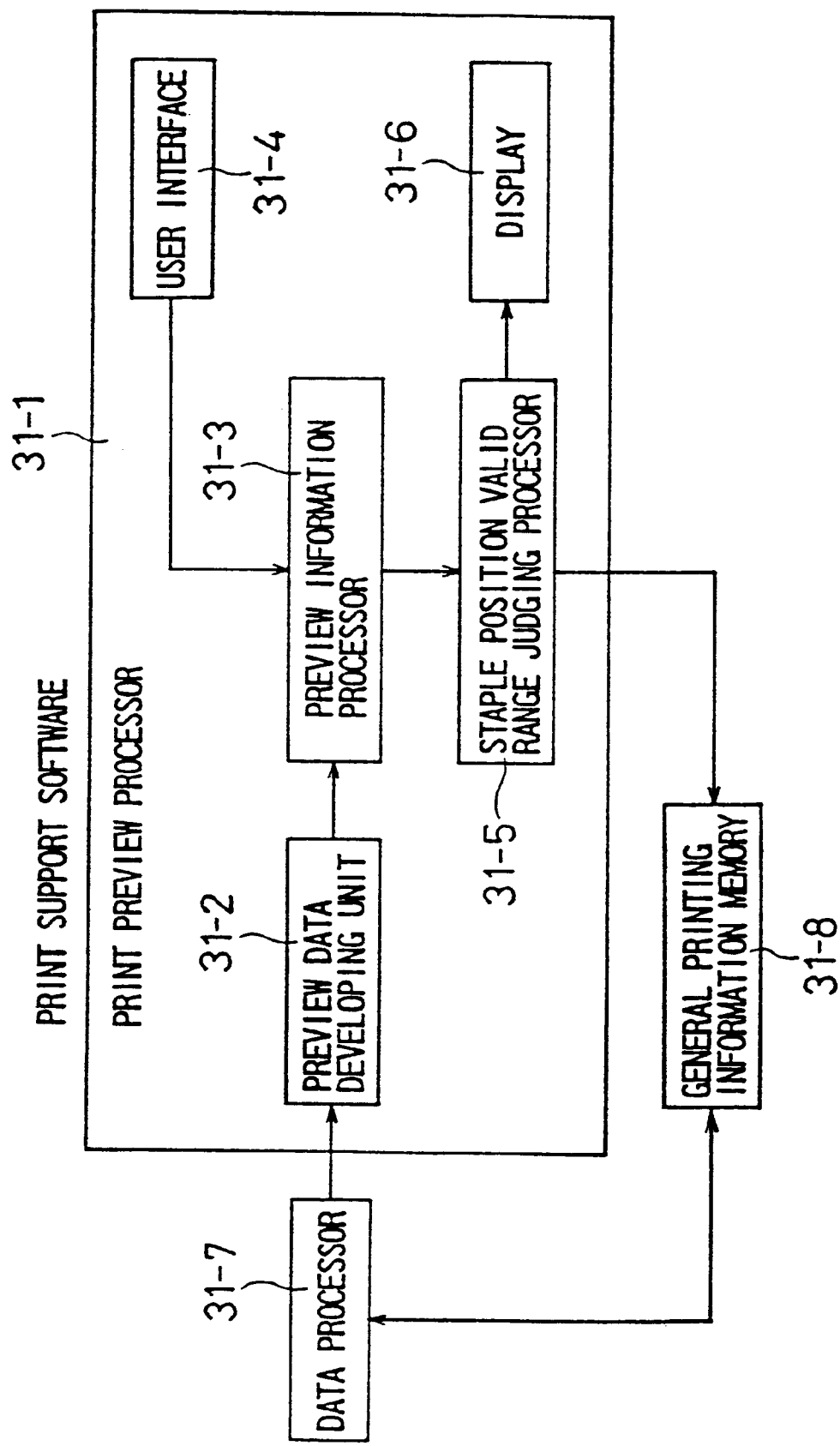
FIG. 31 is a block diagram of a software system according to an 11th embodiment of the invention.

FIG. 31 is a block diagram of a software system of a computer according to the 11th embodiment of the invention, in which the print preview processor 2-13, 8-11 of the print support software 2-9, 8-8 in FIGS. 2 and 8 is detailed.

Figure 32:
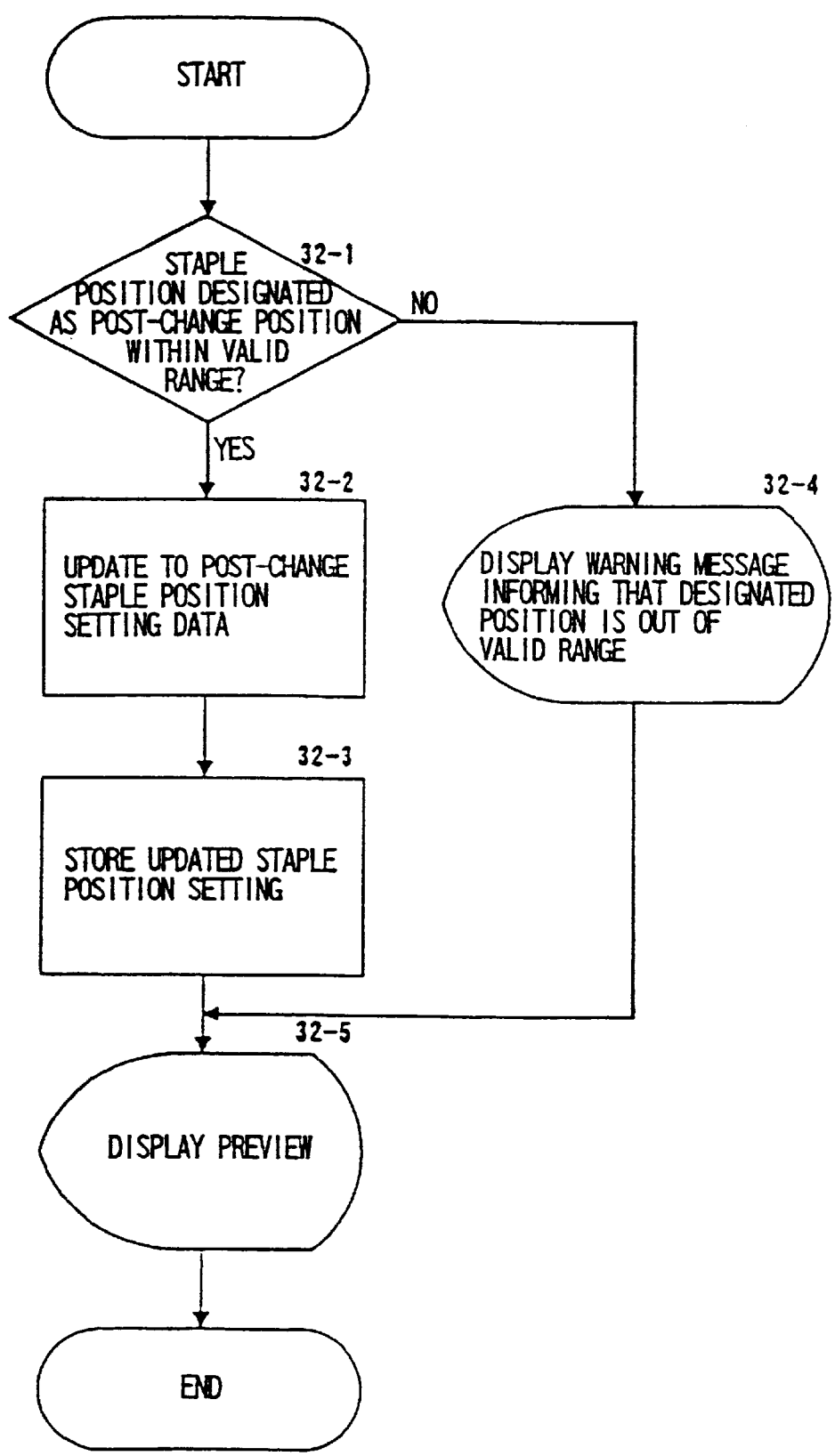
FIG. 32 is a flowchart of the 11th embodiment of invention.
Figure 33:
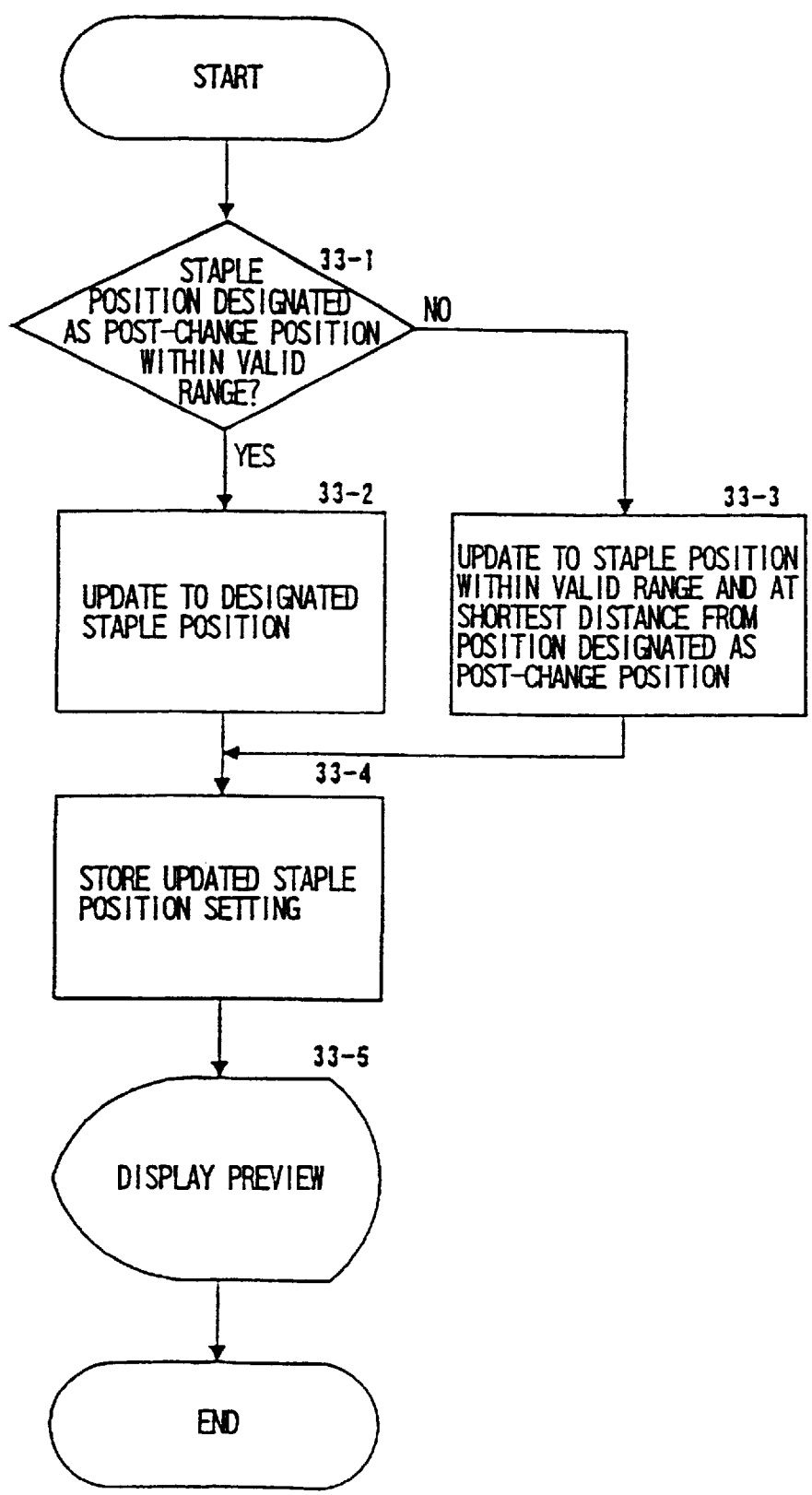
FIG. 33 is another flowchart of the 11th embodiment of the invention.
Figure 34:
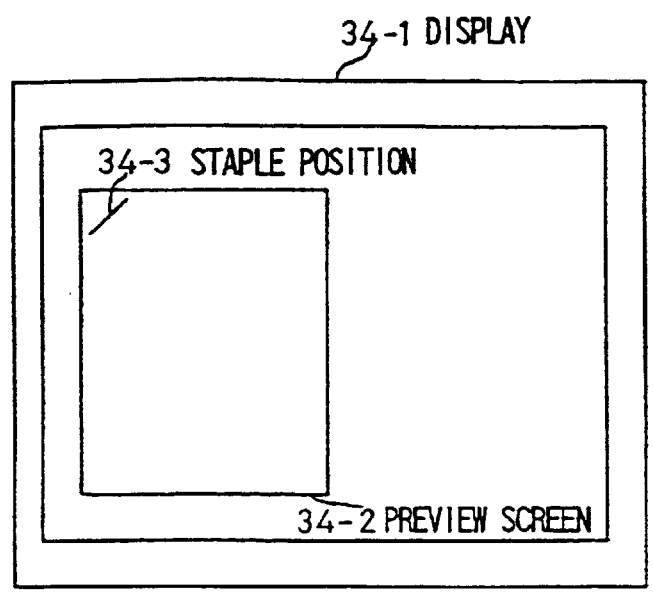
FIG. 34 shows an example of a preview screen display before moving a stapling position in the 11th embodiment of the invention.
Figure 35:
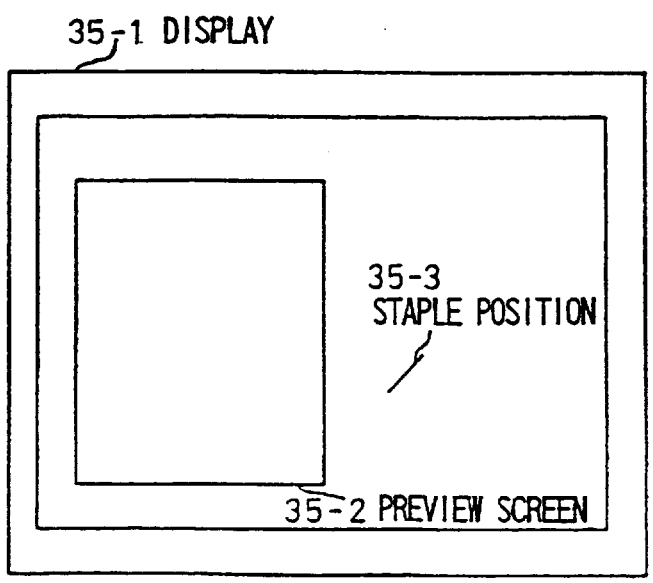
FIG. 35 shows an example of the preview screen display after moving the stapling position to an invalid range in the 11th embodiment of the invention.
Figure 36:
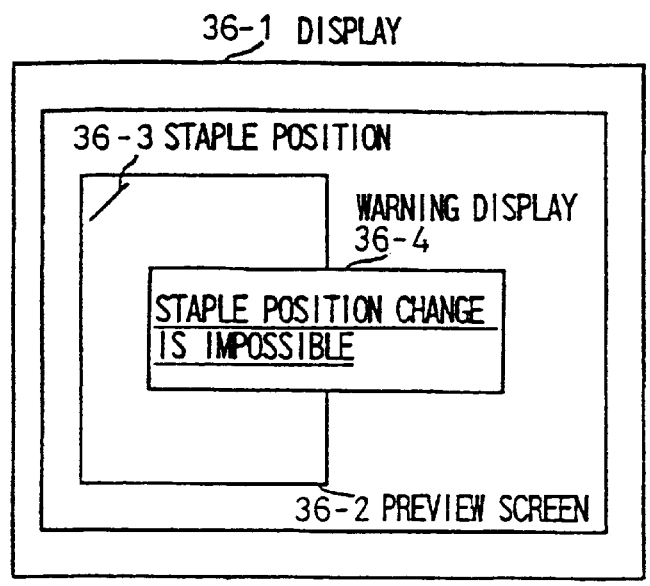
FIG. 36 shows an example of a warning display on the preview screen informing that the stapling position has moved to the invalid range in the 11th embodiment of the invention.
Figure 37:
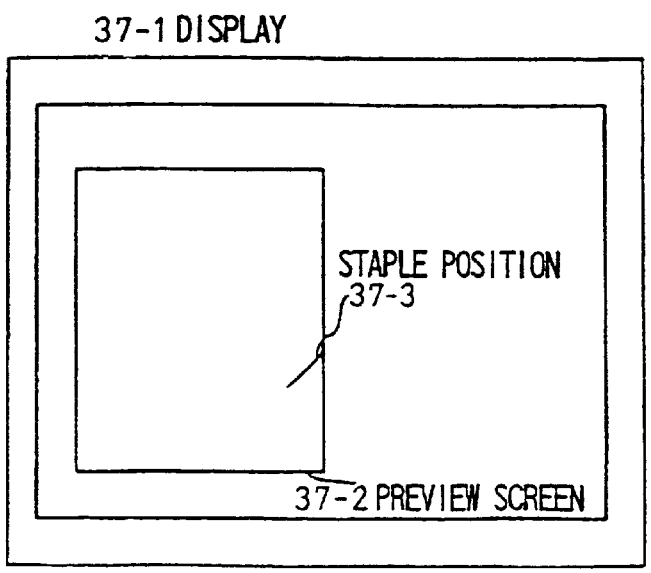
FIG. 37 shows an example of the preview screen display after moving the stapling position to the closest position within a valid range in the 11th embodiment of the invention.

FIG. 32 is a processing flowchart of the 11th embodiment, and FIG. 33 is another processing flowchart of the 11th embodiment of the invention. FIG. 34 shows an example of the preview screen before moving the staple position in the 11th embodiment of the invention. FIG. 35 shows an example of the preview screen when the staple position is moved to an invalid range in the 11th embodiment of the invention. FIG. 36 shows an example of a warning display on the preview screen for informing that the staple position has moved into the invalid range. FIG. 37 shows an example of the preview screen when the staple position is moved to the closest position within a valid range in the 11th embodiment of the invention.

Now, the 11th embodiment of the invention will be described below. Under the situations where the preview screen 25-2 is displayed, and the staple position is displayed because the stapling is set in the ninth embodiment, and where the staple position 29-3 which is to be changed on the preview screen 29-2 is selected and the after-change position 30-3 is designated, whether the after-change staple position is designated within the valid range is judged. The methods for proper operations are described by referring to FIGS. 31, 32, 33, 34, 35, 36 and 37.

In FIG. 31, a print preview processor 31-1 carries out an input/output process of a preview screen on a display in printing operation. A preview data developing unit 31-2 develops print setting data and document data obtained from a data processor 31-7 to generate preview screen displaying data. A preview information processor 31-3 receives the preview screen displaying data and the print setting data from the preview data developing unit 31-2 and command data inputted by the user from a user interface 31-4, judges whether the command is for changing the staple position, and updates the information of staple position display, thereby updating the preview screen displaying data and the print setting data. The user interface 31-4 converts the command inputted by the user using the input device or the like into the command data, and sends the command data to the preview information processor 31-3.

A staple position valid range judging processor 31-5 judges whether the staple position setting data is set within the valid range in the print setting data obtained from the preview information processor 31-3, updates the information of staple position display, thereby updating the preview screen displaying data and the print setting data.

A display 31-6 displays the preview screen displaying data obtained from the staple position valid range judging processor 31-5 in the form that the user can visually recognize. The data processor 31-7 reads the print setting data and the document data from the interface with the application, and the print setting data from the interface with the printer driver, extracts an overlapping part between the print settings of each print setting data, and unifies the overlapping print settings. Then the data processor 31-6 sends/receives the unified print setting data to/from a general printing information memory 31-8.

The general printing information memory 31-8 stores the unified print setting data, and in the case where the staple position setting change command is issued from the user interface 31-4 and the updated staple position is within the valid range, receives and stores the updated print setting data from the staple position valid range judging processor 31-5. The general printing information memory 31-8 also sends the print setting data stored therein to the data processor 31-7 as necessary.

The flowcharts in FIGS. 32 and 33 start from the time when a change command for changing the staple position is inputted by moving the staple 29-3 on the preview screen where the staple position 25-3 is displayed because of the staple position setting.

Now, description will be made by referring to the flowchart in FIG. 32. At step 32-1, whether an after-change staple position 35-3 in the change command for a staple position 34-3, which is inputted on a preview screen 34-2, is within the valid range on a preview screen 35-2 is judged. In FIG. 31, a command is inputted to the user interface 31-4 of the print preview processor 31-1 in the print support software by manipulating the preview screen 34-2 directly. The command is judged in the preview information processor 31-3 as to what is the command for. In this case, it is assumed that the judged command is for changing the staple position 34-3. The change command data for the staple position 34-3 which is judged in the preview information processor 31-3 is sent to the staple position valid range judging processor 31-5 where whether the after-change staple position 35-3 is within the valid range is judged.

When the after-change staple position 35-3 is within the valid range, the flow proceeds to step 32-2 where the staple position data is updated to the changed one. In FIG. 31, the staple position valid range judging processor 31-5 pre-stores the preview data before change of the staple position which is obtained from the preview data developing unit 31-2. This staple position data is sent to the staple position valid range judging processor 31-5 via the preview information processor 31-3 where the staple position is updated to new one, thereby updating the preview data.

Next, at step 32-3, the changed setting data of staple position in the staple position valid range judging processor 31-5 is sent to the general printing information memory 31-8 where setting of the staple position is stored.

When the after-change staple position 35-3 is not within the valid range, the flow proceeds to step 32-4 where the staple position valid range judging processor 31-5 generates warning information informing that the after-change staple position 35-3 is in the invalid range, and sends it to the display 31-6 for causing to display a warning display 36-4. Also, the preview data before change of the staple position obtained from the preview data developing unit 31-2 is sent to the staple position valid range judging unit 31-5. That is, the staple position data is not changed.

Next, the flow proceeds to step 32-5 through step 32-3 in the case where the after-change staple position is within the valid range, or through step 32-4 in the case where the after-change staple position is not within the valid range. At step 32-5, the updated preview data in the staple position valid range judging processor 31-5 is sent to the display 31-6 where the preview screen under this staple position setting is displayed.

Next, another example of the 11th embodiment of the invention will be described referring to the flowchart in FIG. 33. First, at step 33-1, whether the after-change staple position 35-3 in the staple position change command inputted on the preview screen 34-2 is within the valid range on the preview screen 35-2 is judged.

In FIG. 31, a command is inputted to the user interface 31-4 of the print preview processor 31-1 in the print support software by directly manipulating the preview screen 34-2. Then the command is judged in the preview information processor 31-3 as to what is the command for.

In this context, it is assumed that the judged command is for changing the staple position 34-3. The staple position 34-3 change command data which is judged in the preview information processor 31-3 is sent to the staple position valid range judging processor 31-5 where whether the after-change staple position 35-3 is within the valid range is judged. When the after-change staple position is within the valid range, the flow proceeds to step 33-2 where the staple position data is updated to the user-designated staple position.

In FIG. 31, the staple position valid range judging processor 31-5 pre-stores the preview data before change of the staple position obtained from the preview data developing unit 31-2. This staple position data is sent to the staple position valid range judging processor 31-5 via the preview information processor 31-3 where the staple position data is updated to the user-designated one, thereby updating the preview data.

When the after-change staple position is not within the valid range, the flow proceeds to step 33-3. At step 33-3, the staple position valid range judging processor 31-5 captures the preview data before change of the staple position obtained by the preview data developing unit 31-2 via the preview information processor 31-3, and changes the staple position setting data so that the staple locates a position 37-3 within the valid range and in the shortest distance to the position designated for the after-change position, thereby updating the preview data.

In FIG. 33, the flow proceeds from step 33-2 or step 33-3 to step 33-4. At step 33-4, the changed staple position setting data existing in the staple position valid range judging unit 31-5 is sent to the general printing information memory 31-8 where the staple position setting is stored.

Next, at step 33-5, the updated preview data in the staple position valid range judging processor 31-5 is sent to the display 31-6 where the preview image under the staple position setting is displayed.

FIG. 34 shows an example of the preview screen display before the user moves the staple position. FIG. 35 shows an example of the preview screen display when the user moves the staple position out of the valid range. FIG. 36 shows a warning display informing that the staple position is in the invalid range, and an example of the preview screen image when the user moves the staple position to the original position. FIG. 37 shows an example of the preview screen display after the user-designated staple position setting data is changed so that the staple locates in a position within the valid range and in a shortest distance to the user-designated position.

In FIG. 34, it is assumed that the user designates the staple position 34-3 in the invalid range 35-3 as in FIG. 35 with the input device on the preview screen 34-2. In that case, as shown in FIG. 36, the warning display 36-4 informing that a designated staple position 36-3 is in the invalid range is displayed on a preview screen 36-2, and the staple position is restored to the position 36-3 of before the user changes the staple position. Alternatively, the staple is moved to the position 37-3 within the valid range and in the shortest distance to the user-designated position on a preview screen 37-2 as shown in FIG. 37 and displayed. Also the stapling is set at the position 37-3.

[12th Embodiment]

Now, the 12th embodiment will be described. In the system of the first embodiment, an overlapping part is extracted between the print settings of the application and the print settings of the printer driver, and the overlapped print settings are unified. As the unified setting is stored in the general printing information memory 2-14, 8-16 of the print support software 2-9, 8-8, in the case of displaying the preview screen, the preview screen data is generated by using the print setting data in the general printing information memory and the document data in the printing data memory 2-21, 8-6 of the application.

Figure 38:
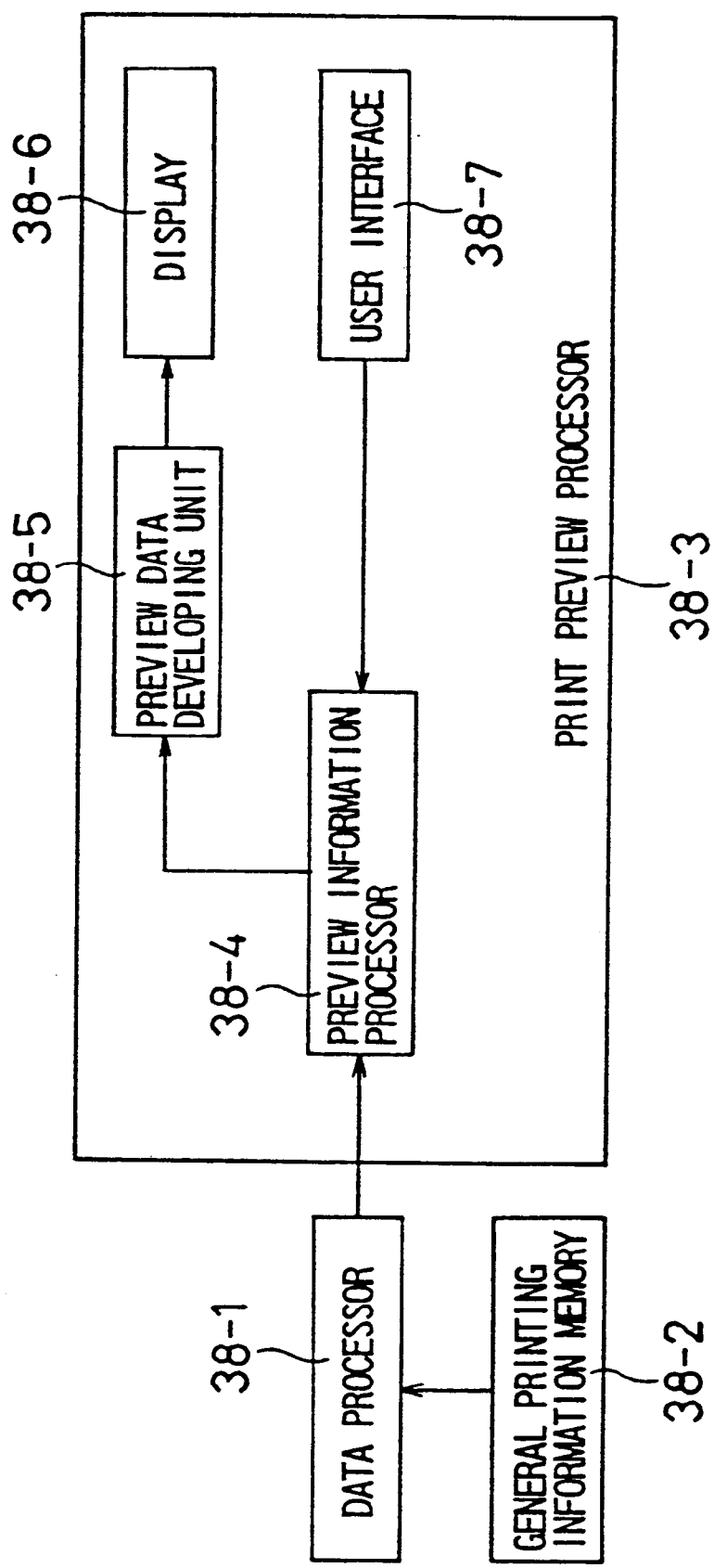
FIG. 38 is a block diagram of a part of a software system of a computer according to a 12th embodiment of the invention.

Displaying of the preview will be described by referring to a block diagram of FIG. 38 and a flowchart of FIG. 39. FIG. 38 is a detail view of the print preview processor 2-13, 8-11 in the print support software in FIGS. 2 and 8, and FIG. 39 is the flowchart from receiving the data to be previewed by the print preview processor to displaying and editing the preview.

A data processor 38-1 is the same as the data processor 2-11, 8-10 and controls input/output of a print preview processor.

A general printing information memory 38-2 stores the print settings of the application and the print settings of the printer driver by unifying them. A print preview processor 38-3 executes displaying and editing of the print preview using the document data in the application and the print setting data in the general printing information memory 38-2. A preview information processor 38-4 confirms a double-sided print setting, and when the double-sided printing mode is set, adds face/back side information to each page. When an editorial input of blank page is made via a user interface 38-7, editing process is executed to update the preview. A preview data developing unit 38-5 executes the same processing as the conventional preview image developing processing. The developed image data is displayed on a display 38-6.

Figure 39:
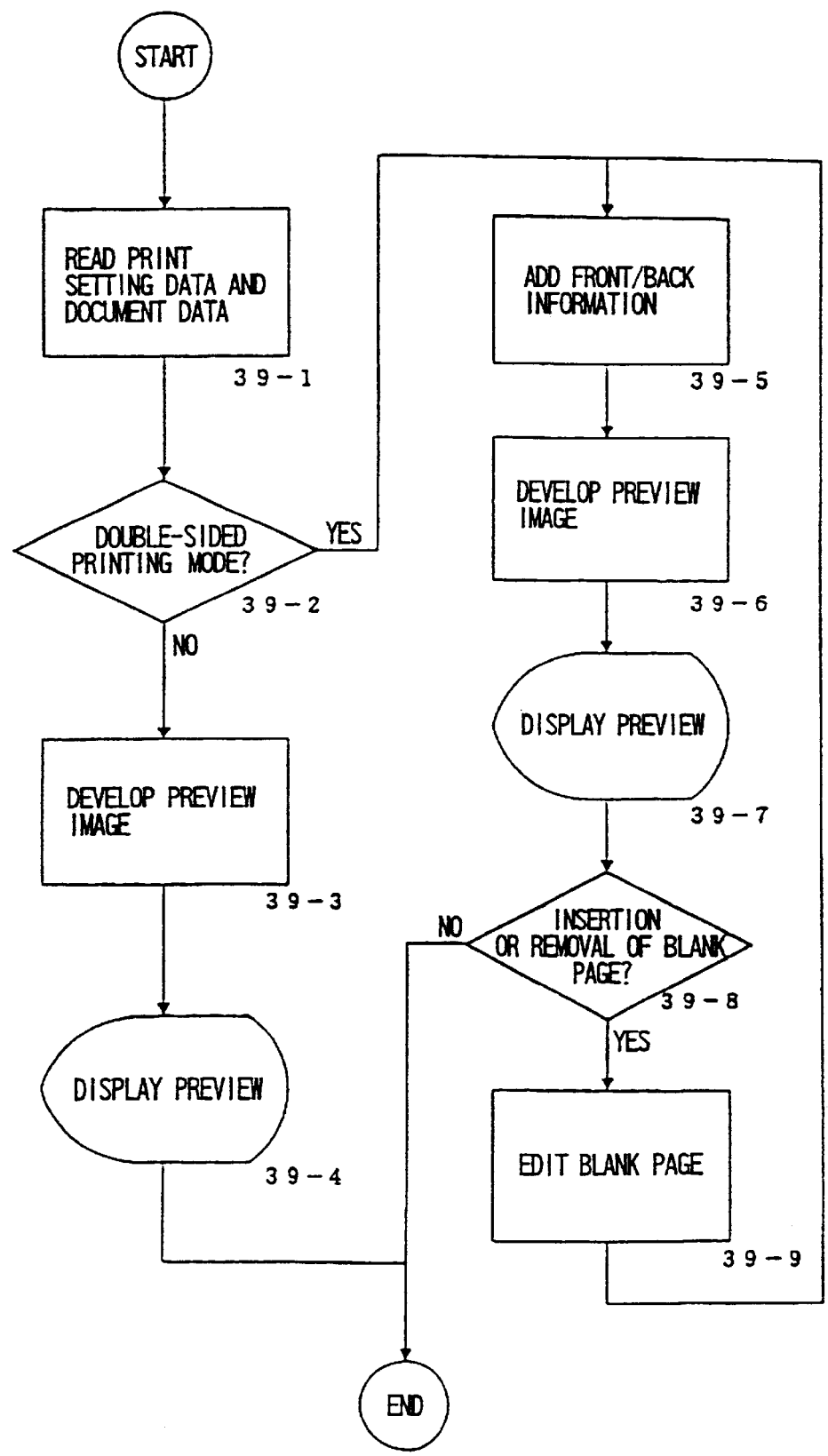
FIG. 39 is a flowchart of the 12th embodiment of the invention.

In FIG. 39, at step 39-1, the preview information processor 38-4 receives the document data stored in the printing data memory 2-21, 8-6 of the application and the unified print setting data stored in the general printing information memory 28-2 via the data processor 38-1 of the print support software.

At step 39-2, the preview information processor 38-4 judges from the print setting data whether the double-sided printing mode is set. When the double-sided printing mode is not set, the preview information processor 38-4 develops the preview image data in the same manner as the conventional preview data developing process at step 39-3, and sends it to the display 38-5. At step 39-4, the preview is displayed on the display 38-5 to thereby end the process. When the double-sided printing mode is set at step 39-2, the flow proceeds to step 39-5 where the preview information processor 38-4 adds the face/back side information to each page and sends the preview data to the preview data developing unit 38-5.

Figure 40:
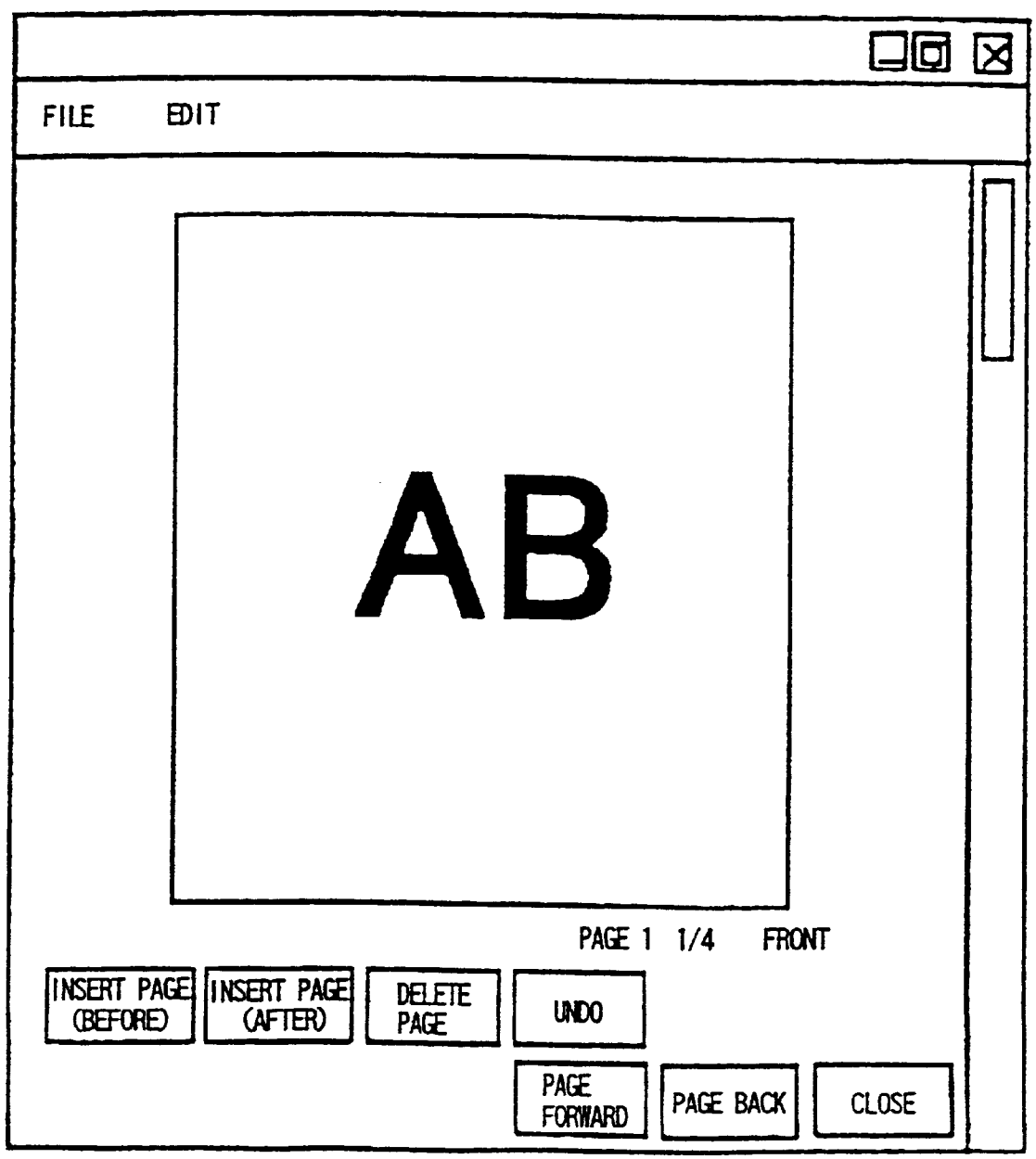
FIG. 40 shows an example of a preview display in the 12th embodiment of the invention.

At step 39-6, the preview developing unit 38-5 develops the preview data into preview image data in the conventional manner, then the preview image data is displayed on the display 38-5 at step 39-7. FIG. 40 shows an example of preview image display. It can be seen that the information about face/back side is displayed. At step 39-8, the user selects to execute editing operation, that is to insert or delete a blank page while observing the preview screen. When the user does not execute editing of blank page, he/she clicks a 'CLOSE' icon in FIG. 40 is clicked to thereby end the process. When the user executes editing of blank page, the flow proceeds to step 39-9 where the preview information processor 38-4 executes the editing process of blank page such as inserting a page break, thereafter the flow returns to step 39-5 where the preview screen is updated.

Figure 41:
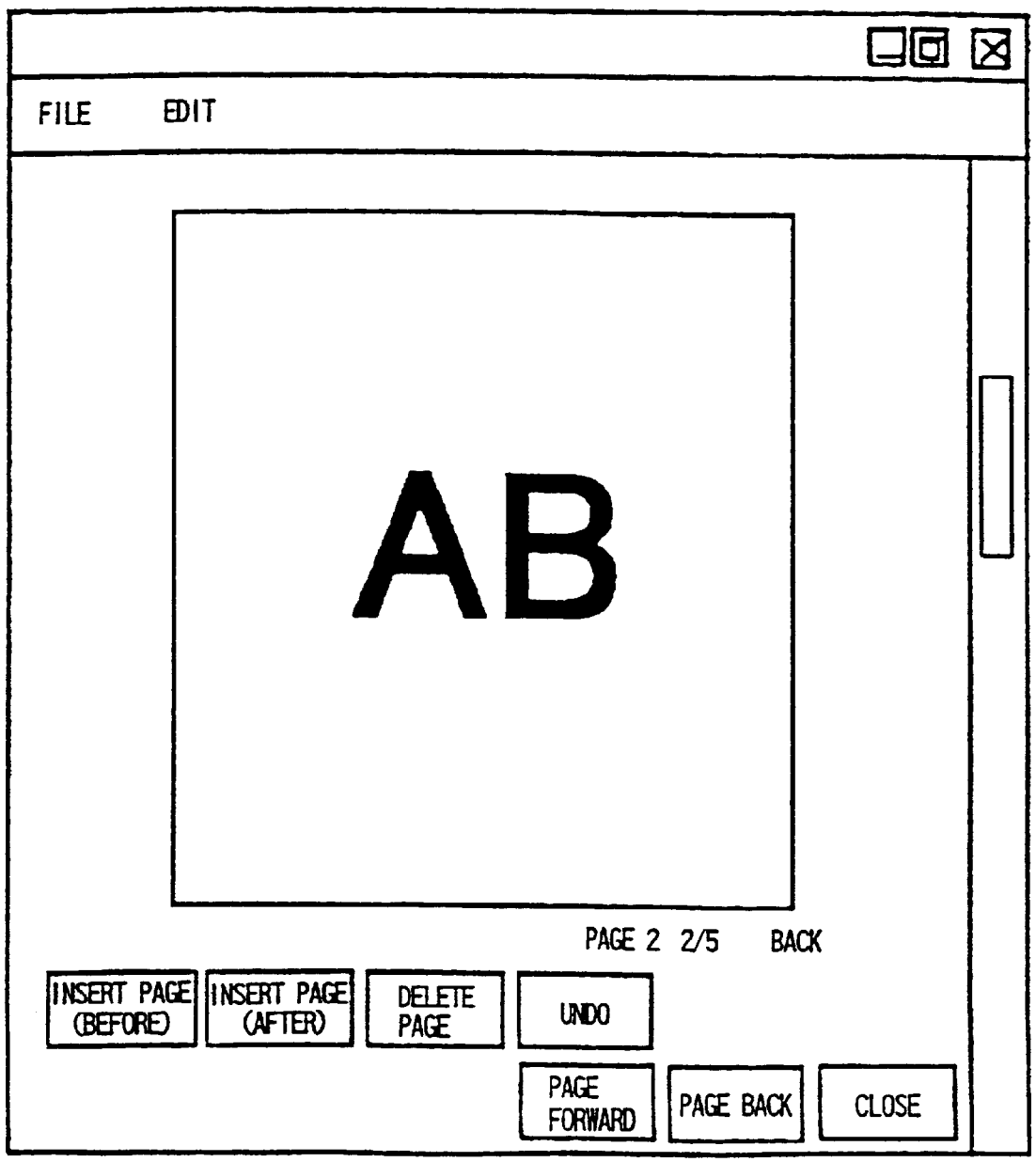
FIG. 41 shows an example of the preview display in the 12th embodiment of the invention.

The editing of blank page is executed by clicking 'INSERT PAGE (BEFORE)' icon, 'INSERT PAGE (AFTER)' icon and 'DELETE PAGE' icon in FIG. 40. The 'INSERT PAGE (BEFORE)' icon is for inserting a blank page before the page currently displayed. The 'INSERT PAGE (AFTER)' icon is for inserting a blank page after the page currently displayed. The 'DELETE PAGE' icon is for deleting the page currently displayed. The user can edit pages with these icons and designate face/back side printing for each page. FIG. 41 is a result obtained by clicking the 'INSERT PAGE (BEFORE)' icon in FIG. 40. It can be seen that the first page is moved to the second page and the surface thereof is rendered from face to back by inserting a page.

[13th Embodiment]

Now, the 13th embodiment will be described. In the system of the first embodiment, an overlapping part is extracted between the print settings of the application and the print settings of the printer driver, and the overlapped print settings are unified. As the unified setting is stored in the general printing information memory 2-14, 8-16 of the print support software 2-9, 8-8, in the case of displaying the preview screen, the preview screen data is generated by using the print setting data in the general printing information memory and the document data in the print setting memory 2-21, 8-6 of the application.

Figure 42:
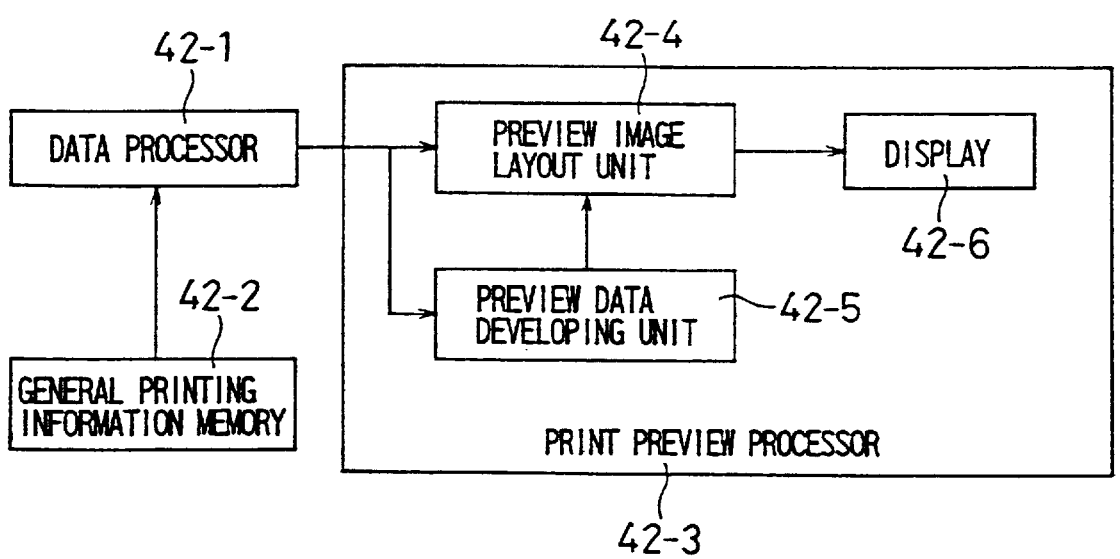
FIG. 42 is a block diagram of a part of a software system of a computer according to a 13th embodiment of the invention.

Displaying of the preview will be described by referring to a block diagram of FIG. 42 and a flowchart of FIG. 43. FIG. 42 is a detail view of the print preview processor 2-13, 8-11 in the print support software in FIGS. 2 and 8, and FIG. 43 is the flowchart from receiving the data to be previewed by the print preview processor to displaying and editing the preview.

A data processor 42-1 is the same as the data processor 2-11, 8-10 and controls input/output of a print preview processor 42-3. A general printing information memory 42-2 stores the print settings of the application and the print settings of the printer driver by unifying them.

The print preview processor 42-3 displays the print preview using the document data in the application and the print setting data in the general printing information memory 42-2. A preview screen layout unit 42-4 confirms a double-sided print setting, and executes a layout process on the data developed in the preview data developing unit 42-5 according to the setting. The processed image data is to be displayed on a display 42-6.

Figure 43:
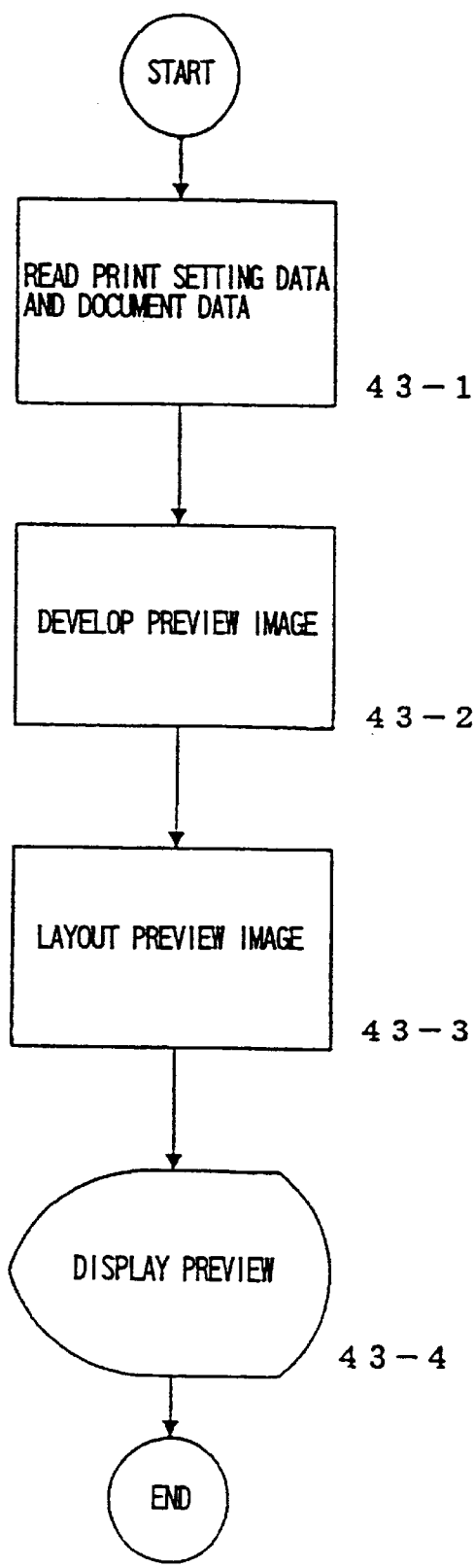
FIG. 43 is a flowchart of a 13th embodiment of the invention.

In FIG. 43, at step 43-1, the preview data developing unit 42-5 receives the document data stored in the printing data memory 2-21, 8-6 of the application and the unified print setting data stored in the general printing information memory 42-2 via the data processor 42-1 of the print support software. Also the preview image layout unit 42-4 receives the double-sided printing mode setting.

At step 43-2, the preview data developing unit 42-5 develops the preview image data in the same manner as the conventional preview data developing process, and sends it to the preview screen layout unit 42-4. At step 43-3, the preview screen layout unit 42-4 confirms the double-sided printing mode setting, and generates screen layout data adapted to the double-sided printing mode. At that time, a process of rotating the preview image of each page by 180° or the like is executed as necessary. At step 43-3, the resultant data is displayed on the display 42-6.

Figure 44:
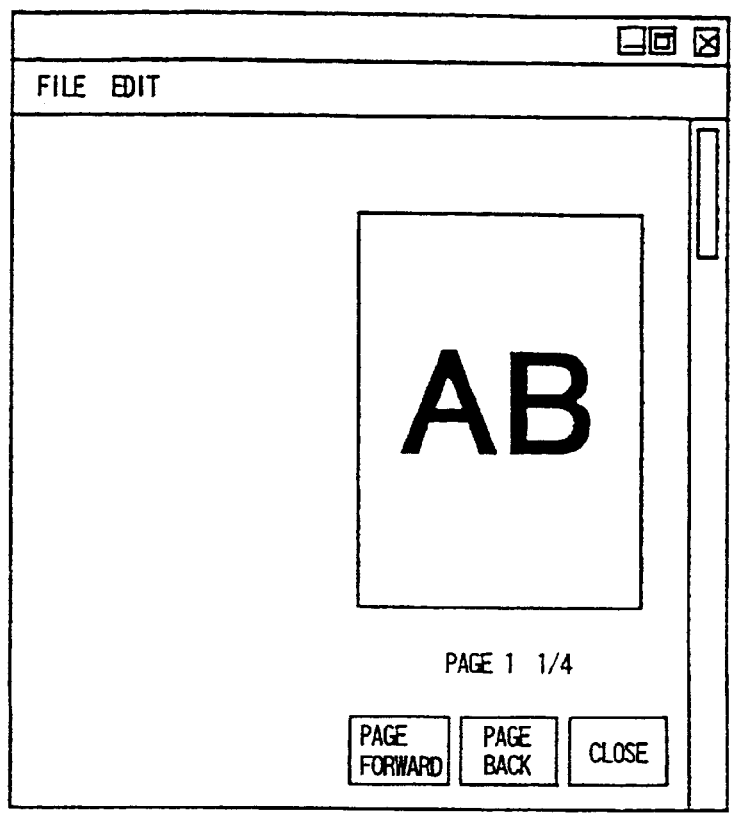
FIG. 44 shows an example of a preview display in the thirteenth embodiment of the invention.
Figure 45:
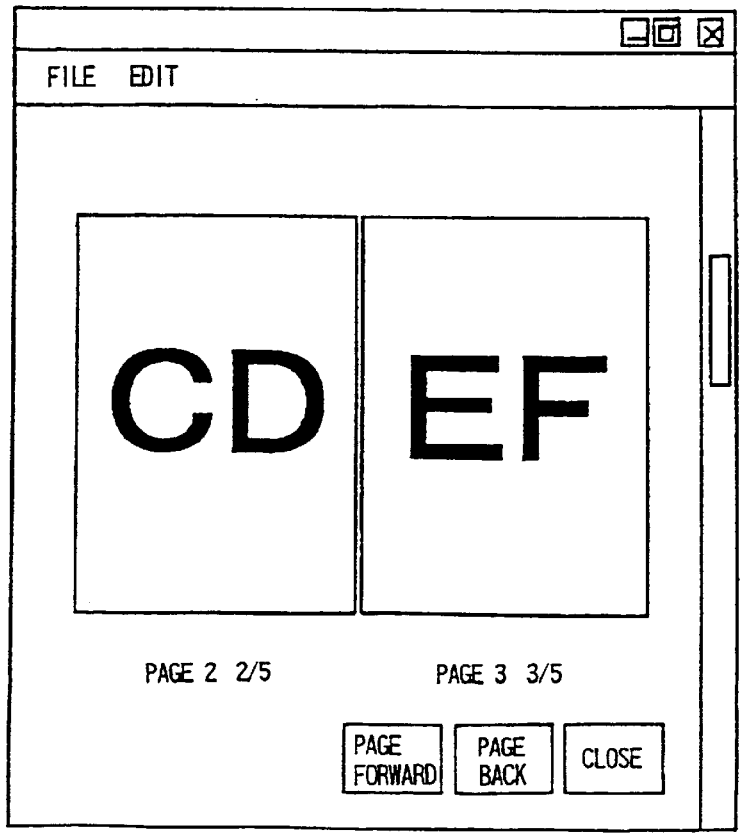
FIG. 45 shows an example of the preview display in the 13th embodiment of the invention.
Figure 46:
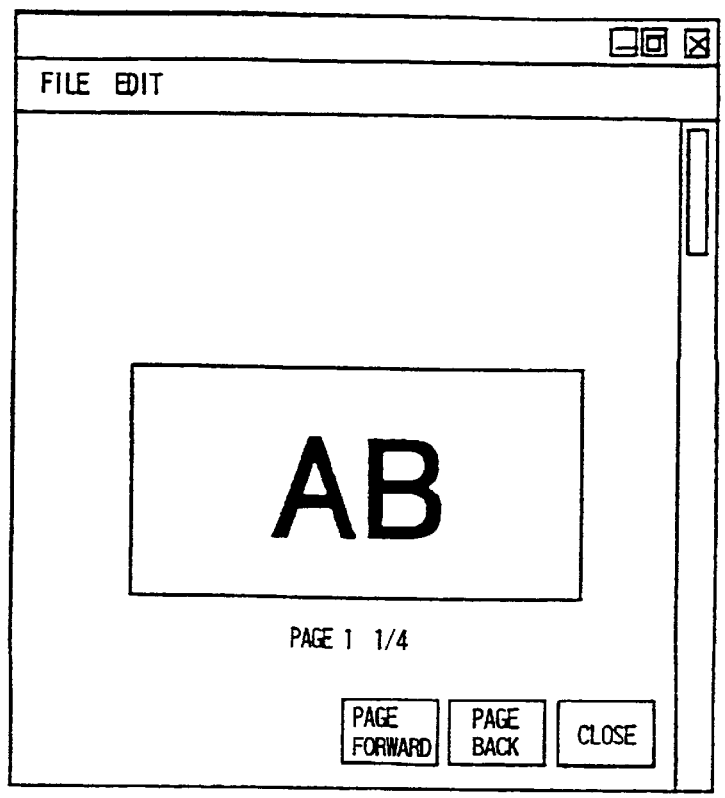
FIG. 46 shows an example of the preview display in the 13th embodiment of the invention.
Figure 47:
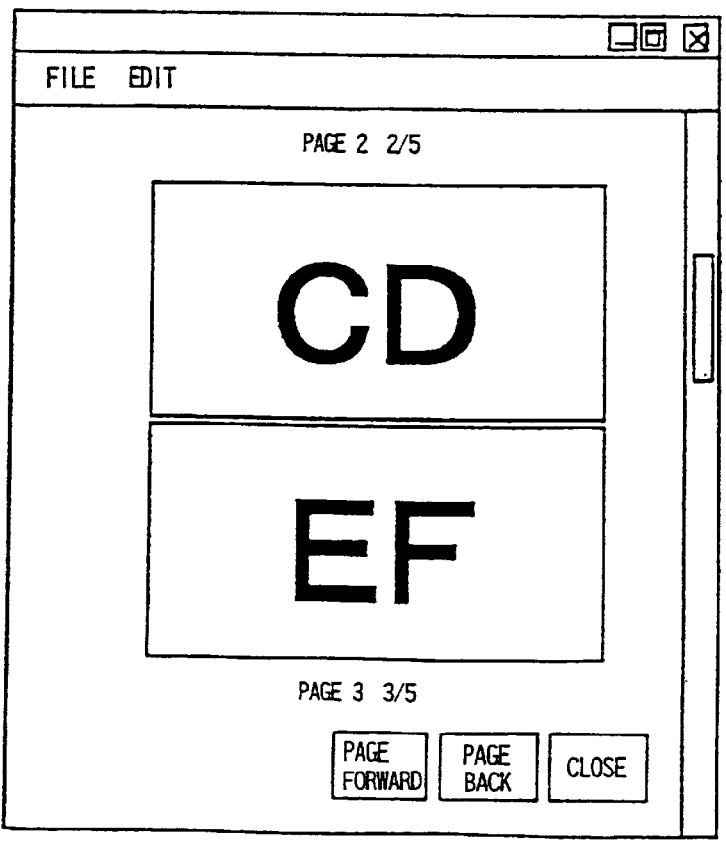
FIG. 47 shows an example of the preview display in the 13th embodiment of the invention.

For examples, FIGS. 44, 45, 46 and 47 are given. FIGS. 44 and 45 show the displays under the situation that vertical arrangement and left binding are designated, and FIGS. 46 and 47 show the displays under the situation that horizontal arrangement and top binding are designated. FIG. 44 shows the first page, and FIG. 45 is obtained by clicking the icon 'PAGE FORWARD' in FIG. 44. The same relation is applied to FIGS. 46 and 47. As to other settings, such as the double-sided printing mode setting, how the face or back side of the sheet is printed becomes clear by preparing the preview similar to the image to be actually printed on the sheet.

[14th Embodiment]

Now, the 14th embodiment will be described. In the system of the first embodiment, an overlapping part is extracted between the print settings of the application and the print settings of the printer driver, and the overlapped print settings are unified. As the unified setting is stored in the general printing information memory 2-14, 8-16 of the print support software 2-9, 8-8, in the case of displaying the preview screen, the preview screen data is generated by using the print setting data in the general printing information memory and the document data in the printing data memory 2-21, 8-6 of the application.

Figure 48:
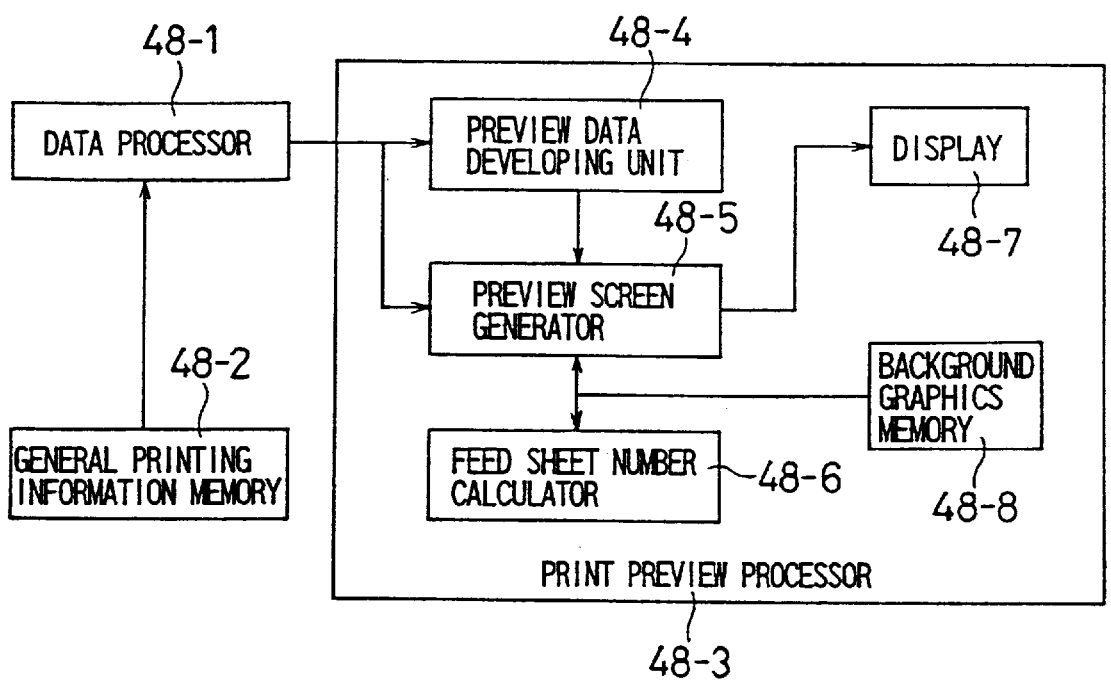
FIG. 48 is a block diagram of a part of a software system of a computer according to a 14th embodiment of the invention.

Displaying of the preview will be described by referring to a block diagram of FIG. 48 and a flowchart of FIG. 49. FIG. 48 is a detail view of the print preview processor 2-13, 8-11 in the print support software in FIGS. 2 and 8, and FIG. 49 is the flowchart from receiving the data to be previewed by the print preview processor to displaying and editing the preview.

In FIG. 48, a data processor 48-1 is the same as the data processor 2-11, 8-10 and controls input/output of a print preview processor 48-3. A general printing information memory 48-2 stores the print settings of the application and the print settings of the printer driver by unifying them. The print preview processor 48-3 displays a print preview using the document data of the application and the print setting data of the general printing information memory 48-2.

A preview data developing unit 48-4 carries out a preview image developing process in the conventional manner. A preview screen generator 48-5 combines graphics data pre-stored in a background graphics memory 48-8 and the preview image data developed in the preview data developing unit 48-8 in accordance with feed sheet setting data for each page. The resultant data is added with the number of use for each feed sheet type which is calculated at a feed sheet number calculator 48-6, and thereafter sent to the display 48-7 where the preview image is displayed.

Figure 49:
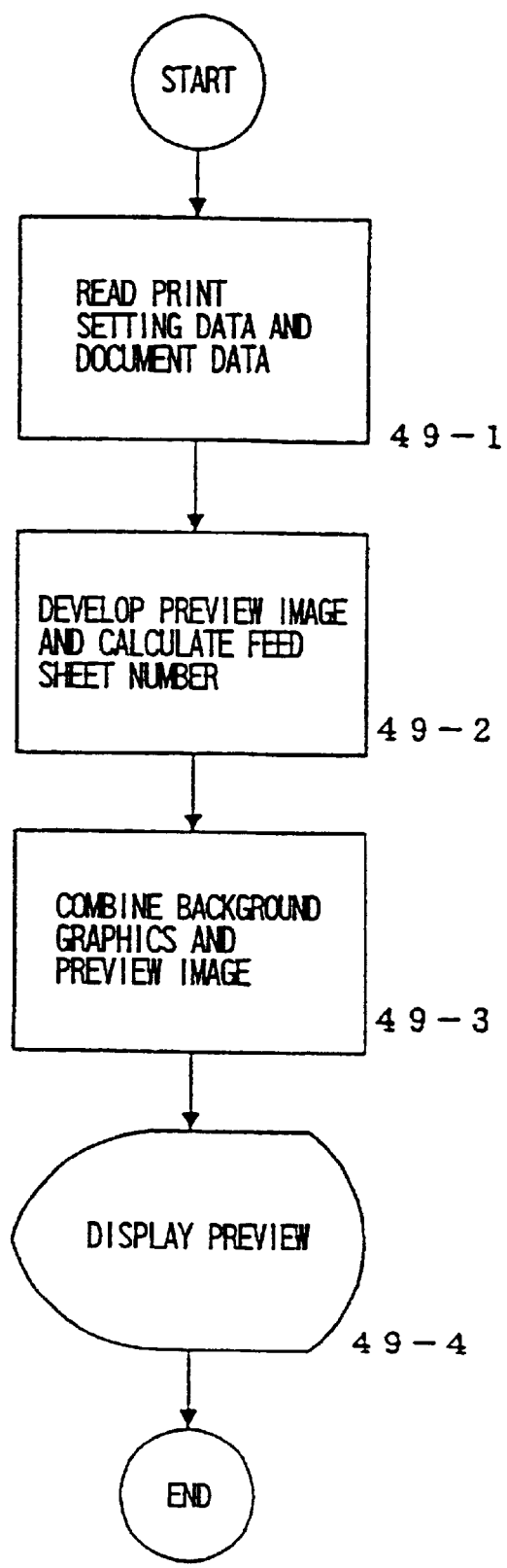
FIG. 49 is a flowchart of the 14th embodiment of the invention.

In FIG. 49, at step 49-1, the preview data developing unit 48-4 receives the document data stored in the printing data memory 2-21, 8-6 of the application and the unified print setting data stored in the general printing information memory 48-2 via the data processor 48-1 of the print support software. At step 49-2, the preview data developing unit develops the data into preview image data in the same manner as the conventional preview developing process, and sends the resultant data to the preview screen generator 48-5. At the same time, the feed sheet number calculator 48-6 calculates the sheet number to be used for each feed tray and each feed sheet type, and sends the resultant data to the preview screen generator 48-5.

At step 49-3, the preview screen generator 48-5 combines the background graphics data pre-stored in the background graphics data memory 48-8 with the preview image data developed at step 49-2. The combining of preview image is achieved in the preview screen generator 48-5 by receiving the feed tray setting data or feed sheet type setting data of each page from the general printing information memory 48-2 via the data processor 48-1 of the print support software, and using the background graphics data corresponding to the received data. At step 49-4, the combined data and the number of use for each feed sheet type or feed tray are sent to the display 48-7 where the preview is displayed.

Figure 50:
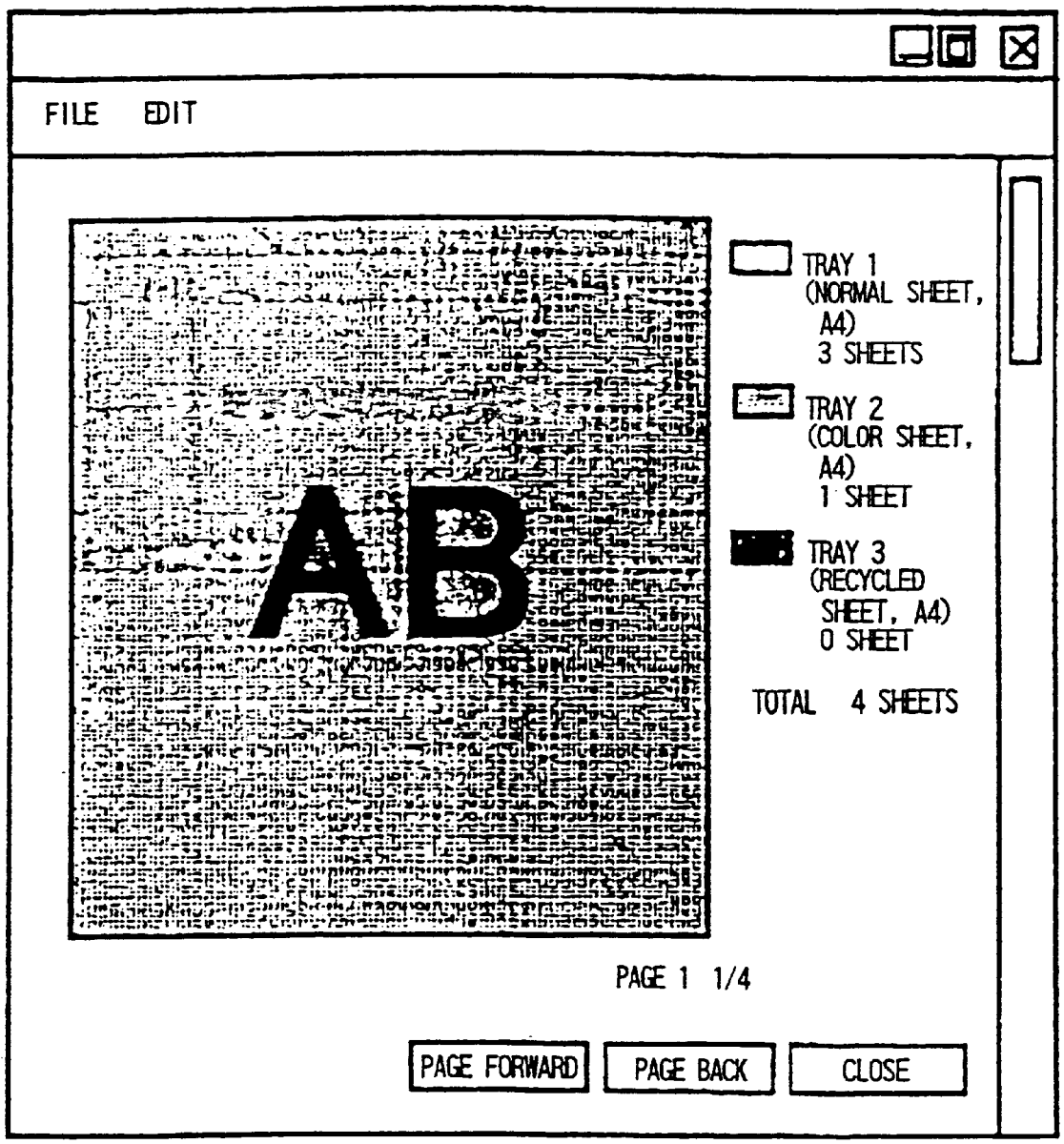
FIG. 50 shows an example of a preview display in the 14th embodiment of the invention.

In an example of FIG. 50, it can be seen that a tray 1 requires three normal feed sheets and a tray 2 requires one color feed sheet. In the case of double-sided printing, since required number of each sheet type is half of that in the normal printing, so that the displayed number may be reduced to the half.

[15th Embodiment]

Figure 51:
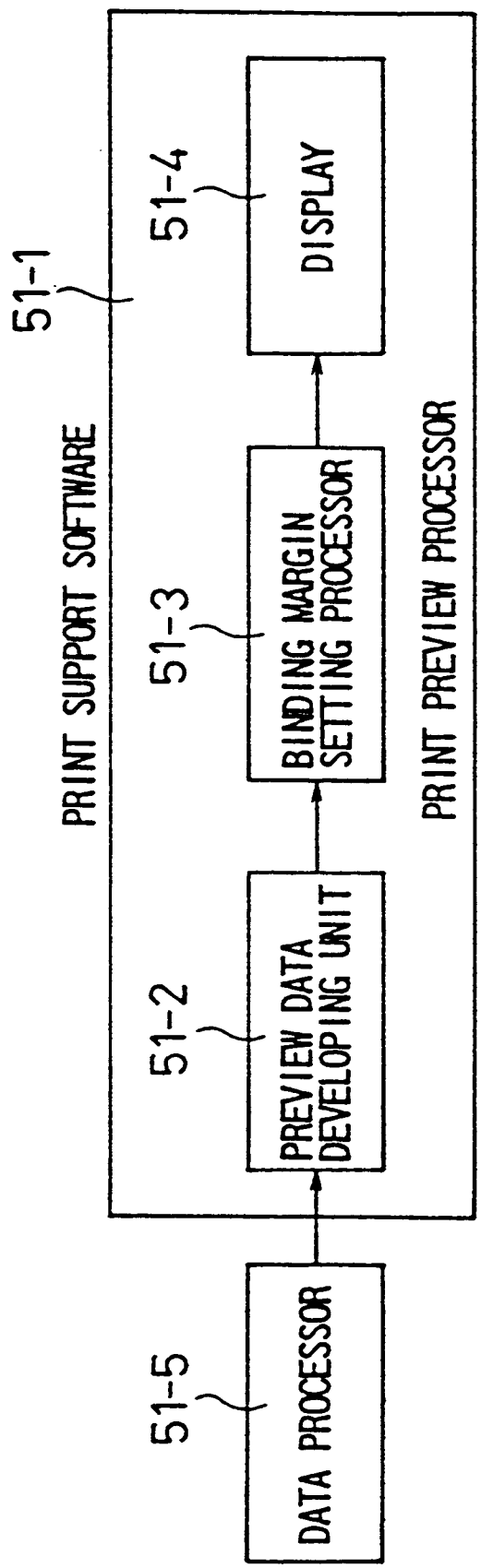
FIG. 51 is a block diagram of a software system according to a 15th embodiment of the invention.
Figure 52:
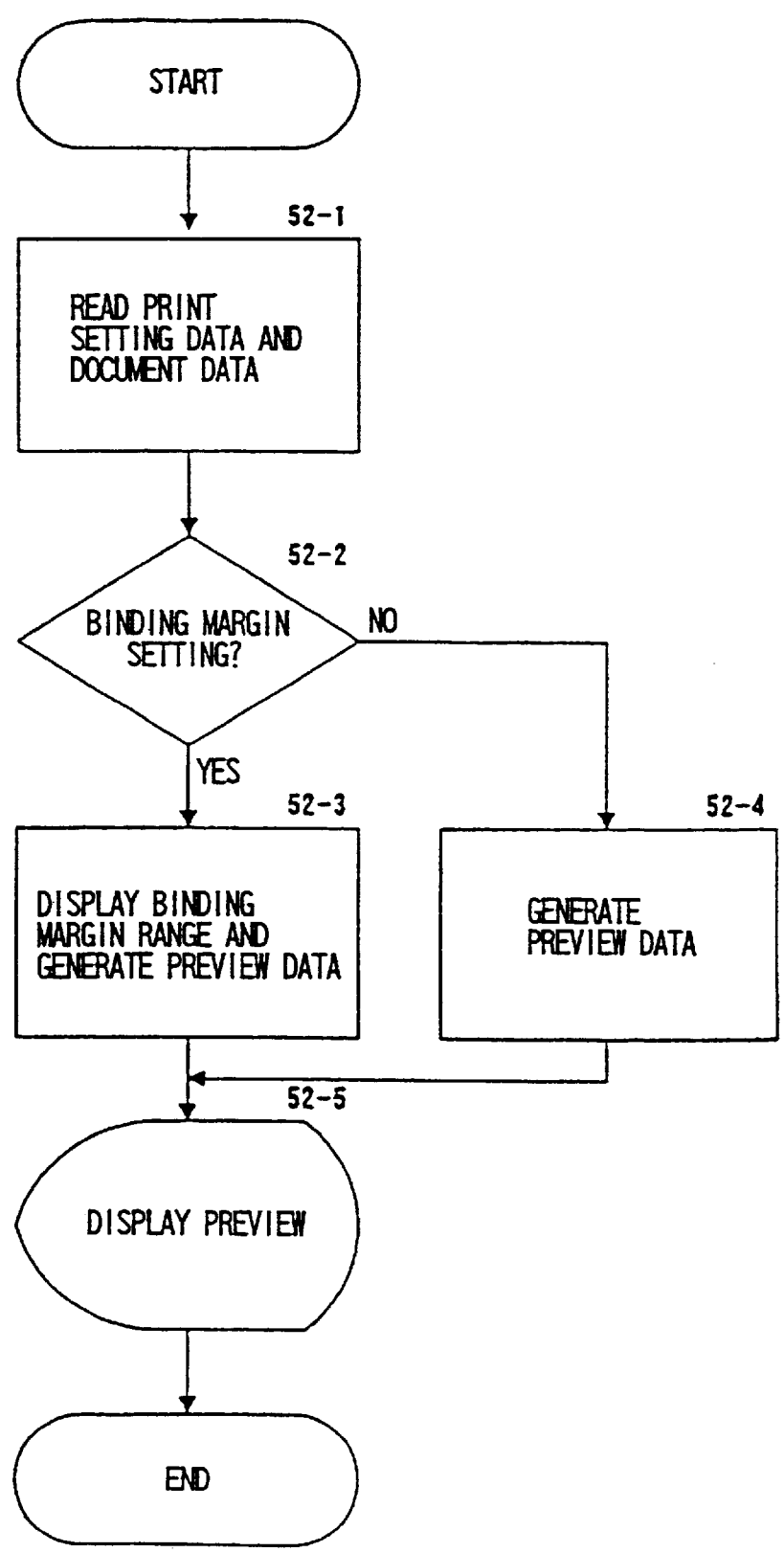
FIG. 52 is a flowchart of the 15th embodiment of the invention.
Figure 53:
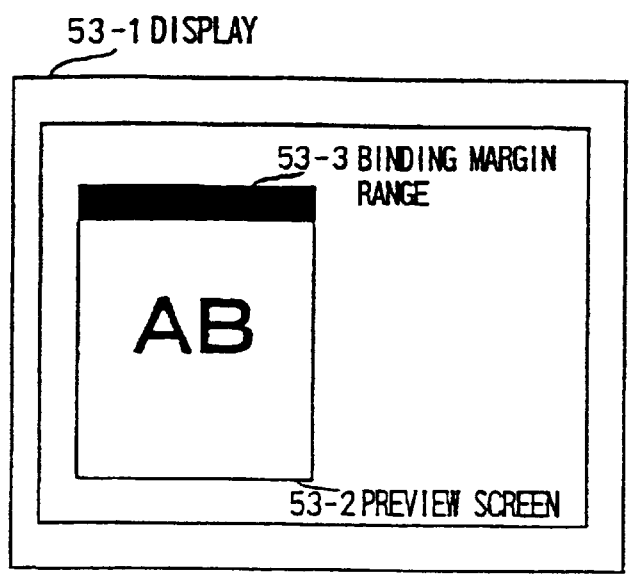
FIG. 53 shows an example of a preview screen display when a binding margin is set in the 15th embodiment of the invention.
Figure 54:
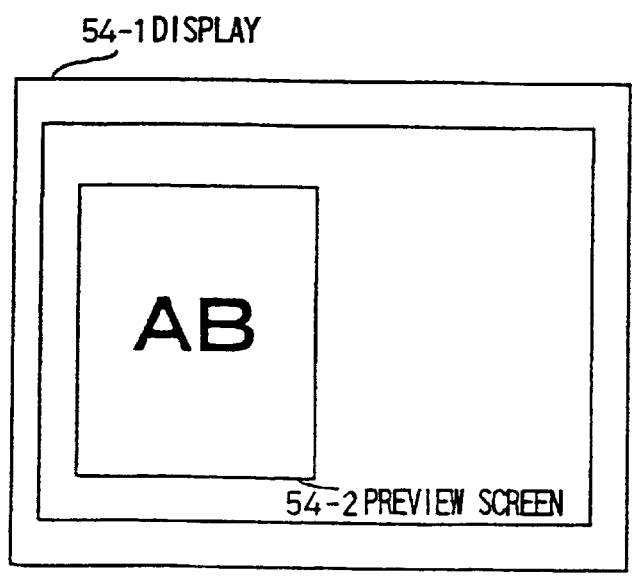
FIG. 54 shows an example of the preview screen display when the binding margin is not set in the 15th embodiment of the invention.

FIG. 51 is a block diagram of a software system of a computer according to the 15th embodiment of the invention, in which the print preview processor 2-13, 8-11 in the print support software 2-9, 8-8 in FIGS. 2 and 8 is detailed. FIG. 52 is a processing flowchart of the 15th embodiment of the invention. FIG. 53 is an example of the preview screen display when a binding margin is set in the 15th embodiment of the invention. FIG. 54 is an example of the preview screen display when the binding margin is not set in the 15th embodiment of the invention.

Now, the 15th embodiment will be described. In the system of the first embodiment, an overlapping part is extracted between the print settings of the application 2-1, 8-1 and the print settings of the printer driver 2-16, 8-18, and the overlapped print settings are unified. As the unified setting is stored in the general printing information memory 2-14, 8-16 of the print support software 2-9, 8-8, in the case of displaying the preview screen, the preview screen data is generated by using the print setting data in the general printing information memory and the document data of the application 2-1, 8-1. Displaying of the preview will be described by referring to FIGS. 51 to 54.

In FIG. 51, a print preview processor 51-1 carries out an input/output process of a preview screen on a display in printing operation. A preview data developing unit 51-2 develops the print setting data and the document data obtained from a data processor 51-5 to generate preview screen displaying data.

A binding margin setting processor 51-3 judges whether the binding margin is set from the preview screen displaying data received from the preview data developing unit 51-2, and adds information of binding margin range display, to thereby update the preview screen displaying data. A display 51-4 displays the preview data obtained from the binding margin setting processor 51-3 in the form that the user can recognize visually. The data processor 51-5 reads the print setting data and the document data from the interface with the application, and the print setting data from the interface with the printer driver, extracts an overlapping part between each of print settings, and unifies the overlapping part.

In FIG. 52, at step 52-1, the unified print setting data and the document data is read into the preview data developing unit 51-2 in the print preview processor 51-1 from the data processor in the print support software of FIG. 51. The preview data developing unit 51-2 receives the document data and the print setting data from the data processor 51-5 in the conventional manner and develops the received data into the preview data.

Next, at step 52-2, whether the binding margin is set in the print setting data is judged by the preview data developing unit 51-2. When the binding margin is set, the flow proceeds to step 52-3 where the binding margin range information is added to the preview data. In FIG. 51, the preview data generated by the preview data developing unit 51-2 is read into the binding margin setting processor 51-3. When the binding margin is set, the binding margin setting processor 51-3 adds information of length of the binding margin, to thereby update the preview data.

On the contrary, when the binding margin is not set, the flow proceeds to step 52-4 where the conventional preview data to which no information is added is generated. In other words, no manipulation is executed in the binding margin setting processor 51-3 in FIG. 51. Using the preview data obtained at steps 52-3 and 52-4, the preview screen is displayed at step 52-5. In FIG. 51, the preview data in the binding margin setting processor 51-3 is sent to the display 51-4 where the preview screen is displayed.

FIGS. 53 and 54 are examples of the preview screen display when the binding margin is set and when the binding margin is not set, respectively. On displays 53-1 and 54-1, preview screens 53-2 and 54-2 are displayed, respectively. At that time, when the binding margin is set, a binding margin range 53-3 is displayed in the document on the preview screen.

[16th Embodiment]

Figure 55:
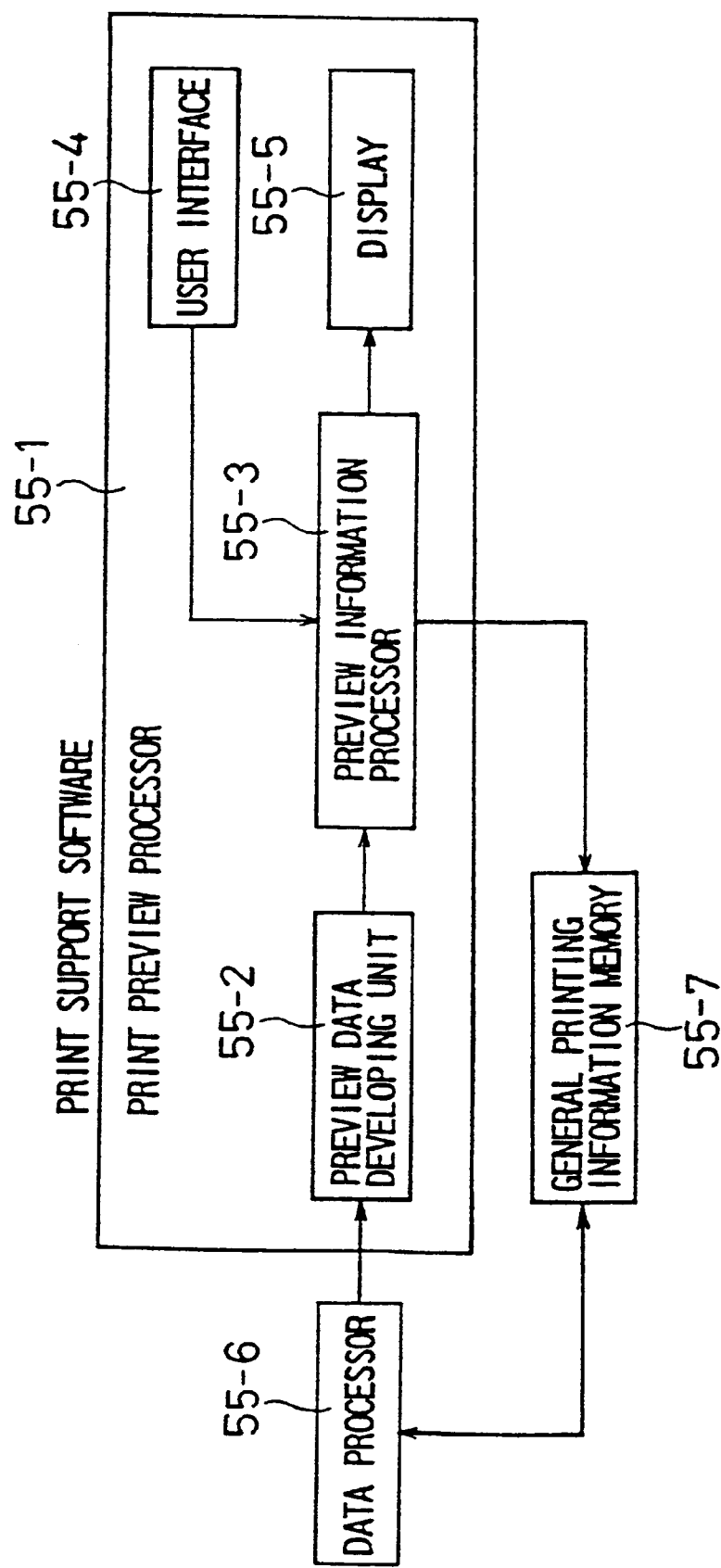
FIG. 55 is a block diagram of a software system according to a 16th embodiment of the invention.
Figure 56:
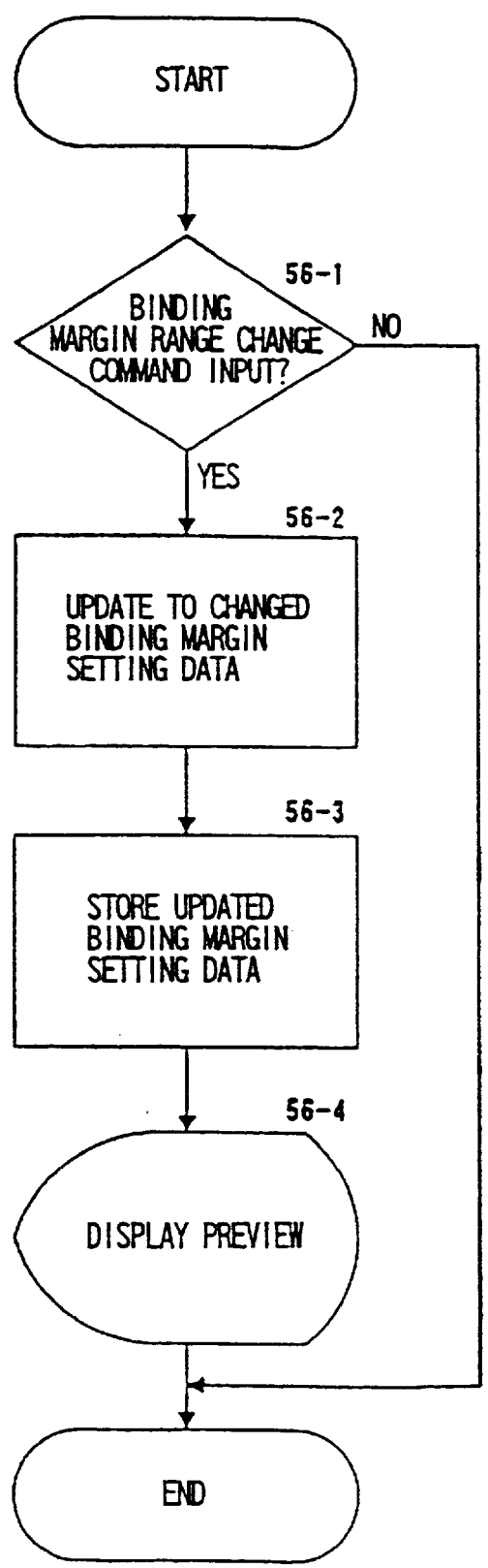
FIG. 56 is a flowchart of the 16th embodiment of the invention.
Figure 57:
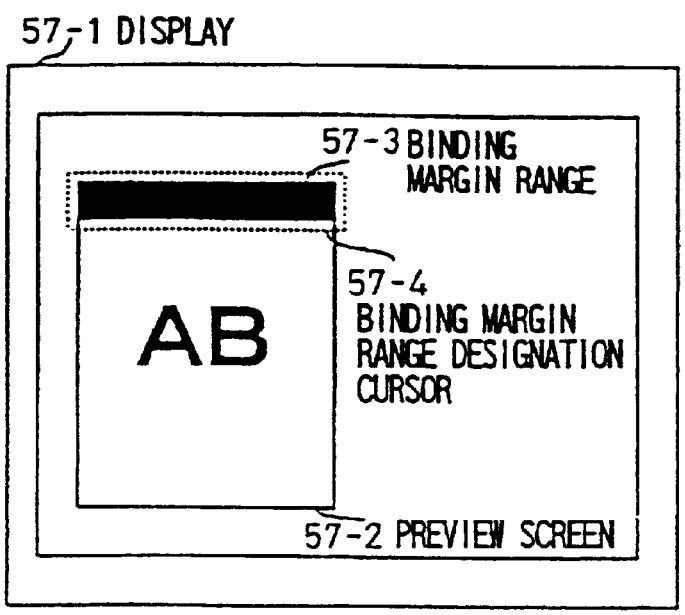
FIG. 57 shows an example of a preview screen display before setting a binding margin on the preview screen in the 16th embodiment of the invention.
Figure 58:
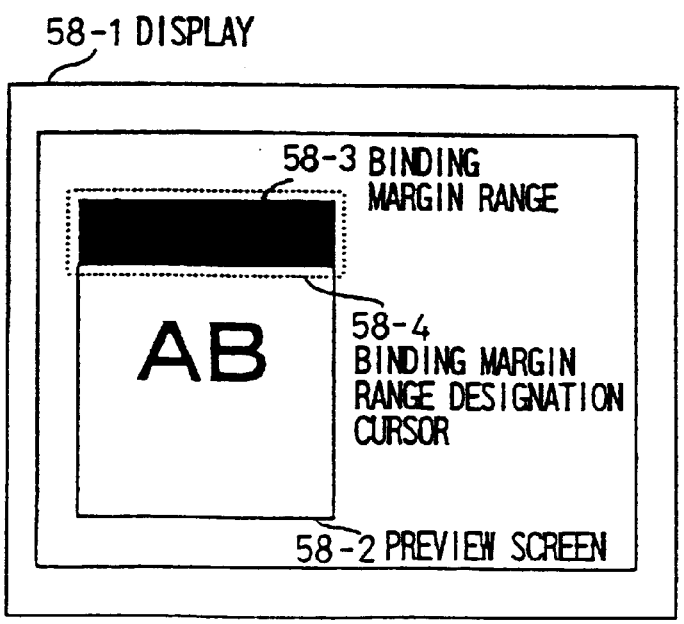
FIG. 58 shows an example of a preview screen display after setting the binding margin on the preview screen in the 16th embodiment of the invention.

FIG. 55 is a block diagram of a software system of a computer according to the 16th embodiment of the invention, in which the print preview processor 2-13, 8-11 in the print support software 2-9, 8-8 in FIGS. 2 and 8 is detailed. FIG. 56 is a processing flowchart of the 16th embodiment of the invention. FIGS. 57 and 58 are examples of the preview screen display before and after setting the binding margin on the preview screen.

Now, the 16th embodiment will be described. In the 15th embodiment of the invention, it is assumed that the preview screen 53-2 is displayed and the binding margin range 53-3 is displayed because of the binding margin setting. In such a situation, editing process in manipulating the binding margin range 53-3 on the preview screen 53-2 will be described by referring to FIGS. 55 to 58.

In FIG. 55, a print preview processor 55-1 carries out an input/output process of a preview screen on a display in printing operation. A preview data developing unit 55-2 develops the print setting data and the document data obtained from a data processor 55-6 to generate preview screen displaying data. A preview information processor 55-3 receives the preview screen displaying data and the print setting data from the preview data developing unit 55-2 and user-input command data from a user interface 55-4, and judges whether the command is for changing the binding margin, and updates the information of binding margin setting, to thereby update the preview screen display data and the print setting data. The user interface 55-4 converts the command inputted by the user with the input device or the like into the command data and sends it to the preview information processor 55-3.

A display 55-5 displays the preview screen displaying data obtained from the preview information processor 55-3 in the form that the user can recognize visually. The data processor 55-6 reads the print setting data and the document data from the interface with the application and the print setting data from the interface with the printer driver, extracts an overlapping part between each of print settings, and unifies the overlapping part. The data processor 55-6 also sends/receives the unified print setting data to/from a general printing information memory 55-7.

The general printing information memory 55-7 stores the unified print setting data, and when a binding margin setting change command is issued from the user interface 55-4, receives updated print setting data from the preview information processor 55-3 to store it. Also the general printing information memory 55-7 sends the print setting data stored therein to the data processor 55-6 as necessary.

The flowchart in FIG. 56 starts from the time when the command is inputted on a preview screen 57-2 on which a binding margin range 57-3 is displayed because of the binding margin setting in the 15th embodiment. First, at step 56-1, whether the command inputted on the preview screen 57-2 is for changing the binding margin setting is judged. In the user interface 55-4 of the print preview processor 55-1 in the print support software in FIG. 55, the command is inputted by directly manipulating the preview screen 57-2. The command is then judged by the preview information processor 55-3 as to what is the command for. When it is judged that the command is not for changing the binding margin, the process ends without executing any manipulations. When it is judged that the command is for changing the binding margin, the flow proceeds to step 56-2 where the binding margin setting data is updated to the changed one.

In FIG. 55, the preview data before change of the binding margin range which is obtained from the preview data developing unit 55-2 is pre-stored in the preview information processor 55-3. The data of the binding margin range 57-3 is updated to the changed one in the preview information processor 55-3, thereby updating the preview data.

Next, at step 56-3, the changed setting data of the binding margin range 58-3 existing in the preview information processor 55-3 is sent to the general printing information memory 55-7 where the setting of the binding margin range is stored. Next, at step 56-4, the updated setting data of the binding margin existing in the review information processor 55-3 is sent to the display 55-5-where the preview screen under the updated binding margin setting is displayed.

FIGS. 57 and 58 show examples of the preview screen image before and after setting the binding margin on the preview screen, respectively. In FIG. 57, the user designates the part at which the binding margin range 57-3 is displayed on the preview screen 57-2 by means of the input device. The designated binding margin range is specified by a cursor 57-4. The user enlarges or reduces the specified binding margin range 57-3 with the input device, so as to update a binding margin range 58-3 on a preview screen 58-2 as shown in FIG. 58. The binding margin range setting is reflected to any page on the document regardless of the page for which the binding margin is set.

[17th Embodiment]

Now, the 17th embodiment will be described. In the system of the first embodiment, an overlapping part is extracted between the print settings of the application and the print settings of the printer driver, and the overlapped print settings are unified. As the unified setting is stored in the general printing information memory 2-14, 8-16 of the print support software 2-9, 8-8, in the case of displaying the preview screen, the preview screen data is generated by using the print setting data in the general printing information memory and the document data in the printing data memory 2-21, 8-6 of the application.

Figure 59:
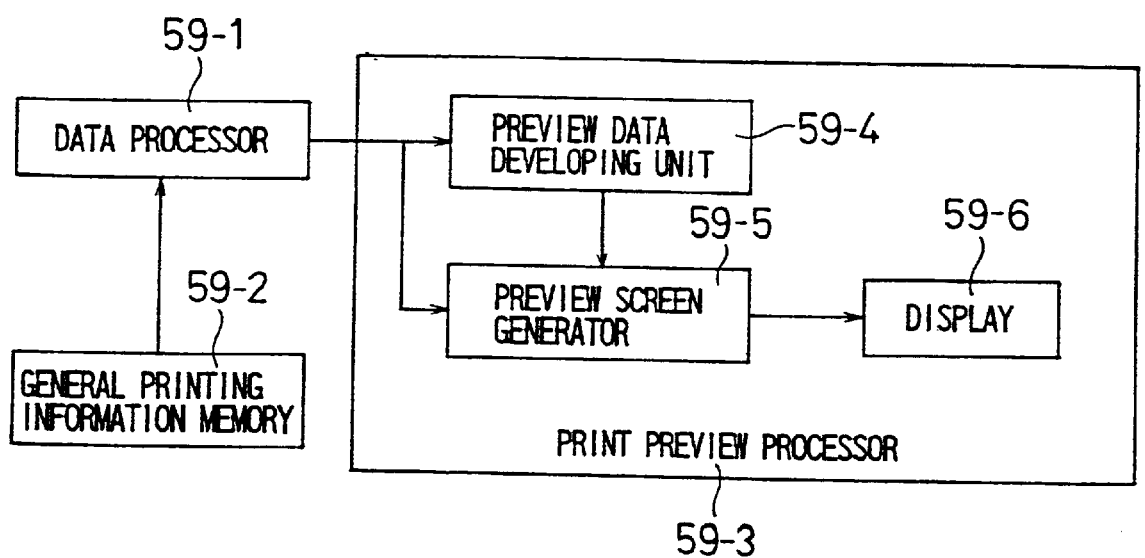
FIG. 59 is a block diagram of a part of a software system of a computer according to a 17th embodiment of the invention.

Displaying of this preview will be described by referring to a block diagram of FIG. 59 and a flowchart of FIG. 60. FIG. 59 is a detail view of the print preview processor 2-13, 8-11 in the print support software in FIGS. 2 and 8, and FIG. 60 is the flowchart from receiving the data to be previewed by the print preview processor to displaying and editing the preview.

A data processor 59-1 is the same as the data processor 2-11, 8-10 and controls the input/output of a print preview processor. A general printing information memory 59-2 stores the print settings of the application and the print settings of the printer driver by unifying them.

A print preview processor 59-3 displays a print preview using the document data of the application and the print setting data of the general printing information memory 59-2. A preview data developing unit 59-4 carries out the same preview image developing process as conventionally executed. A preview screen generator 59-5 executes a process, such as flipping horizontally, 180° rotating, or inverting the preview image on the preview image data developed by the preview data developing unit 59-4 according to the print setting. The processed image data is then displayed on a display 59-6.

Figure 60:
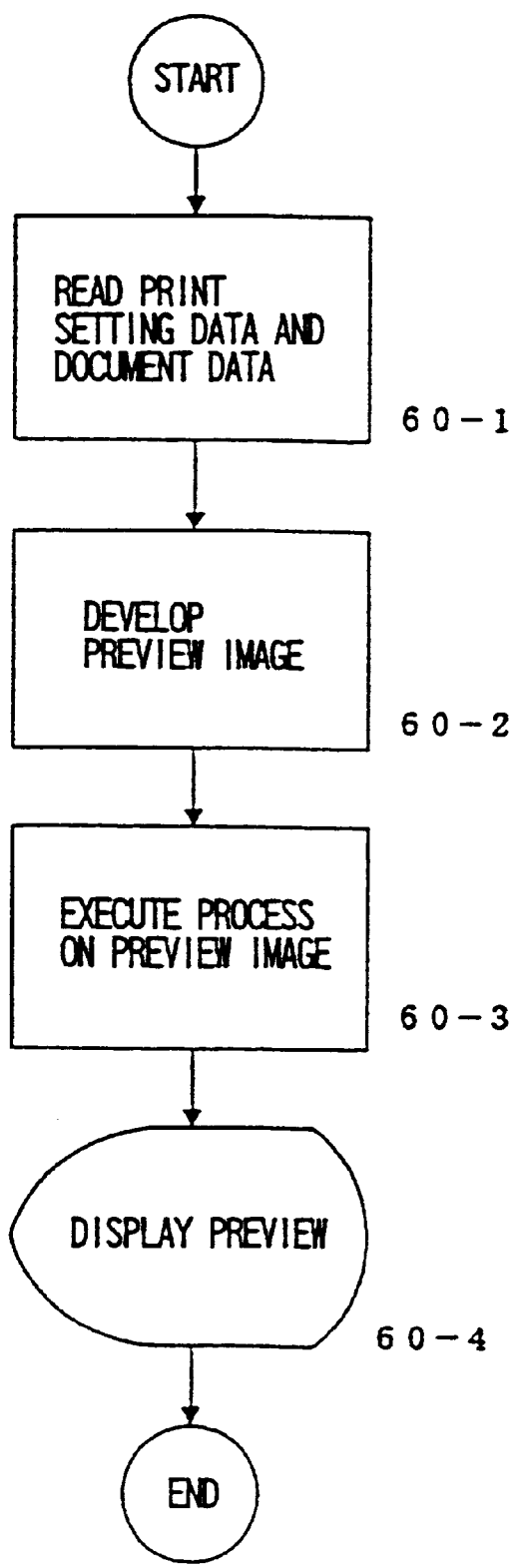
FIG. 60 is a flowchart of the 17th embodiment of the invention.

In FIG. 60, at step 60-1, the preview data developing unit 59-4 receives the document data stored in the printing data memory 2-21, 8-6 of the application and the unified print setting data from the general printing information memory 59-2 via the data processor 59-1 of the print support software, and at step 60-2, develops the data into the preview image data in the same manner as the conventional preview data developing process, and then sends it to the preview screen generator 59-5. At step 60-3, the preview screen generator 59-5 executes the process of horizontally flipping, 180° rotating, inverting or the like on the developed preview image data.

The preview screen generator 59-5 receives the print setting data from the general printing information memory 59-2 via the data processor 59-1 of the print support software and executes a process corresponding to the received data, thereby executing the process on the preview image. At step 60-4, the processed data is sent to the display 59-6 where the preview is displayed.

Figure 61:
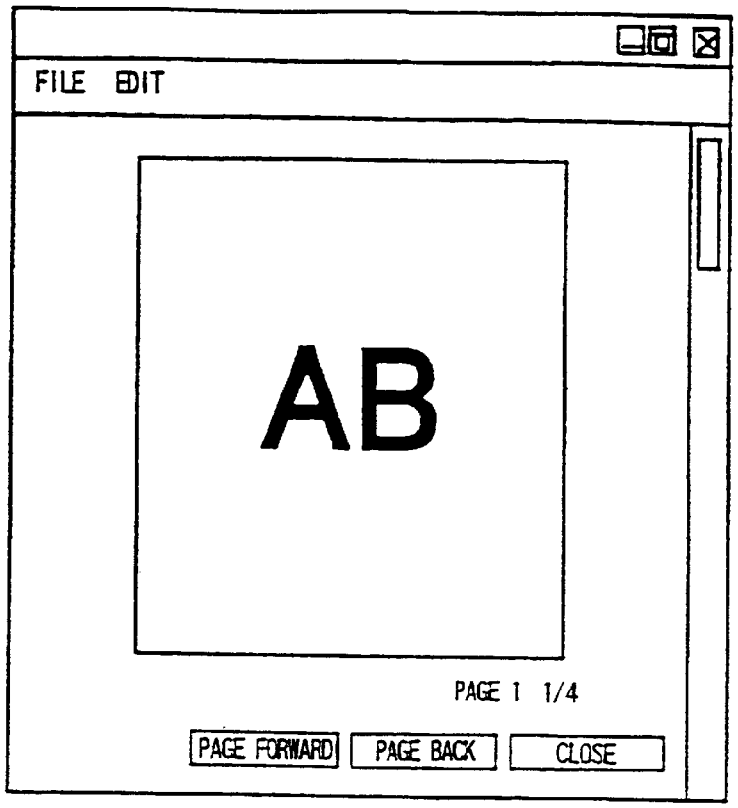
FIG. 61 shows an example of a preview display in the 17th embodiment of the invention.
Figure 62:
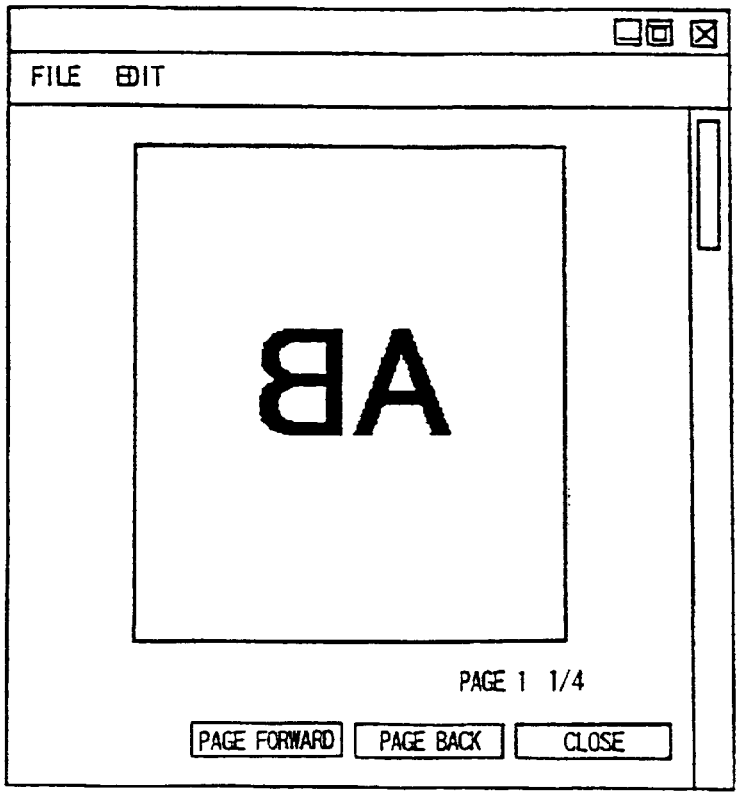
FIG. 62 shows an example of the preview display in the 17th embodiment of the invention.
Figure 63:
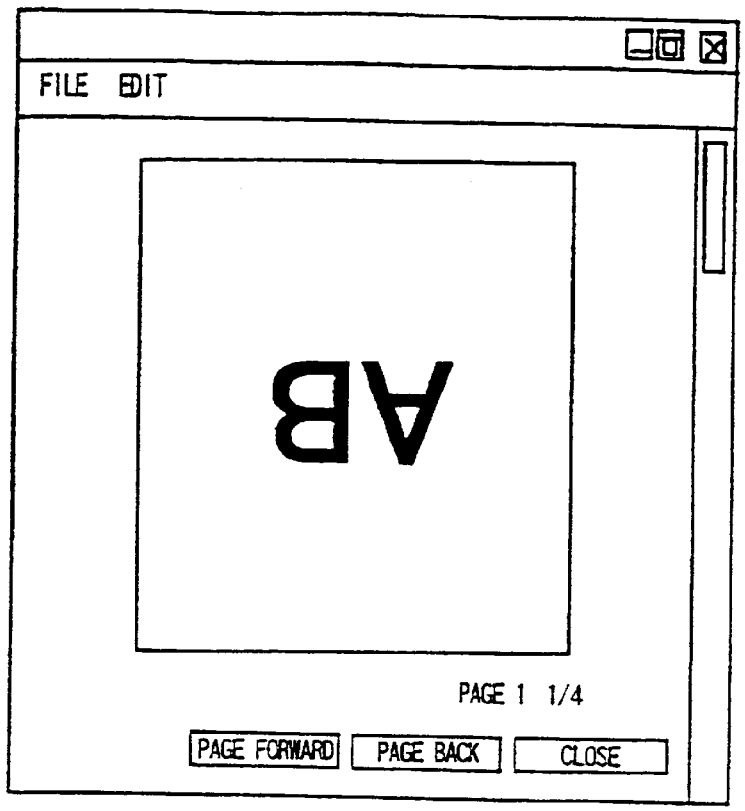
FIG. 63 shows an example of the preview display in the 17th embodiment of the invention.
Figure 64:
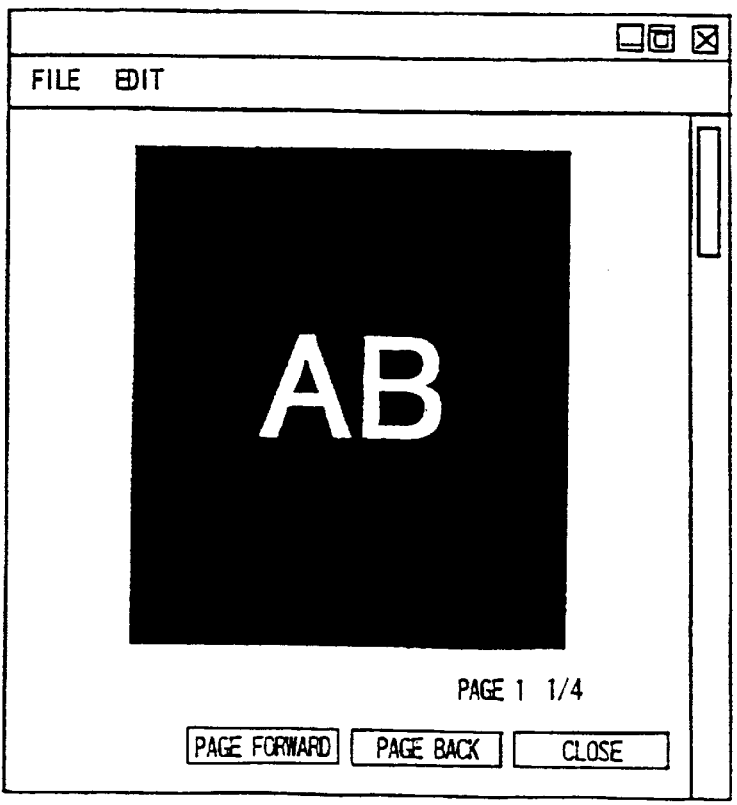
FIG. 64 shows an example of the preview display in the 17th embodiment of the invention.

For examples, FIGS. 61 to 64 are given. FIG. 61 shows an example in which no designation is made, FIG. 62 shows an example in which horizontal flipping is effected, FIG. 63 shows an example in which 180° rotating is effected, and FIG. 64 shows an example in which inverting is effected. By showing the preview, effects of print setting become clear.

[18th Embodiment]

The 18th embodiment of the invention will be described. In the system of the first embodiment, an overlapping part is extracted between the print settings of the application and the print settings of the printer driver, and the overlapped print settings are unified. As the unified setting is stored in the general printing information memory 2-14, 8-16 of the print support software 2-9, 8-8, in the case of displaying the preview screen, the preview screen data is generated by using the print setting data in the general printing information memory and the document data in the printing data memory 2-21 of the application.

Figure 65:
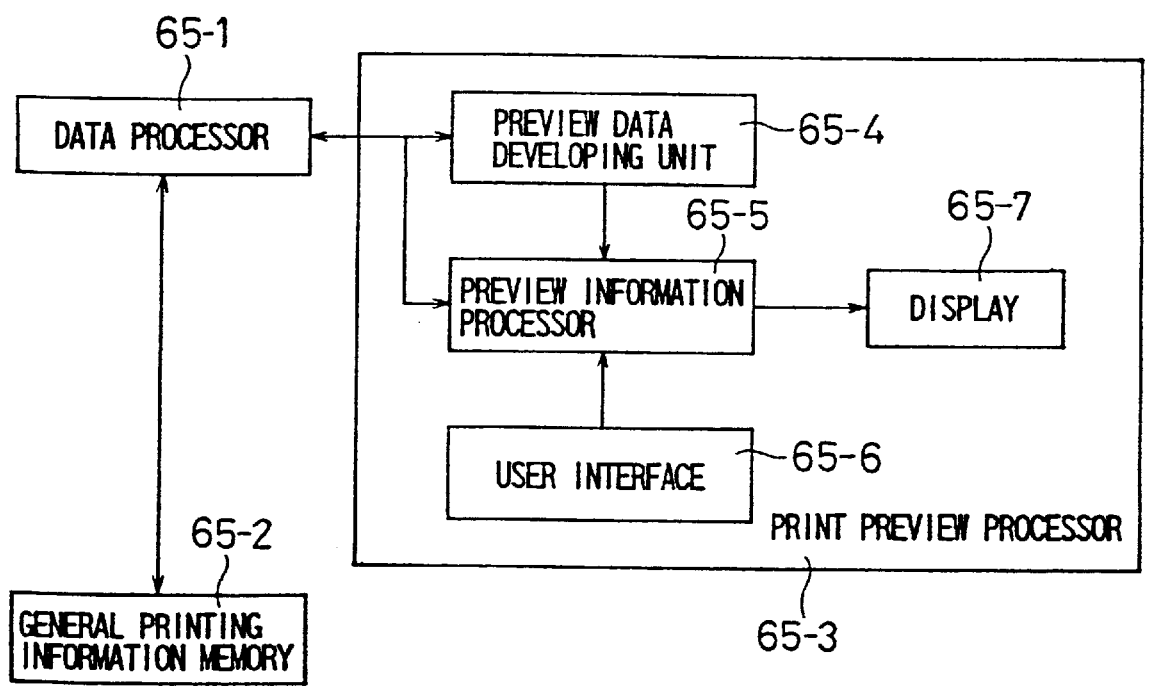
FIG. 65 is a block diagram of a part of a software system of a computer according to an 18th embodiment of the invention.

Displaying of this preview will be described by referring to a block diagram of FIG. 65 and a flowchart of FIG. 66. FIG. 65 is a detail view of the print preview processor 2-13, 8-11 in the print support software in FIGS. 2, 8, and FIG. 66 is the flowchart form receiving the data to be previewed by the print preview processor to displaying and editing the preview.

A data processor 65-1 is the same as the data processor 2-11, 8-10 and controls input/output of a print preview processor 65-3. A general printing information memory 65-2 stores the print settings of the application and the print settings of the printer driver by unifying them. The print preview processor 65-3 displays the print preview using the document data of the application and the print setting data of the general printing information memory 65-2.

A preview data developing unit 65-4 carries out the same preview image developing process as conventionally executed. A preview information processor 65-5 executes a process, such as horizontally flipping, 180° rotating, or inverting the preview image on the preview image data developed by the preview data developing unit 65-4 according to the print setting. The processed image data is to be displayed on a display 65-7. Edit input for each page is made through a user interface 65-6 and then the updated information is stored in the general printing information memory 65-2 thorough the data processor 65-1.

Figure 66:
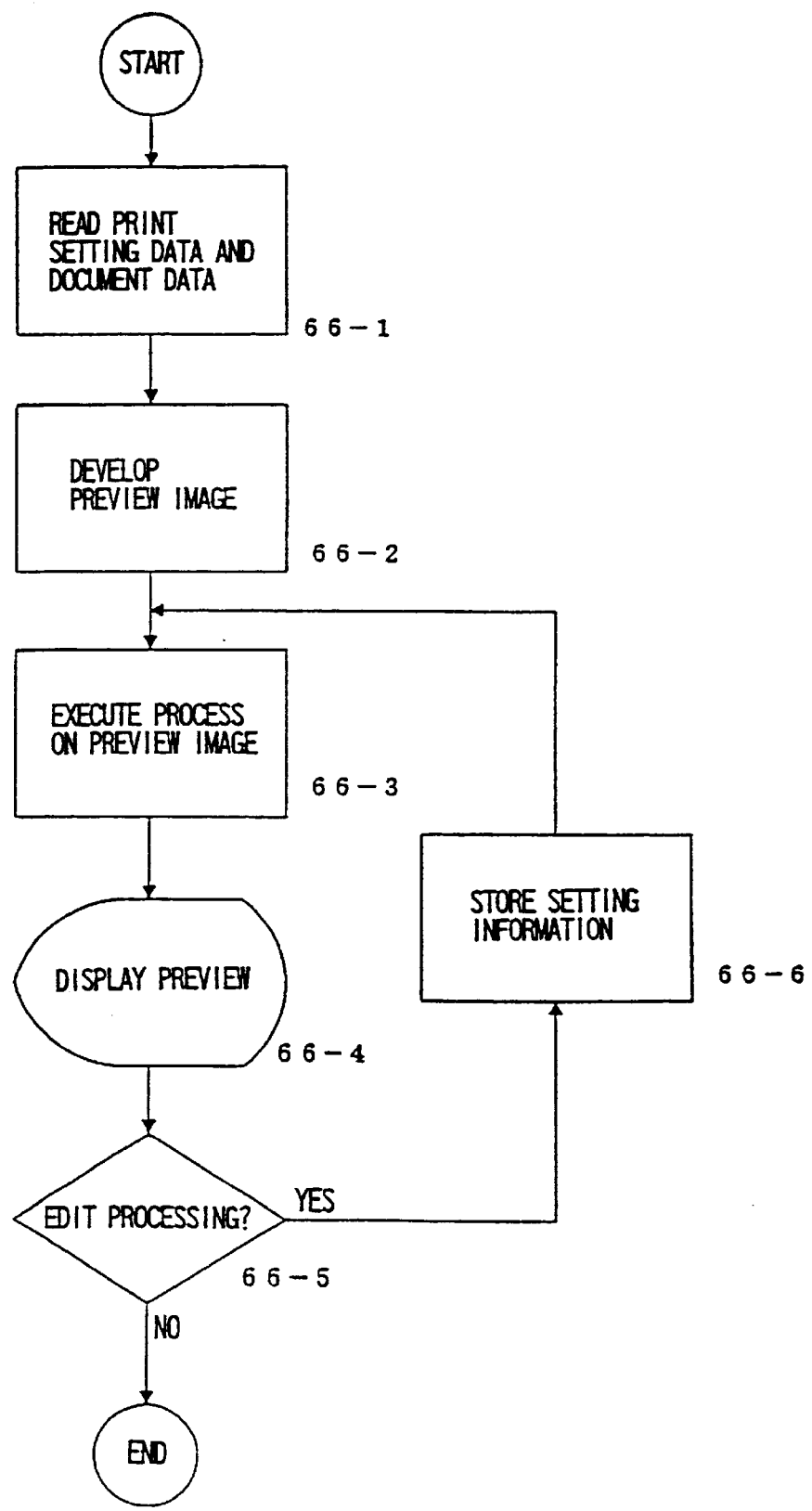
FIG. 66 is a flowchart of the 18th embodiment of the invention.

In FIG. 66, at step 66-1, the preview data developing unit 65-4 receives the document data stored in the printing data memory 2-21, 8-6 of the application and the unified print setting data from the general printing information memory 65-2 via the data processor 65-1, and at step 66-2, develops the data into the preview image data in the same manner as the conventional preview data developing process, and then sends it to the preview information processor 65-5.

At step 66-3, the preview information processor 65-5 executes the process of horizontally flipping, 180° rotating, inverting or the like on the developed preview image data. The preview information processor 65-5 receives the print setting data from the general printing information memory 65-2 via the data processor 65-1 of the print support software and executes the process corresponding to the received data, thereby manipulating the preview image. At step 66-4, the processed data is sent to the display 65-7 where the preview is displayed.

Figure 67:
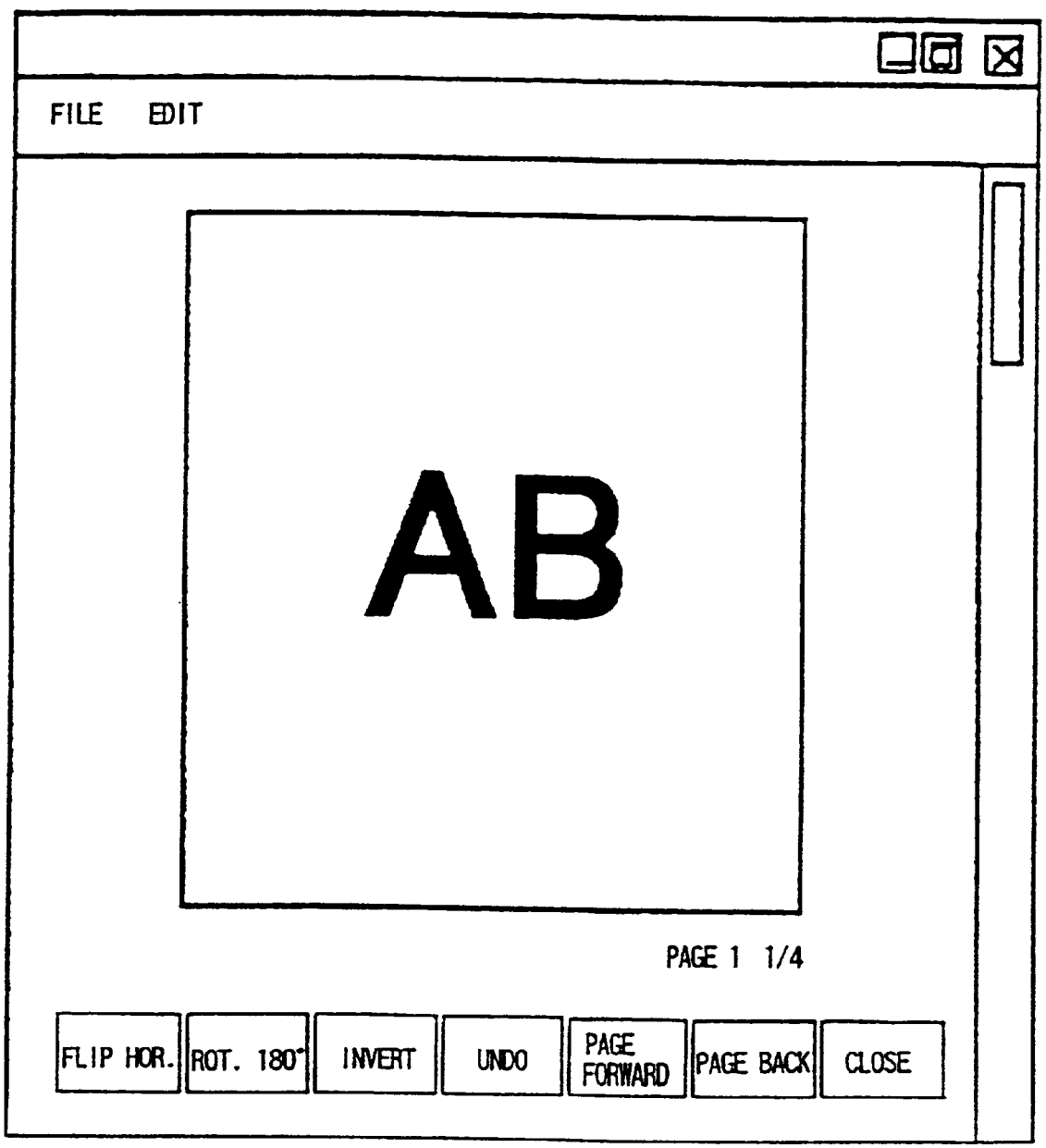
FIG. 67 shows an example of a preview display in the 18th embodiment of the invention.

At step 66-5, the user causes a page which he/she desires to edit to be displayed on the preview screen, and selects an objective editing process with an edit icon shown in FIG. 67. When the 'CLOSE' icon is selected, the process ends at END. When other icons, i.e. a 'FLIP HORIZONTAL' icon, a 'ROTATE 180°' icon or an 'INVERT' icon is selected, at step 66-6, the preview information processor 65-5 sends the change information to the general printing information memory 65-2 for storing it. Then the flow returns to step 66-3 for causing the changed contents to be reflected on the preview screen.

Figure 68:
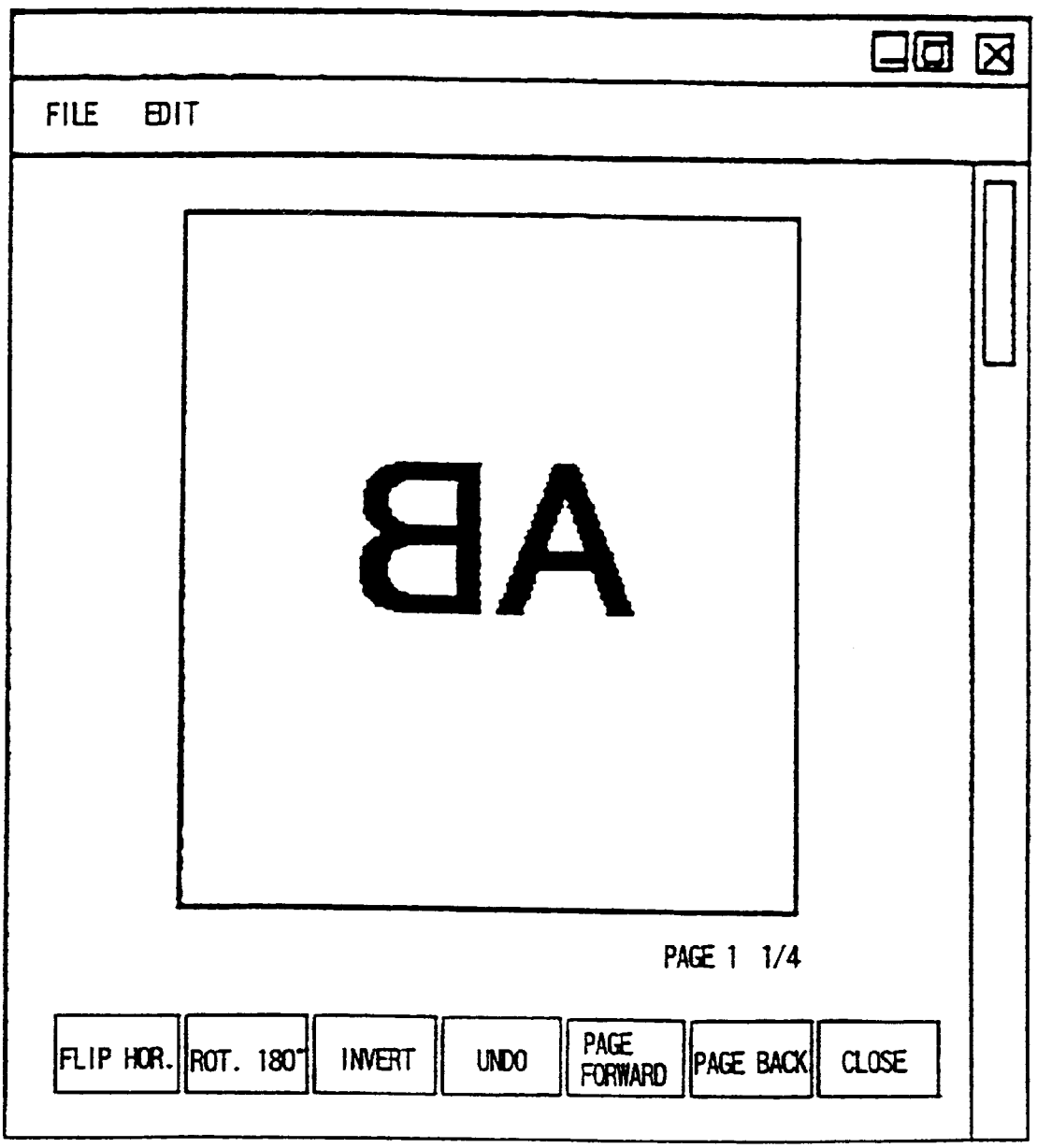
FIG. 68 shows an example of the preview display in the 18th embodiment of the invention.
Figure 69:
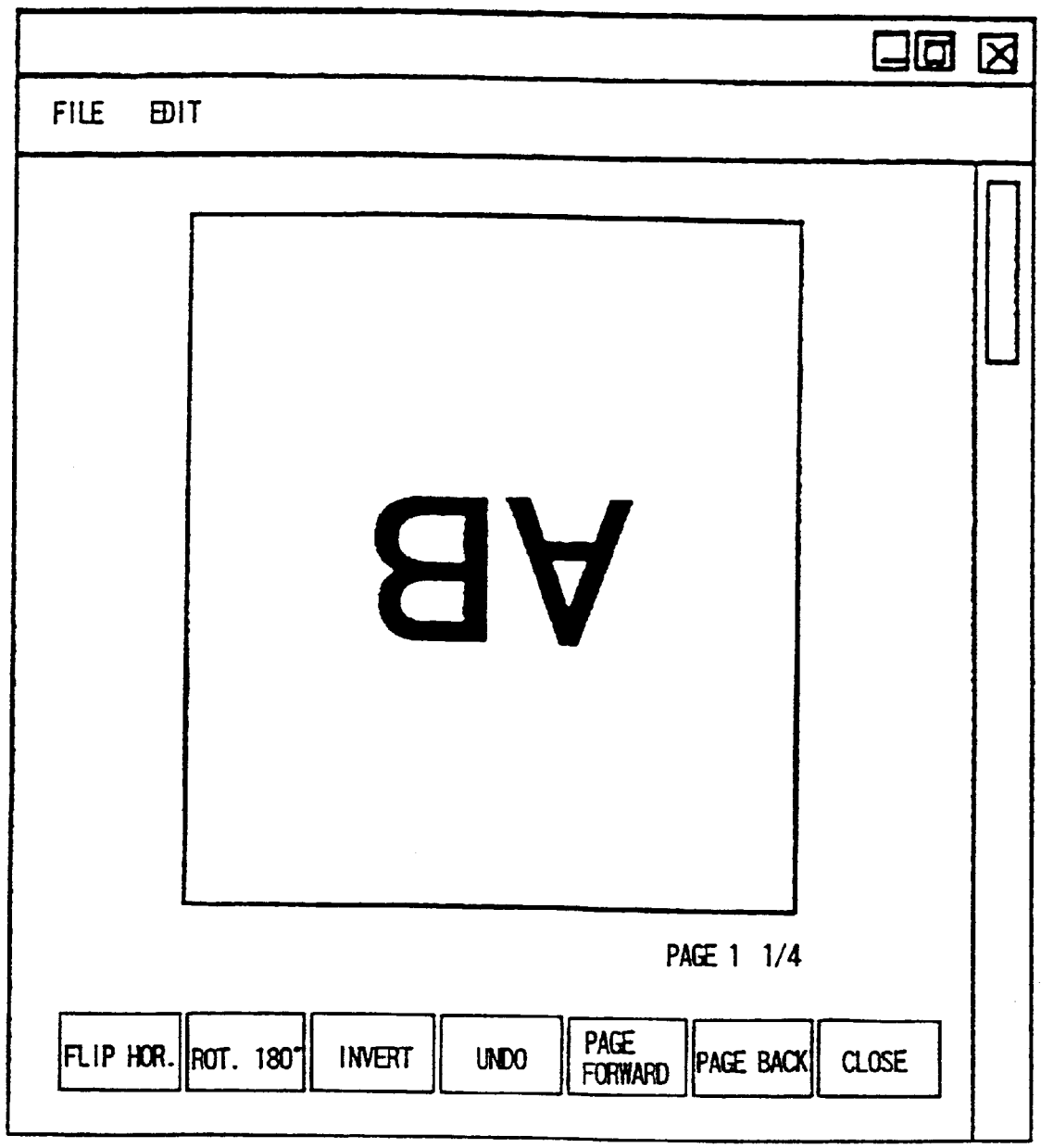
FIG. 69 shows an example of the preview display in the 18th embodiment of the invention.
Figure 70:
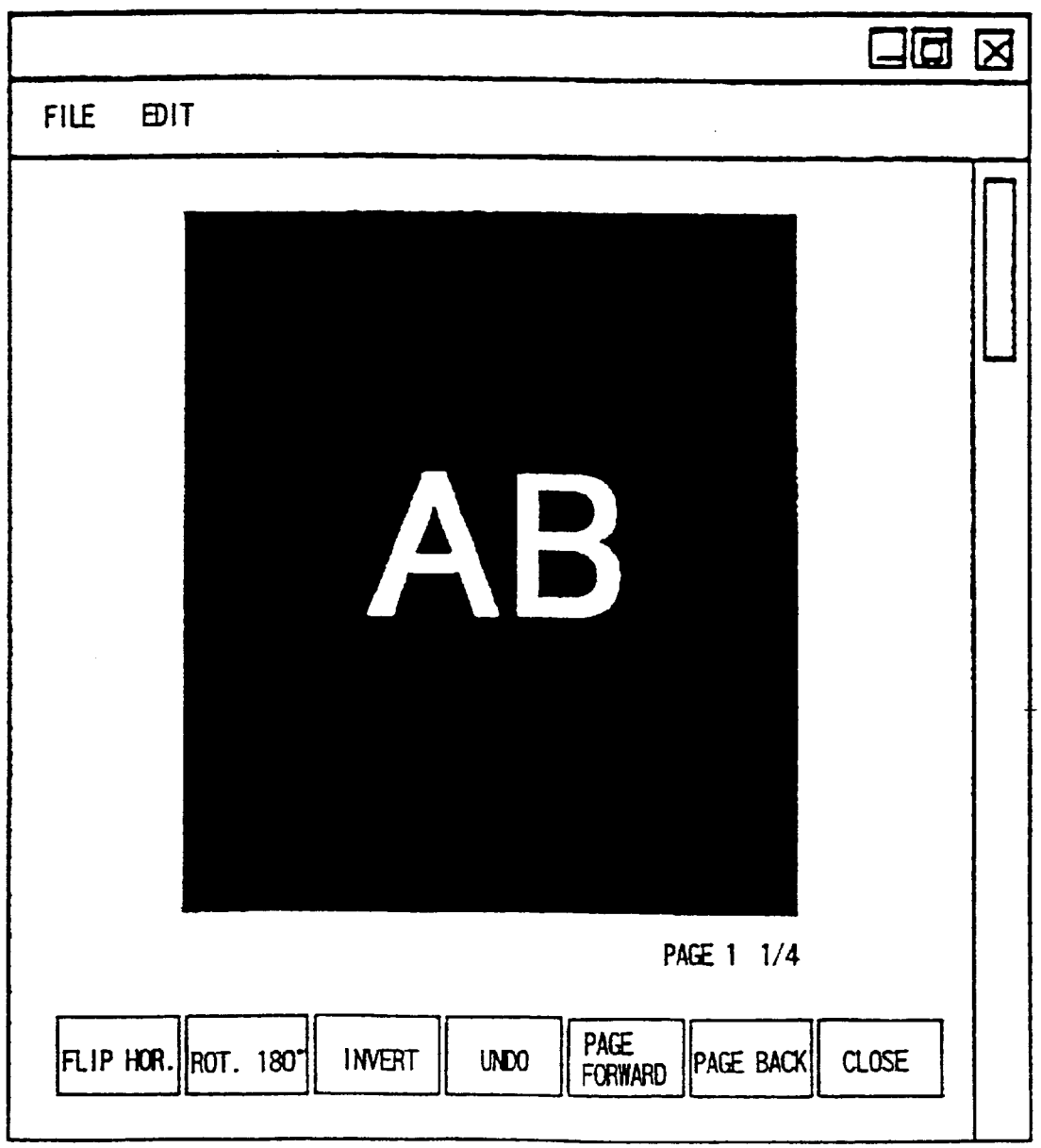
FIG. 70 shows an example of the preview display in the 18th embodiment of the invention.

For examples, FIGS. 67 to 70 are given. FIG. 67 shows an example in which no designation is made, and FIG. 68 shows an example in which the 'FLIP HORIZONTAL' icon is clicked in FIG. 67. In this way, setting of each page can be readily executed. Remaining 180° rotating and inverting designations are shown in FIGS. 69 and 70 in the same manner.

[19th Embodiment]

Figure 71:
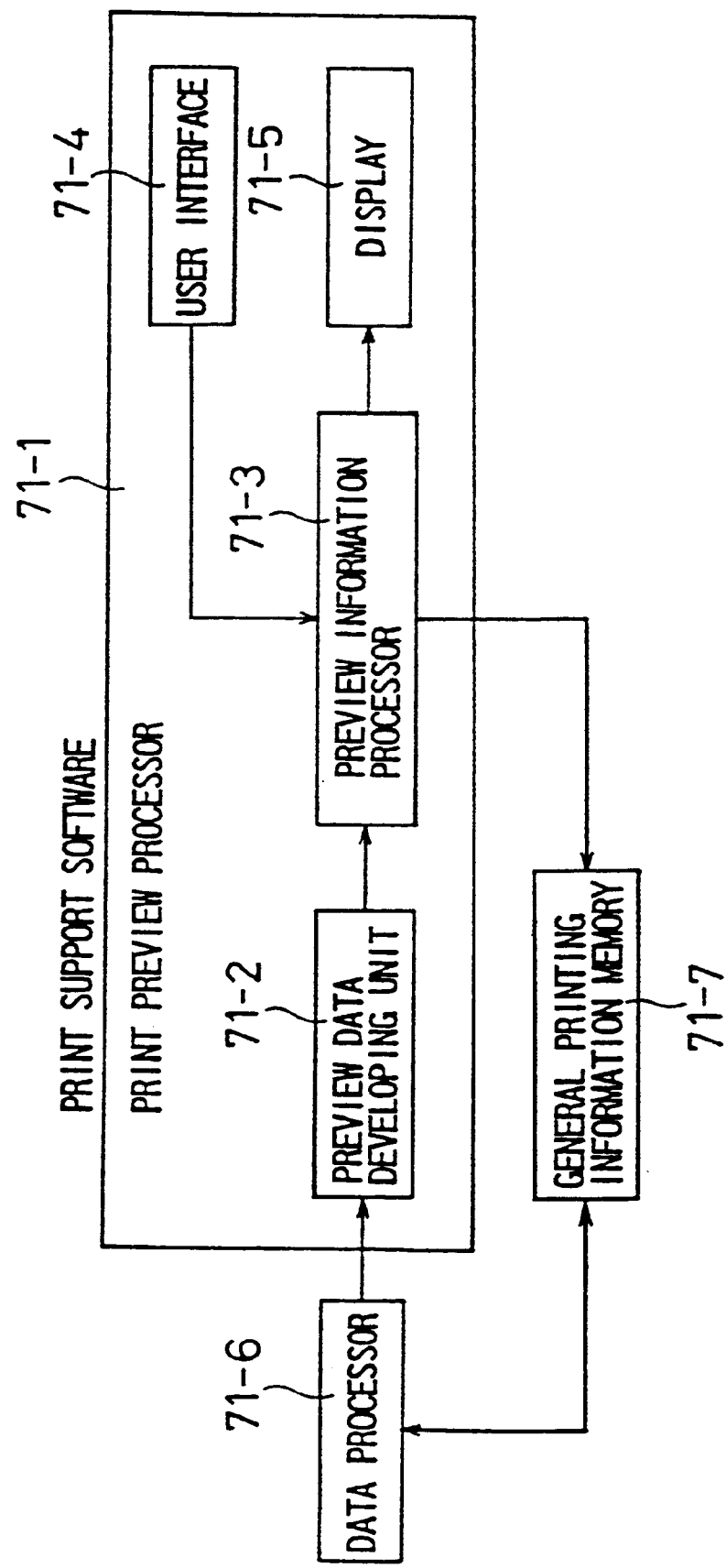
FIG. 71 is a block diagram of a software system according to a 19th embodiment of the invention.
Figure 72:
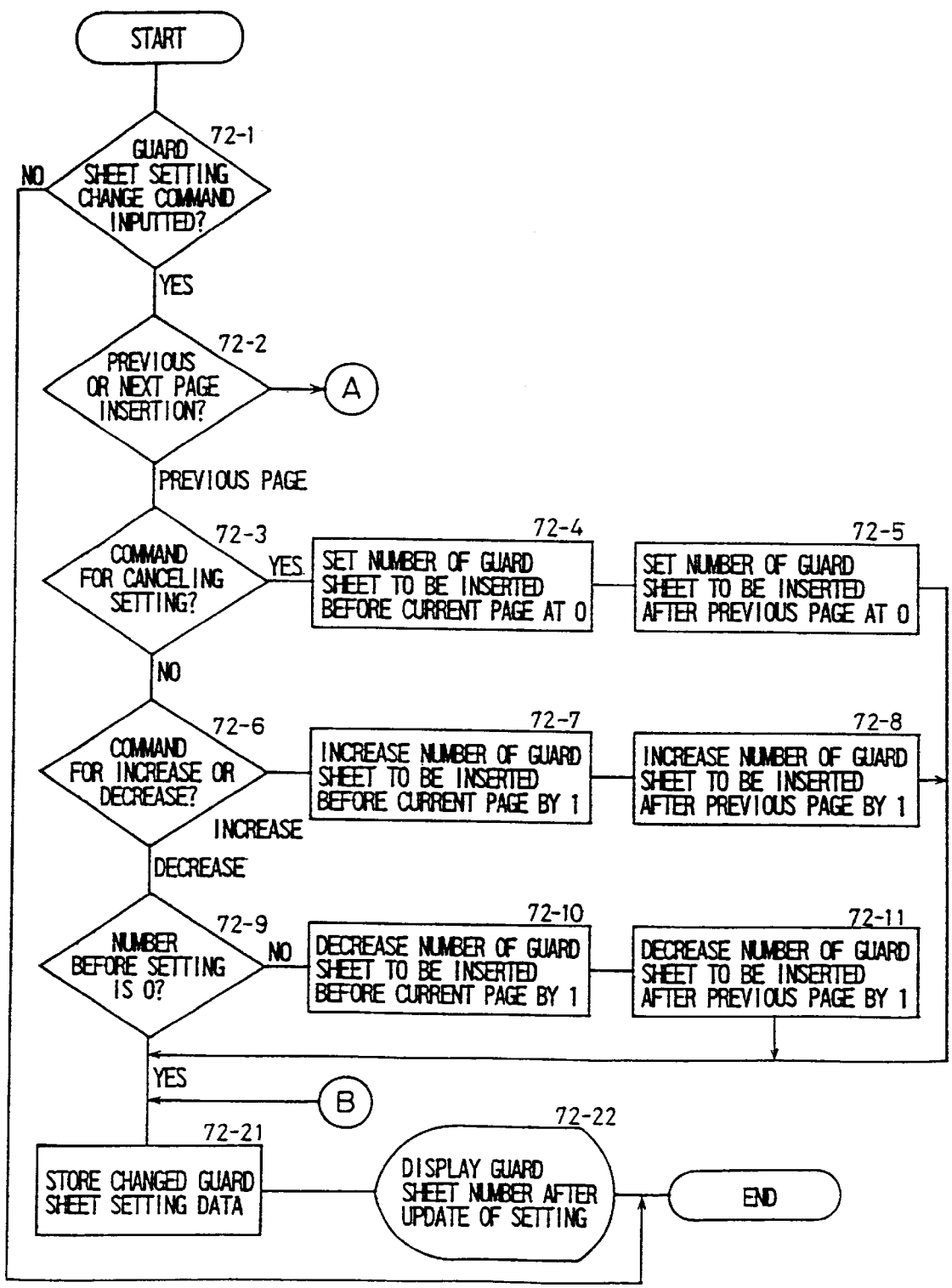
FIG. 72 is a flowchart of the 19th embodiment of the invention.
Figure 73:
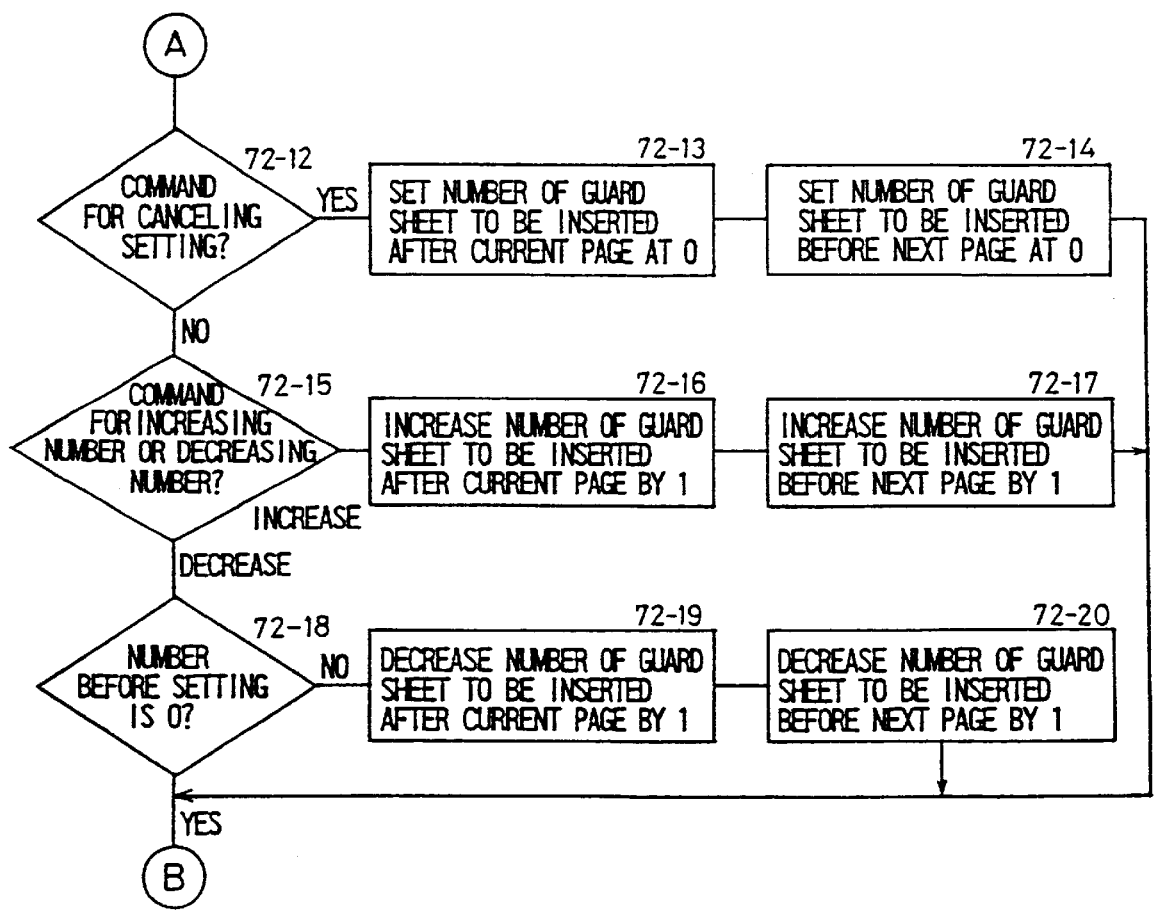
FIG. 73 is a flowchart of the 19th embodiment of the invention.
Figure 74:
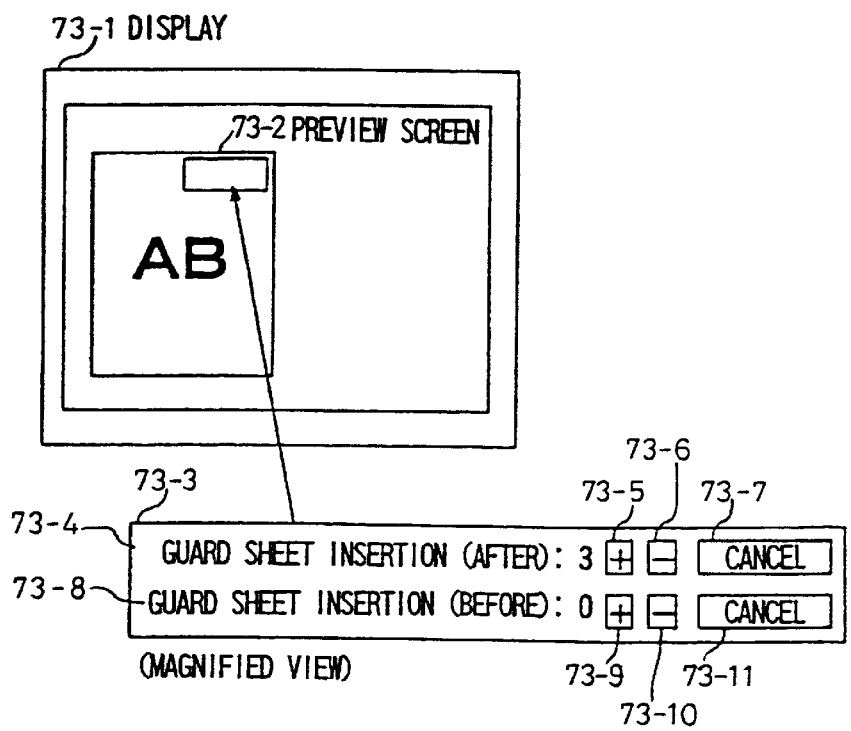
FIG. 74 is an example of a preview screen display containing guard sheet setting items in the 19th embodiment of the invention.

FIG. 71 is a block diagram of a software system of a computer according to the 19th embodiment of the invention, in which the print preview processor 2-13, 8-11 in the print support software 2-9, 8-8 in FIGS. 2 and 8 is detailed. FIGS. 72 and 73 show processing flowcharts of the 19th embodiment of the invention. FIG. 74 shows an example of the preview screen display including guard setting items.

Figure 75:
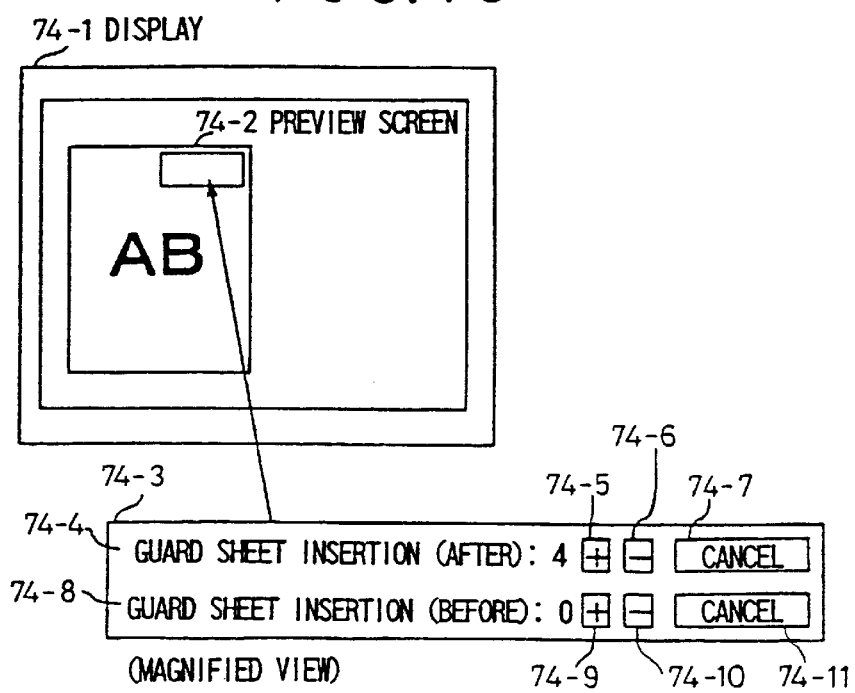
FIG. 75 is an example of the preview screen display in the case an icon "+" on the right of the display for the number of guard sheets to be inserted after the current page in FIG. 74 is pressed once in the 19th embodiment of the invention.
Figure 76:
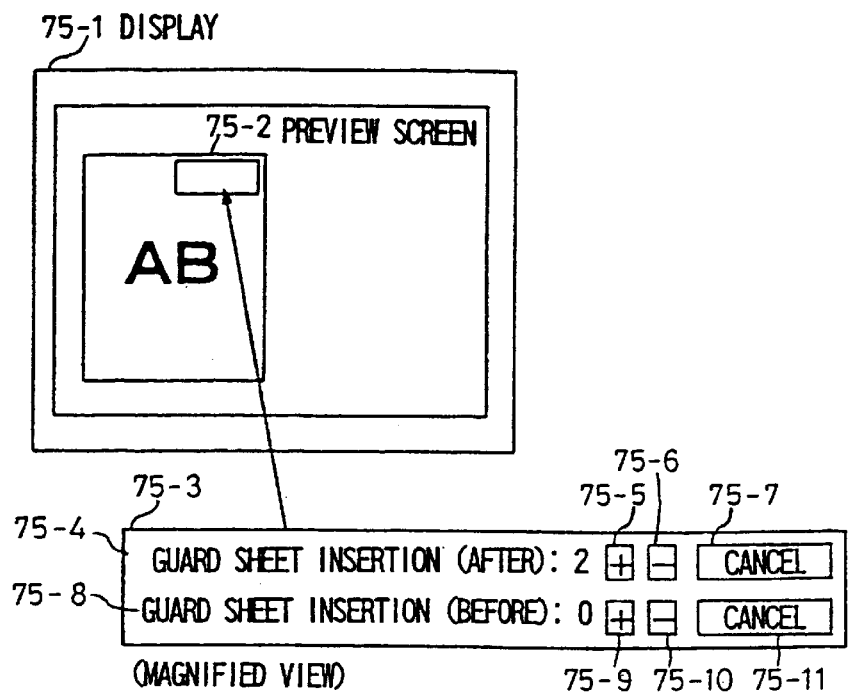
FIG. 76 is an example of the preview screen display in the case an icon "−" on the right of the display for the number of guard sheets to be inserted after the current page in FIG. 74 is pressed once in the 19th embodiment of the invention.
Figure 77:
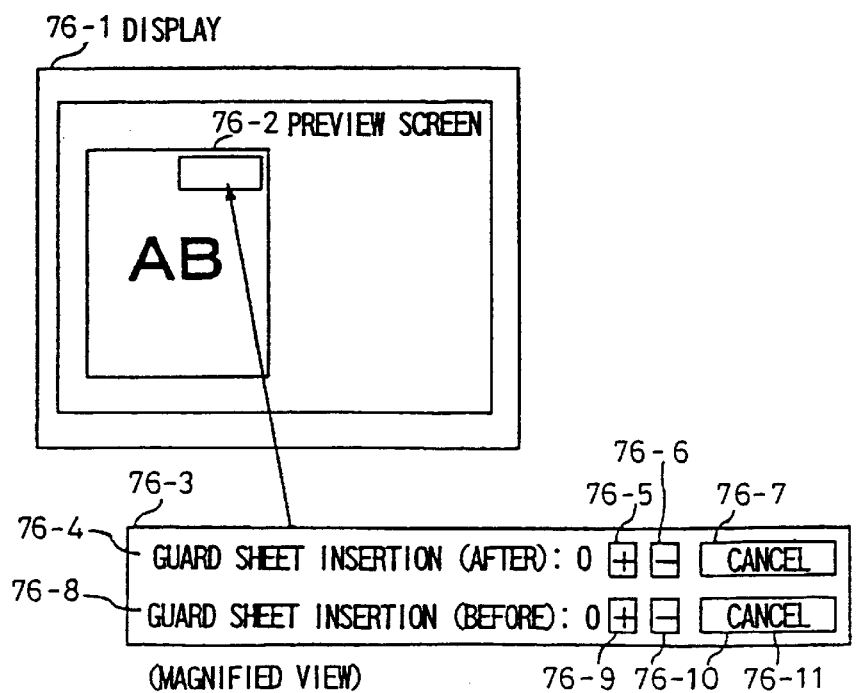
FIG. 77 is an example of a preview screen display in the case an icon "cancel" of setting on the right of the display for the number of guard sheets to be inserted after the current page in FIG. 74 is pressed once in the 19th embodiment of the invention.

FIG. 75 shows an example of the preview screen display in which a '+' icon on the right of the display for the number of guard sheets to be inserted after the current page is pressed once in FIG. 74. FIG. 76 shows an example of the preview screen display in which a '−' icon on the right of the display for the number of guard sheets to be inserted after the current page is pressed once in FIG. 74. FIG. 77 shows an example of the preview screen display in which a 'CANCEL' of setting icon on the right of the display for the number of guard sheets to be inserted after the current page is pressed once in FIG. 74.

The 19th embodiment of the invention will be described. In the system of the first embodiment, an overlapping part is extracted between the print settings of the application 2-1, 8-1 and the print settings of the printer driver 2-16, 8-18, and the overlapped print settings are unified. As the unified setting is stored in the general printing information memory 2-14, 8-16 of the print support software 2-9, 8-8, in the case of displaying the preview screen, the preview screen data is generated by using the print setting data in the general printing information memory 2-16, 8-16 and the document data of the application 2-1, 8-1. In the state where this preview display screen is displayed and a display as to the guard sheet setting is included in that screen, changing process of guard sheet setting will be described by referring to FIGS. 71 to 77.

In FIG. 71, a print preview processor 71-1 carries out an input/output processing of a preview screen on a display in printing operation. A preview data developing unit 71-2 develops the print setting data and the document data obtained from a data processor 71-6 to generate preview screen displaying data. A preview information processor 71-3 receives the preview screen displaying data and the print setting data received by the preview data developing unit 71-2 and user command data received by a user interface 71-4, judges whether the command is for changing the guard sheet setting, and updates the information of the guard sheet setting, to thereby update the preview screen displaying data and the print setting data.

The user interface 71-4 converts a command inputted by the user with the input device or the like into command data, and sends the command data to the preview information processor 71-3. A display 71-5 displays the preview screen displaying data obtained from the preview information processor 71-3 in the form that the user can visually recognize. The data processor 71-6 reads the print setting data and the document data from the interface with the application and the print setting data from the interface with the printer driver, extracts an overlapping part between each print settings, and unifies the overlapping settings. The data processor 71-6 also sends/receives the unified print setting data to/from a general printing information memory 71-7.

The general printing information memory 71-7 stores the unified print setting data, and when the guard sheet setting change command is issued from the user interface 71-4, receives and stores the updated print setting data from the preview information processor 71-3. The general printing information memory 71-7 also sends the print setting data stored therein to the data processor 71-6 as necessary.

For an example of a process of issuing a command concerning the guard sheet setting, a display 73-3 which includes guard sheet setting icons is executed in a preview screen 73-2 on a display 73-1 as shown in FIG. 74. In the example of FIG. 74, two settings items are provided: one is for inserting a guard sheet before the current page for which the setting is being made (guard sheet (after) 73-8); and the other is for inserting a guard sheet after the current page (guard sheet (after) 73-4). For each setting item, to facilitate the guard sheet setting, the following icons are provided; increase insertion number by one (73-5, 73-9 denoted by '+'); decrease insertion number by one (73-3, 73-10 denoted by '−'); cancel guard sheet insertion setting (73-7, 73-11).

Flowcharts of FIGS. 72 and 73 start from the time when a command is inputted on the preview screen 73-2 on which settings concerning guard sheets are displayed. Using these flowcharts, the process will be explained step by step.

Step 72-1: Whether the command inputted on the preview screen 73-2 is for changing the guard sheet setting is judged. The command is inputted by directly manipulating the preview screen 73-2 in the interface 71-4 of the print preview processor 71-1 in the print support software of FIG. 71. The command is judged in the preview information processor 71-3 of FIG. 71 as to what is the command for. When it is judged that the command is not for changing the guard sheet setting, the process ends without executing any manipulations. When it is judged that the command is for changing the guard sheet setting, the flow proceeds to step 72-2.

Step 72-2: Whether the command is for inserting a guard sheet before the current page is judged in the preview information processor 71-3. When it is judged that the command concerns with inserting a guard sheet before the current page, the flow proceeds to step 72-3. When it is judged that the command is for inserting a guard sheet after the current page, the flow proceeds to step 72-12.

Step 72-3: Whether the command for inserting a guard sheet before the current page is a command to cancel setting is judged in the preview information processor 71-3. When it is judged that the command is for canceling the setting, the flow proceeds to step 72-4, and when not, the flow proceeds to step 72-6.

Step 72-4: The guard sheet number to be inserted before the current page is set to 0 in the preview information processor 71-3, then the flow proceeds to step 72-5.

Step 72-5: The number of guard sheets to be inserted after the current page is set at 0 in the preview information processor 71-3 for the previous page, then the flow proceeds to step 72-21.

Step 72-6: Whether the command for inserting a guard sheet before the current page is for increasing or decreasing the guard sheet number is judged. When the command is for increasing the number of the guard sheets, the flow proceeds to step 72-7, and when not, the flow proceeds to step 72-9.

Step 72-7: The setting of the number of guard sheets to be inserted before the current page is increased by one in the preview information processor 71-3, then the flow proceeds to step 72-8.

Step 72-8: The setting of the number of guard sheets to be inserted after the previous page is increased by one in the preview information processor 71-3, then the flow proceeds to step 72-21.

Step 72-9: The preview information processor 71-3 judges whether the setting number before the command to decrease the number of guard sheets to be inserted before the current page is issued is 0. When the number is 0, the flow proceeds to step 72-21 and when not, the flow proceeds to step 72-10.

Step 72-10: The setting of the number of guard sheets to be inserted before the current page is decreased by one in the preview information processor 71-3, then the flow proceeds to step 72-11.

Step 72-11: The setting of the number of guard sheets to be inserted after the previous page is decreased by one in the preview information processor 71-3, then the flow proceeds to step 72-21.

Step 72-12: Whether the command for inserting the guard sheet after the current page is for canceling the guard sheet setting is judged in the preview information processor 71-3. When the command is for canceling the guard sheet setting, the flow proceeds to step 72-13, and when not, proceeds to step 72-15.

Step 72-13: The number of guard sheets to be inserted after the current page is set at 0 in the preview information processor 71-3, then the flow proceeds to step 72-14.

Step 72-14: The number of guard sheets to be inserted before the next page is set at 0 in the preview information processor 71-3, then the flow proceeds to step 72-21.

Step 72-15: Whether the command for inserting a guard page after the current page is for increasing or decreasing the number of guard sheets is judged in the preview information processor 71-3. When the command is for increasing the number of guard sheets, the flow proceeds to step 7-16, and when not, the flow proceeds to step 72-18.

Step 72-16: The number of guard sheets to be inserted after the current page is increased by one in the preview information processor 71-3, then the flow proceeds to step 72-17.

Step 72-17: The setting of the number of guard sheets to be inserted before the next page is increased by one in the preview information processor 71-3, then the flow proceeds to step 72-21.

Step 72-18: The preview information processor 71-3 judges whether the setting number before the command for decreasing the number of guard sheets to be inserted after the current page is issued is 0. When the number is 0, the flow proceeds to step 72-21 and when not, the flow proceeds to step 72-19.

Step 72-19: The setting of the number of guard sheets to be inserted after the current page is decreased by one in the preview information processor 71-3, then the flow proceeds to step 72-20.

Step 72-20: The setting of the number of guard sheets to be inserted before the next page is decreased by one in the preview information processor 71-3, then the flow proceeds to step 72-21.

Step 72-21: The guard sheet setting data thus changed existing in the preview information processor 71-3 is sent to the general printing information memory on FIG. 71 where the guard sheet setting is stored.

Step 72-22: The guard sheet number (before) and the guard sheet number (after) after update of the settings are displayed on the preview screen of the display.

FIG. 74 shows an example of the preview screen display containing the guard sheet setting items. FIG. 75 is an example of the preview screen display in the case of pressing the '+' icon on the right of the display 73-4 for the number of guard sheets to be inserted after the current page once in FIG. 74. By pressing the '+' icon once, the guard sheet number (after) 73-4 increases by one.

FIG. 76 shows an example of the preview screen display in the case of pressing the '−' icon 73-6 on the right of the display for the guard sheet number (after) 73-4 once in FIG. 74. By pressing the '−' icon once, the number of guard sheets (after) 73-4 decreases by one.

FIG. 77 shows an example of the preview screen display in the case of pressing the 'CANCEL' of setting icon 73-7 on the right of the display for the guard sheet number (after) 73-4 once in FIG. 74. By pressing the 'CANCEL' of setting icon once, the setting of the guard sheet number (after) 73-4 is canceled and the number is cleared to be 0.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A print processing apparatus using a computer system having a printer connected thereto, the apparatus comprising:

a printer driver specific to the printer for sending printing data directly from an application program, which has a printing function, or via an operating system from the application program, to the printer;

display means for displaying print setting items of the application program and printer setting items of the printer driver simultaneously on particular screens when printing operation is carried out using the application program; and print setting means for extracting an overlapping item between the print setting items of the application program and the printer setting items of the printer driver so as to prevent the contents of the overlapping item from conflicting with each other, wherein the print setting means erases a printer setting item among the printer setting items of the printer driver, which printer setting item overlaps with a print setting item of the application program, from the screen for displaying printer setting items of the printer driver.

2. The print processing apparatus using a computer system of claim 1, wherein the print setting means prohibits input of a print setting item among the printer setting items of the printer driver, which printer setting item overlaps with a print setting item of the application program.

3. The print processing apparatus using a computer system of claim 1, wherein the print setting means warns that the overlapping item between the print setting items of the application program and the printer setting items of the printer driver is manipulated.

4. A print processing apparatus using a computer system having a printer connected thereto, the apparatus comprising:

a printer driver specific to the printer for sending printing data directly from an application program, which has a printing function, or via an operating system from the application program, to the printer;

display means; and print setting means for extracting print setting items of the application program and printer setting items of the printer driver and causing the display means to display all the print settings items required for printing operation on one screen, when the printing operation is carried out using the application program, wherein the print setting means erases a printer setting item among the printer setting items of the printer driver, which printer setting item overlaps with a print setting item of the application program, from the screen for displaying printer setting items of the printer driver.

5. The print processing apparatus using a computer system of claim 1 or 4, wherein the display means further displays a print preview image on a particular screen, and the print preview image is paler when a toner save mode is set than when the toner save mode is not set.

6. The print processing apparatus using a computer system of claim 1 or 4, wherein the display means further displays a print preview image on a particular screen, and when a type of printing paper is set for each page, differences in printing paper type for each page can be identified on the screen for displaying the print preview image.

7. The print processing apparatus using a computer system of claim 6, wherein a background image can be set for each type of printing paper.

8. The print processing apparatus using a computer system of claim 1 or 4, wherein the display means further displays a print preview image on a particular screen, and when a staple position is set, the staple position is displayed for all pages on the screen for displaying the print preview image.

9. The print processing apparatus using a computer system of claim 8, wherein the staple position can be changed by direct manipulation of the screen for displaying the print preview image, and in case where an improper position for the staple position is designated, an operation of warning, ignoring or newly designating a position closest to the previously designated position within a valid range is executed.

10. The print processing apparatus using a computer system of claim 1 or 4, wherein the display means further displays a print preview image on a particular screen, and when a double-sided printing mode is set, face and back sides of printing paper for each page are identified on the screen for displaying the print preview image, and insertion/removal of a blank page into/from an arbitrary page and designation of face/back side of printing paper for each page can be effected by direct manipulation of the screen for displaying the preview image.

11. The print processing apparatus using a computer system of claim 1 or 4, wherein the display means further displays a print preview image on a particular screen, and when a double-sided printing mode is set, a long-length binding mode or a short-length binding mode can be designated on the screen for displaying the print preview image and a double-page spread is displayed on the screen for displaying the print preview image according to the designated mode.

12. The print processing apparatus using a computer system of claim 1 or 4, wherein the display means further displays a print preview image on a particular screen, and when a double-sided printing mode is set, a binding margin can be set on the screen for displaying the print preview image, and a binding margin range is displayed on the screen for displaying the print preview image.

13. The print processing apparatus using a computer system of claim 1 or 4, wherein the display means further displays a print preview image on a particular screen, and when horizontal flipping, 180° rotating or black and white inverting of printing image is set, each setting is identified on the screen for displaying print preview image.

14. The print processing apparatus using a computer system of claim 13, wherein horizontal flipping, 180° rotating or inverting printing image is inputted by direct manipulation of the screen for displaying the print preview image.

15. The print processing apparatus using a computer system of claim 1 or 4, wherein the display means further displays a print preview image on a particular screen, and when number of guard sheets to be inserted or a page into which a guard sheet is to be inserted is set, each setting is identified on the screen for displaying the print preview image.

16. A print processing apparatus using a computer system having a printer connected thereto, the apparatus comprising:

a printer driver specific to the printer for sending printing data directly from an application program, which has a printing function, or via an operating system from the application program, to the printer;

display means for displaying print setting items of the application program and printer setting items of the printer driver simultaneously on particular screens when printing operation is carried out using the application program; and print setting means for extracting an overlapping item between the print setting items of the application program and the printer setting items of the printer driver so as to select either the print setting items of the application program or the printer setting items of the printer driver as the overlapping item; wherein the print setting means erases a printer setting item among the printer setting items of the printer driver, which printer setting items of the printer driver, which printer setting item overlaps with a print setting item of the application program, from the screen for displaying printer setting items of the printer driver.

* * * * *